United States Patent
Katsuta

(10) Patent No.: US 10,402,008 B2
(45) Date of Patent: Sep. 3, 2019

(54) INPUT DETECTION DEVICE AND ELECTRONIC DEVICE

(71) Applicant: Japan Display Inc., Tokyo (JP)

(72) Inventor: Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/665,805

(22) Filed: Aug. 1, 2017

(65) Prior Publication Data

US 2018/0032205 A1 Feb. 1, 2018

(30) Foreign Application Priority Data

Aug. 1, 2016 (JP) .................................. 2016-151286

(51) Int. Cl.
| | | |
|---|---|---|
| *G06F 3/046* | (2006.01) | |
| *G06F 3/044* | (2006.01) | |
| *G06F 3/041* | (2006.01) | |
| *G06F 3/147* | (2006.01) | |
| *G09G 3/36* | (2006.01) | |

(52) U.S. Cl.
CPC ............ *G06F 3/0416* (2013.01); *G06F 3/044* (2013.01); *G06F 3/046* (2013.01); *G06F 3/0412* (2013.01); *G06F 3/147* (2013.01); *G09G 3/36* (2013.01); *G09G 3/3648* (2013.01); *G09G 2310/08* (2013.01)

(58) Field of Classification Search
CPC ........ G06F 3/044; G06F 3/046; G06F 3/0416; G06F 3/0412
See application file for complete search history.

(56) References Cited

U.S. PATENT DOCUMENTS

| 5,854,881 A * | 12/1998 | Yoshida ................ G06F 3/0412 345/104 |
|---|---|---|
| 6,219,012 B1 * | 4/2001 | Holtslag ................ G09G 3/294 345/60 |
| 2002/0101174 A1 * | 8/2002 | Onozawa ............... G09G 3/296 315/169.3 |
| 2007/0124515 A1 | 5/2007 | Ishikawa et al. |
| 2014/0078104 A1 * | 3/2014 | Lee ......................... G06F 3/044 345/174 |
| 2014/0152621 A1 * | 6/2014 | Okayama .............. G06F 3/0416 345/174 |

FOREIGN PATENT DOCUMENTS

JP H10-049301 A 2/1998

* cited by examiner

*Primary Examiner* — Lixi C Simpson

(74) *Attorney, Agent, or Firm* — K&L Gates LLP

(57) ABSTRACT

An input detection device includes a plurality of drive electrodes, a first wiring that supplies a first voltage to the plurality of drive electrodes, and a second wiring that supplies a second voltage different from the first voltage, to the plurality of drive electrodes. Input detection through an electromagnetic induction method is performed through a magnetic field generated by supplying the first voltage and the second voltage to the plurality of drive electrodes, and the first voltage and the second voltage supplied to the first wiring and the second wiring are direct-current voltages.

16 Claims, 27 Drawing Sheets

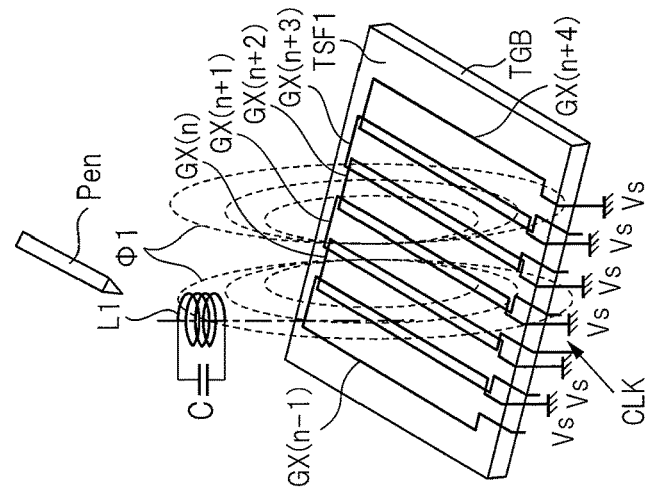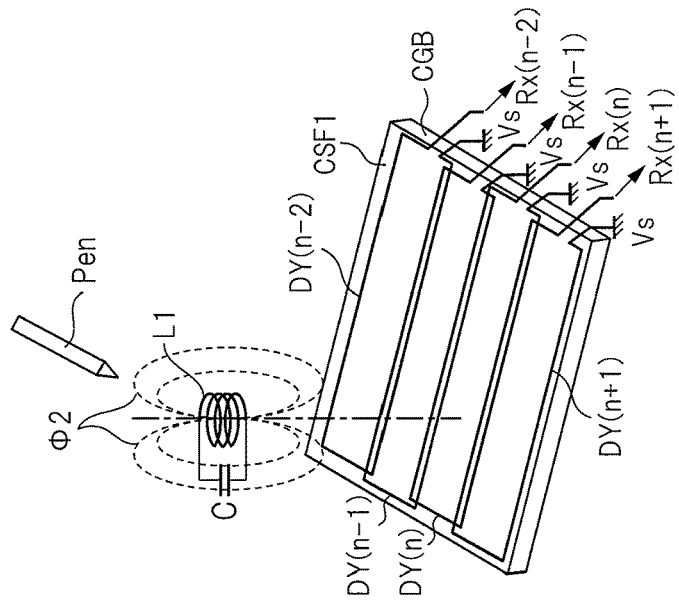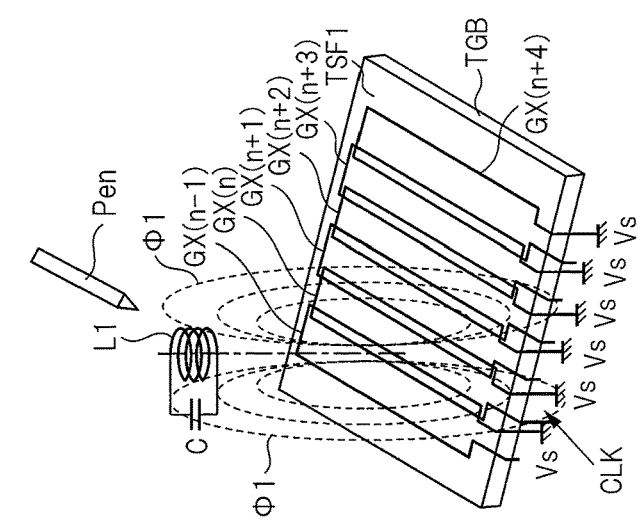

INPUT DETECTION DEVICE AND ELECTRONIC DEVICE

CROSS-REFERENCE TO RELATED APPLICATION

The present application claims priority from Japanese Patent Application No. 2016-151286 filed on Aug. 1, 2016, the content of which is hereby incorporated by reference into this application.

TECHNICAL FIELD OF THE INVENTION

The present invention relates to an input detection device and an electronic device, and particularly relates to an input detection device and an electronic device that have a touch detection function capable of detecting proximity of an external object.

BACKGROUND OF THE INVENTION

Recently, an input detection device, which has a touch detection function capable of detecting the proximity (hereinafter including contact) of an external object and is referred to as a so-called touch panel, has attracted attention as an input detection device. The touch panel is provided as a display device, for example, as a display device with the touch detection function, which is mounted on a liquid crystal display device or is integrated into the liquid crystal device.

There is a touch panel capable of using, for example, a pen as an external object. By using the pen, for example, a small area is designated, and a handwritten character can be inputted. There are various techniques of detecting the touch made by the pen. One of the various techniques is an electromagnetic induction method. The electromagnetic induction method is capable of achieving high precision, for example, high writing-pressure detection precision and is also capable of achieving a hovering detection function in which the external object is apart from a touch panel surface. Thus, the electromagnetic induction method is important as a technique of detecting the touch of the pen.

There is a touch detection device capable of detecting a finger(s) etc. as an external object. In this case, since an object to be detected is different from the pen, a method different from the electromagnetic induction method is adopted as a technique of detecting the touch. For example, there are methods of detecting an optical variation, a resistance-value variation, and an electric field variation that occur due to the finger. An example of the method of detecting the electric-field variation among the methods is a capacitance method using capacitance. The capacitance method includes a relatively simple structure and achieves low power consumption, and thus is used for a portable information terminal etc.

A technique relating to the electromagnetic-induction-method touch panel is described in Patent Document 1 (Japanese Patent Application Laid-open No. H10-49301, for example.

SUMMARY OF THE INVENTION

The display device with the touch detection function includes: a so-called in-cell type display device integrating a touch panel into a display device; and a so-called on-cell type display device mounting the touch panel on the display device. The in-cell type touch panels are more advantageous than the on-cell type touch panels in a reduction in costs and a reduction in a thickness of a panel, etc.

Patent Document 1 describes a technique relating to an electromagnetic-induction-method coordinate input device in which a detection circuit of a position-indicating pen is built in a display device. However, the coordinate input device described in Patent Document 1 generates an electromagnetic wave inside the pen, and so the pen may be enlarged for needing a battery.

Therefore, the present inventors have considered achievement of the electromagnetic-induction-method input detection device that is integrated into the display device, and generates the magnetic field inside the display device, but noises have sometimes occurred in generating the magnetic field inside the display device.

The capacitance-method touch panel is required to be further superimposed on the electromagnetic-induction-method touch panel in desiring to detect both of the pen and the finger, which causes an increase in a thickness and weight of the touch panel and an increase in manufacturing costs.

An object of the present invention is to provide an input detection device that unites a display device with both of an electromagnetic-induction-method touch panel and a capacitance-method touch panel and that is capable of reducing noises in an electromagnetic-induction-method touch detection operation.

An input detection device according to one embodiment of the present invention includes a plurality of drive electrodes, a first wiring that supplies a first voltage to the plurality of drive electrodes, and a second wiring that supplies a second voltage different from the first voltage, to the plurality of drive electrodes. Additionally, input detection with an electromagnetic induction method is performed through a magnetic field generated by supplying the first voltage and the second voltage to the plurality of drive electrodes, and the first voltage and the second voltage supplied to the first wiring and the second wiring are direct-current voltages.

BRIEF DESCRIPTIONS OF THE DRAWINGS

FIG. 2A is an explanatory diagram showing the principle of magnetic field detection;

FIG. 2B is an explanatory diagram showing the principle of magnetic field detection;

FIG. 2C is an explanatory diagram showing the principle of magnetic field detection;

DESCRIPTIONS OF THE PREFERRED EMBODIMENTS

Embodiments of the present invention will be described below with reference to the drawings. Note that the disclosure is just exemplification and, needless to say, any appropriate modifications retaining the spirit of the invention and easily thought up by those skilled in the art are included in the scope of the present invention. In order to clarify the descriptions, the drawings are sometimes, schematically illustrated in terms of a width, a thickness, and a shape etc. of each unit in comparison to an actual aspect, but the illustrations are just examples and do not limit the interpretation of the present invention.

In the present specification and each figure, elements similar to those that have been described for already-illustrated figures, are denoted with the same reference signs, and detailed descriptions thereof may be appropriately omitted. In the following descriptions, a liquid crystal display device with a touch detection function will be described as an example of an input detection device, but the input detection device is not limited to this. For example, the input detection device may be an OLED display device with a touch detection function, a touch panel without a display function, or the like.

First Embodiment

According to a first embodiment, a liquid crystal display device with a touch detection function capable of detecting both a touch of a stylus pen(s) and a touch of a finger(s) (hereinafter, also referred to as a "display device") is provided. The display device according to the first embodiment is a so-called in-cell type display device in which an input detection device having the touch detection function is integrated into the display device. First, a basic configuration of the display device will be described, and then the principles of magnetic field detection of detecting the touch of the pen (hereinafter, also referred to as "magnetic field touch detection" or "magnetic field touch detection due to an electromagnetic induction method") and electric field detection of detecting the touch the a finger (hereinafter, also referred to as "electric field touch detection" or "electric field touch detection due to a capacitance method") will be described on the basis of the basic configuration.

<Basic Configuration of Display Device>

Figure 1A:
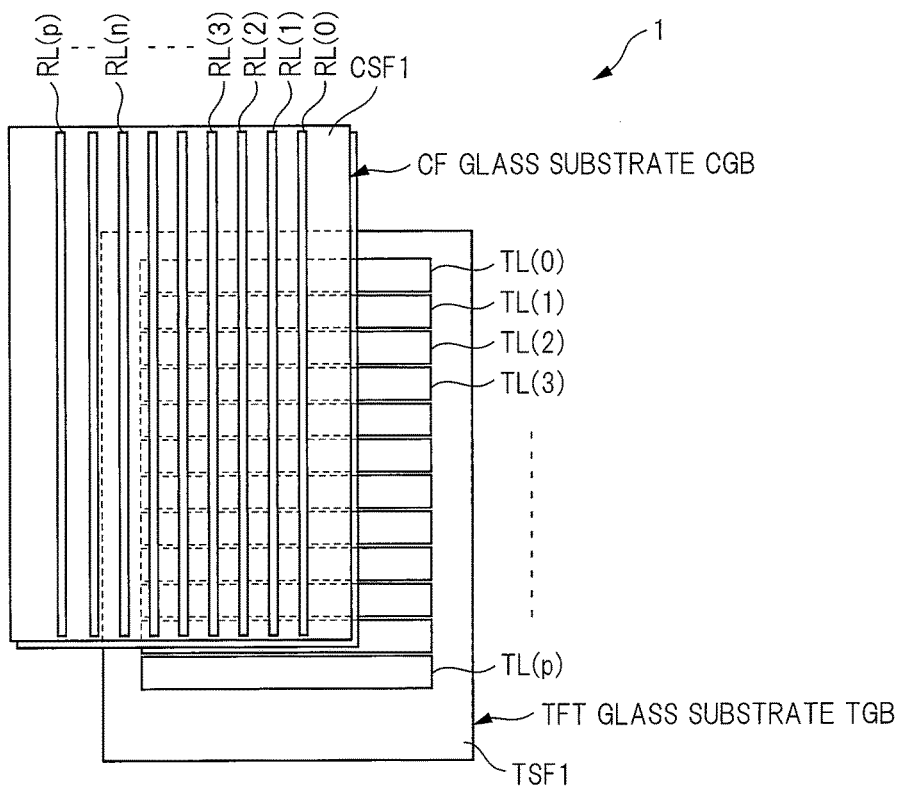
FIG. 1A is a plan view showing a configuration of a display device.
Figure 1B:
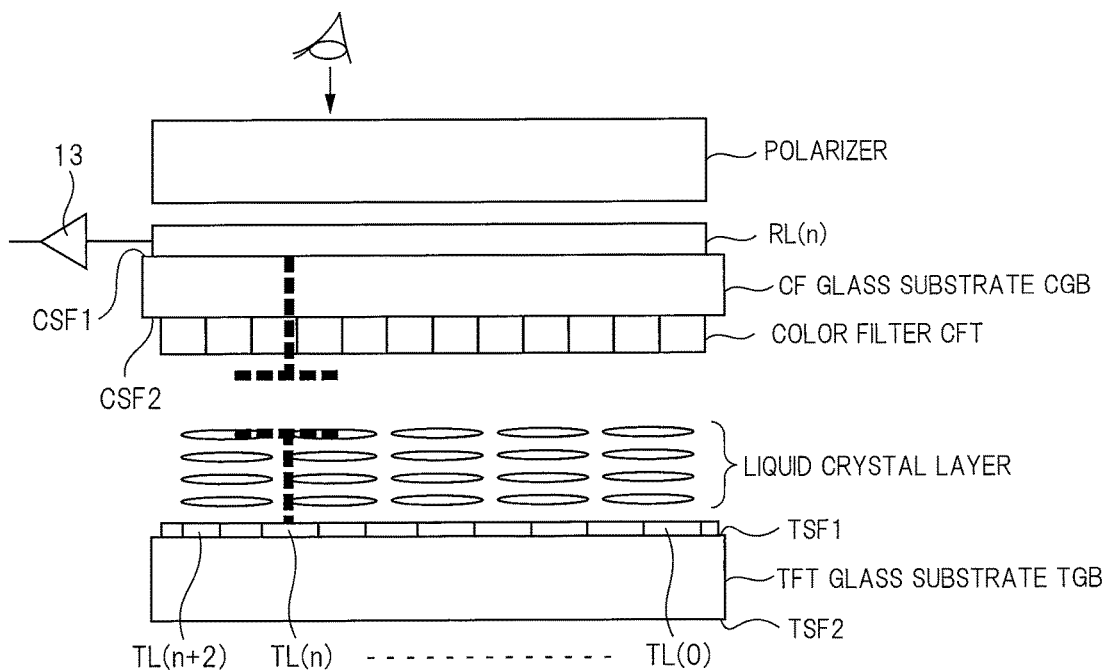
FIG. 1B is a sectional view showing a configuration of a display device.

FIGS. 1A and 1B are schematic views showing a configuration of the display device. In FIGS. 1A and 1B, reference numeral "1" denotes the display device, and FIGS. 1A and 1B are a plan view illustrating a plane of the display device 1 and a sectional view illustrating a section of the display device 1, respectively. The display device 1 includes: a thin film transistor (TFT) glass substrate (hereinafter, also referred to as an "insulation first substrate" or simply referred to as a "first substrate") TGB; a layer stacked on the first substrate TGB; a color filter CFT, a color filter (CF) glass substrate (hereinafter, also referred to as an "insulation second substrate" or simply referred to as a "second substrate") CGB; and a layer stacked on the second substrate CGB.

In FIG. 1A, TL(0) to TL(p) each denote a drive electrode configured by the layer formed on a first main surface TSF1 of the first substrate TGB. RL(0) to RL(p) each denote a detection electrode configured by the layer formed on a first main surface CSF1 of the second substrate CGB. For easier understanding, FIG. 1A is illustrated so that the first substrate TGB and the second substrate CGB are separated from each other, but the first main surface TSF1 of the first substrate TGB and a second main surface CSF2 of the second substrate CGB are disposed so as to interpose a liquid crystal layer as illustrated in FIG. 1B in practice, and oppose each other.

A plurality of layers, and the liquid crystal layers, etc. are interposed between the first main surface TSF1 of the first substrate TGB and the second main surface CSF2 of the second substrate CGB. But, FIG. 1B illustrates only drive electrodes TL(0) to TL(n+2), the liquid crystal layers, and the color filter CFT, which are interposed between the first main surface TSF1 and the second main surface CSF2. As illustrated in FIG. 1A, a plurality of detection electrodes RL(0) to RL(p) and a polarizer are disposed on and over the first main surface CSF1 of the second substrate CGB. In FIG. 1B, reference numeral "13" denotes a unit detection circuit coupled to the detection electrode RL(n).

In the present specification as illustrated in FIG. 1B, a state of viewing the display device 1 from sides of the first main surface CSF1 of the second substrate CGB and the first main surface TSF1 of the first substrate TGB will be described as a plan view. When viewed from the sides of the first main surfaces CSF1 and TSF1 in the plan view, the drive electrodes TL(0) to TL(p) extend in a row direction (a lateral direction) and are arranged in parallel in a column direction (in a longitudinal direction) on the first main surface TSF1 of the first substrate TGB as illustrated in FIG. 1A. The detection electrodes RL(0) to RL(p) extend in the column direction (in the longitudinal direction) and are arranged in parallel in the row direction (the lateral direction) on the first main surface CSF1 of the second substrate CGB as illustrated in FIG. 1A.

The second substrate CGB and the liquid crystal layer, etc. are interposed between the drive electrodes TL(0) to TL(p) and the detection electrodes RL(0) to RL(p). Therefore, when viewed in plan view, the drive electrodes TL(0) to TL(p) and the detection electrodes RL(0) to RL(p) cross each other, but are electrically separated from each other. Capacitance is present between the drive electrodes and the detection electrodes, so that the capacitance is indicated by broken lines and as a capacitance element in FIG. 1B.

When viewed in the plan view, the drive electrodes TL(0) to TL(p) and the detection electrodes RL(0) to RL(p) are preferably orthogonal to each other, but the drive electrodes and the detection electrodes may have a tilt and cross when viewed in the plan view. Therefore, the wording of "orthogonality" used in the following descriptions should be understood to include a meaning of "cross".

<Principle of Magnetic Field Detection>

FIGS. 2A to 2C are explanatory diagrams for describing the principle of the magnetic field detection. A period of the magnetic field detection includes: a magnetic field generation period of generating a magnetic field; and a magnetic field detection period of detecting the magnetic field. FIGS. 2A and 2C illustrate an operation in the magnetic field generation period, and FIG. 2B illustrates an operation in the magnetic field detection period. For convenience of the descriptions, FIGS. 2A to 2C illustrate states of having rotated FIG. 1A by 90°.

In the magnetic field generation period, end portions of predetermined drive electrodes among the drive electrodes TL(0) to TL(p) are electrically coupled, and a predetermined voltage (e.g., a grounding voltage Vs) and a magnetic field drive signal are supplied to the drive electrodes each including the end portion coupled. For example, the other end portions among respective end portions of the drive electrodes TL(0) and TL(2) illustrated in FIG. 1A are electrically coupled on a right side of FIG. 1A. Accordingly, the drive electrodes TL(0) and TL(2) disposed in parallel to each other are coupled in series. The grounding voltage Vs is supplied to the one end portion of the drive electrode TL(0) on a left side of FIG. 1A, and the magnetic field drive signal is supplied to the one end portion of the drive electrode TL(2) on the left side of FIG. 1A. Here, a voltage of the magnetic field drive signal varies periodically. A magnetic field generation coil including, as its inside, an area interposed (an area formed) between the drive electrodes TL(0) and TL(2) is formed by the drive electrodes, and the magnetic field generation coil generates, on its inside, a magnetic field based on a variation in the voltage of the magnetic field drive signal.

In FIG. 2A, "GX(n−1)" denotes the magnetic field generation coil formed by the drive electrodes TL(0) and TL(2), and "GX(n)" to "GX(n+4)" each denote a magnetic field generation coil formed by the drive electrodes TL(1) and TL(3) to TL(p) similarly to the magnetic field generation coil GX(n−1).

In FIG. 2A, "C" and "L1" denote a capacitance element and a coil built in the pen Pen, respectively. The capacitance element C and the coil L1 are coupled in parallel to form a resonance circuit. In the magnetic field generation period, the grounding voltage Vs is supplied to one end portion of each of the magnetic field generation coils GX(n−1) to GX(n+3). A magnetic field drive signal CLK is supplied to the other end portion of the magnetic field generation coil GX(n). Accordingly, the magnetic field generation coil GX(n) generates a magnetic field φ1 depending on a variation in the voltage of the magnetic field drive signal CLK. When the stylus pen Pen is in proximity to the magnetic field generation coil GX(n), the magnetic field generation coil GX(n) and the coil L1 are electromagnetically coupled therebetween, and an induced voltage due to mutual induction is generated into the coil L1 by the magnetic field φ1, so that the capacitance element C is charged.

Next, the period of the magnetic field detection is shifted to the magnetic field detection period illustrated in FIG. 2B. In the magnetic field detection period, the magnetic field detection is performed using the detection electrodes RL(0) to RL(p). The detection electrodes RL(0) to RL(p) each include a pair of end portions. Respective other end portions of the predetermined detection electrodes among the detection electrodes RL(0) to RL(p), are electrically coupled to each other therebetween. For example, other end portions of the detection electrodes RL(0) and RL(3) illustrated in FIG. 1A are electrically coupled on an upper side of FIG. 1A. Accordingly, the detection electrodes RL(0) and RL(3) disposed in parallel are coupled in series. In the magnetic field detection period, the predetermined voltage Vs is supplied to the one end portion of the detection electrode RL(3), and the one end portion of the detection electrode RL(0) is coupled to a unit detection circuit. Therefore, a magnetic field detection coil including, as its inside, an area interposed (an area formed) between the detection electrodes RL(0) and RL(3) is formed, and the magnetic field detection coil detects the magnetic field due to the pen Pen.

In FIG. 2B, "DY(n−2)" denotes a magnetic field detection coil formed by the detection electrodes RL(0) and RL(3), and "DY(n−1)" to "DY(n+1)" each similarly denote a magnetic field detection coil formed by the detection electrodes RL(2) to RL(p). In the magnetic field detection period, the predetermined voltage Vs is supplied to one end portion of each of the magnetic field detection coils DY(n−1) to DY(n+1), and respective signals Rx(n−2) to Rx(n+1) at the other end portions of the magnetic field detection coils each are supplied to the unit detection circuit.

If the capacitance element C is charged in the magnetic field generation period, the coil L1 generates a magnetic field φ2 varying depending on a resonance frequency of a resonance circuit in accordance with electric charges charged in the capacitance element C in the magnetic detection period. In FIG. 2B, a center of the coil L1 (a dot-and-dash line) is present inside the magnetic field detection coil DY(n). Therefore, electromagnetic coupling is generated between the magnetic field detection coil DY(n) and the coil L1, so that an induced voltage due to mutual induction is generated in the magnetic field detection coil DY(n). As a result, the signal Rx(n) at the other end portion of the magnetic field detection coil DY(n) varies depending on the electric charges charged in the capacitance element C. The unit detection circuit coupled to the magnetic field detection coil DY(n) outputs the variation of the signal Rx(n) as a detection signal. Accordingly, whether or not the pen Pen has been in proximity (in touch), and its coordinates can be extracted. The detection signal varies depending on the quantity of electric charges, so that a distance between the pen Pen and the coil can be acquired.

FIG. 2C illustrates the magnetic field generation period which has been shifted following FIG. 2B. A difference from FIG. 2A is that the magnetic field drive signal CLK is supplied to the magnetic field generation coil GX(n+1). A position of the pen Pen remains unchanged, so that no induced voltage is generated in the coil L1, and the capacitance element C is not charged in the magnetic field generation period illustrated in FIG. 2C. Accordingly, it is detected in the magnetic field detection period which is shifted following FIG. 2C that the stylus pen Pen has not been in proximity. After that, the detection of the pen Pen is performed similarly.

<Principle of Electric Field Detection>

Figure 3A:
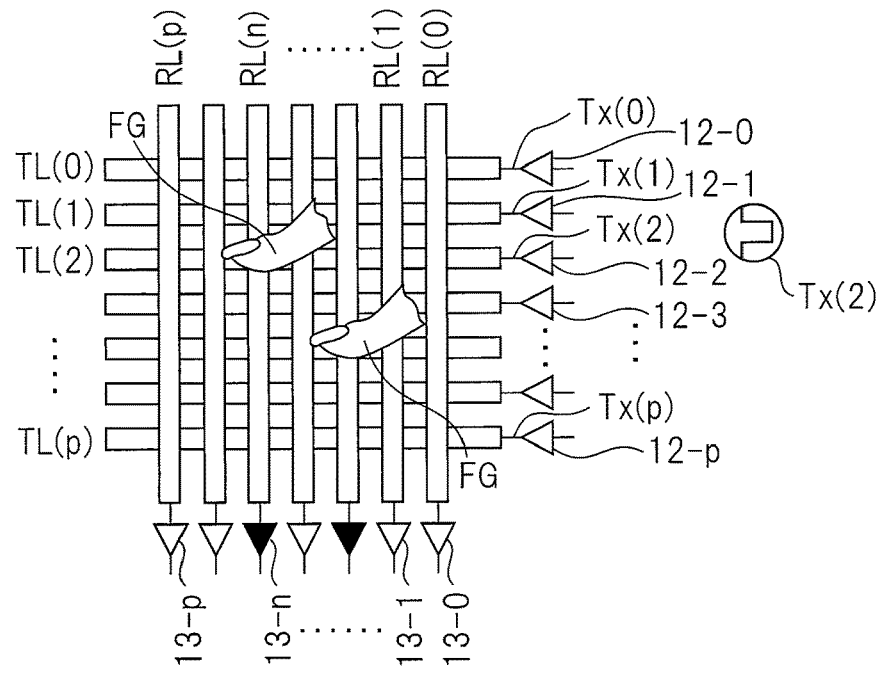
FIG. 3A is an explanatory diagram showing the principle of electric field detection.
Figure 3B:
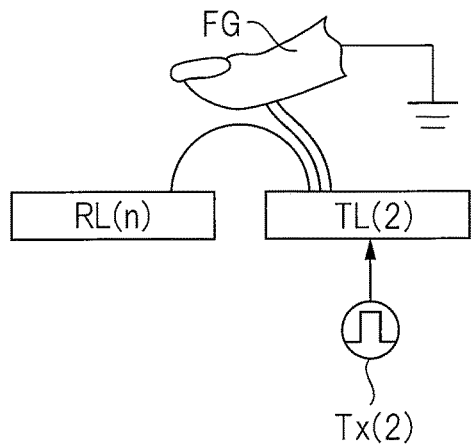
FIG. 3B is an explanatory diagram showing the principle of electric field detection.
Figure 3C:
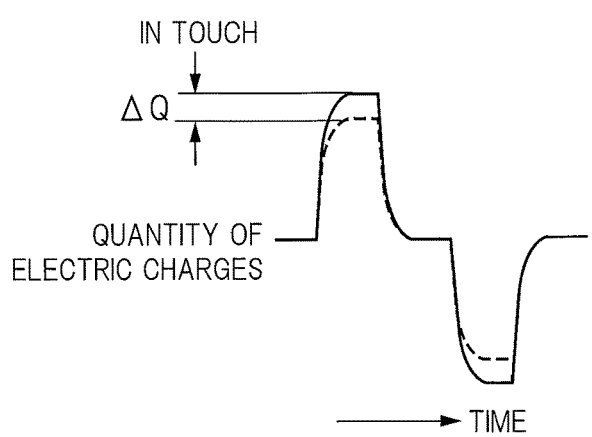
FIG. 3C is an explanatory diagram showing the principle of electric field detection.

FIGS. 3A to 3C are explanatory diagrams for describing the principle of the electric field detection. In FIG. 3A, reference numerals "12-0" to "12-p" each denote a unit drive circuit that outputs an electric field drive signal, and reference numerals "13-0" to "13-p" each denote a unit detection circuit. In FIG. 3A, a pulse signal surrounded with a circle of a solid line indicates a waveform of an electric field drive signal Tx(2) supplied to the drive electrode TL(2). A finger is denoted by "FG" as an external object.

When the electric field drive signal Tx(2) is supplied to the drive electrode TL(2), an electric field is generated between the drive electrode TL(2) and the detection electrode RL(n) orthogonal to the drive electrode TL(2) as illustrated in FIG. 3B. At this time, when the finger FG has touched the proximity of the drive electrode TL(2), an electric field is generated also between the finger FG and the drive electrode TL(2), so that the electric field generated between the drive electrode TL(2) and the detection electrode RL(n) decreases. Accordingly, the quantity of electric charges decreases between the drive electrode TL(2) and the detection electrode RL(n). As a result, as illustrated in FIG. 3C, the touch of the finger FG is less than no touch by ΔQ in the quantity of electric charges generated depending on a supply of the electric field drive signal Tx(2). A difference in the quantity of electric charges appears as a difference in voltage, and the difference in voltage is supplied to the unit detection circuit 13-n and outputted as a detection signal.

Similarly also regarding the other drive electrodes, the variation in the voltage of a signal depending on whether the finger FG is touched or not is generated by supplying the electric field drive signal in the detection electrodes RL(0) to RL(p), and is outputted as a detection signal. Accordingly, whether the finger FG has touched or not, and the coordinates thereof can be extracted.

As described above, the magnetic field drive signal is supplied to a drive electrode selected from the drive electrodes TL(0) to TL(p) in the magnetic field detection, and the electric field drive signal is supplied to the selected drive electrode in the electric field detection. Meanwhile, a display drive signal is supplied to each of the drive electrodes TL(0) to TL(p) at a time of display. By the display drive signals, each of the drive electrodes TL(0) to TL(p) has the same voltage, so that the drive electrodes TL(0) to TL(p) can be regarded as one common electrode.

<Entire Configuration of Display Device>

Figure 4:
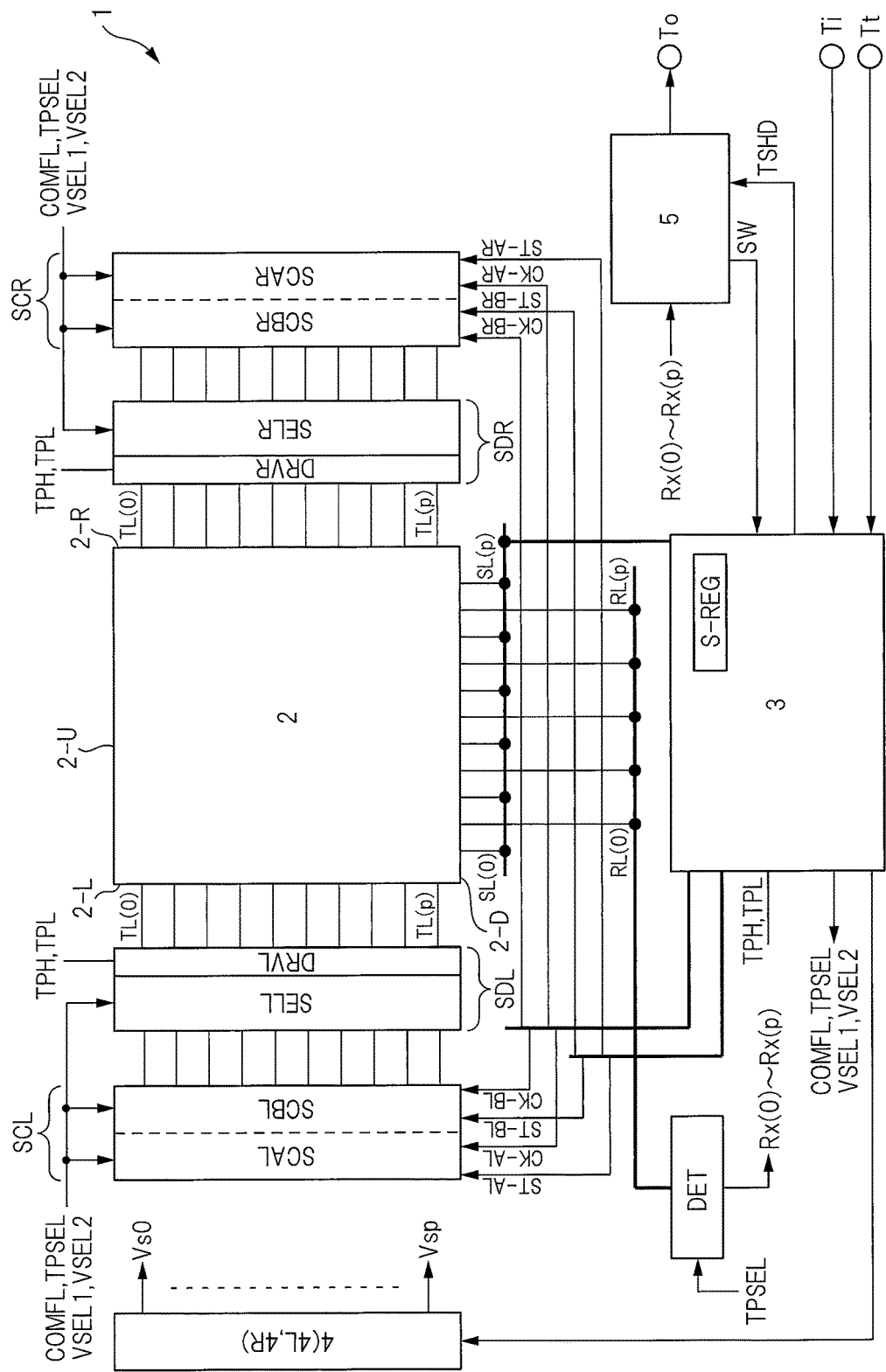
FIG. 4 is a block diagram showing a configuration of a display device according to a first embodiment.

FIG. 4 is a block diagram of a configuration of the display device 1 according to the first embodiment. In FIG. 4, the display device 1 includes a display panel (a liquid crystal panel), a control device 3, a gate driver 4 (a first gate driver 4L and a second gate driver 4R), and a touch control device 5. The display device 1 also includes a first scanner circuit pair SCL, a second scanner circuit pair SCR, a first selection drive circuit SDL, a second selection drive circuit SDR, and a detection circuit DET. The display panel includes a display area for display and a frame area on the periphery thereof. In terms of the display, the display area is an active area and the frame area surrounding the display area is an inactive area. In FIG. 4, reference numeral "2" denotes the display area.

The display area 2 includes a pixel array in which a plurality of pixels are disposed in a matrix. A plurality of signal lines, the plurality of drive electrodes, a plurality of scanning lines, and the plurality of detection electrodes are disposed in the pixel array. As to be described with reference to FIG. 4, the signal lines SL(0) to SL(p) extend in a longitudinal direction (in a column direction) and are disposed in parallel in a lateral direction (in a row direction) in the pixel array. The drive electrodes TL(0) to TL(p) are disposed to extend in the lateral direction and are disposed in parallel in the longitudinal direction. Furthermore, the scanning lines extend in the lateral direction and are disposed in parallel in the longitudinal direction, and the detection electrodes RL(0) to RL(p) extend in the longitudinal direction and are disposed in parallel in the lateral direction. In this case, the pixels are disposed in spaces formed by crossing of a plurality of signal lines and a plurality of scanning lines. In a period for display (a display period), the pixel is selected by the signal line and the scanning line, and the voltage of the signal line and the voltage of the drive electrode at the selection are applied to the selected pixel, so that the display is performed based on a difference in voltage between the signal line and the drive electrode.

The control device 3 receives a timing signal supplied to an external terminal Tt, and image information supplied to an input terminal Ti, and forms, in the display period, an image signal based on the image information so as to supply the image signal to the plurality of signal lines SL(0) to SL(p). The control device 3 receives the timing signal supplied to the external terminal Tt and a control signal SW from the touch control device 5, and forms various signals. Only signals necessary for the descriptions among the signals formed by the control device 3 are representatively illustrated in FIG. 4. That is, the control device 3 forms a synchronization signal TSHD, drive signals TPH and TPL, a control signal COMFL, a detection timing signal TPSEL, and state selection signals VSEL1 and VSEL2. The control device 3 forms shift clock signals CK-AR, CK-BR, CK-AL, and CK-BL, and start signals ST-AR, ST-BR, ST-AL, and ST-BL.

According to the first embodiment, the control device 3 includes a separation-amount register S-REG although the present embodiment is not particularly limited thereto. On the basis of information stored in the separation-amount register S-REG, the control device 3 forms the start signals ST-AR, ST-BR, ST-AL, and ST-BL, and the shift clock signals.

The synchronization signal TSHD identifies a display period of performing the display in the display area 2 and a touch detection period of performing the touch detection. The control device 3 controls, by the synchronization signal TSHD, the touch control device 5 so as to operate in the touch detection period.

In performing the display, the gate driver 4 forms scanning line signals Vs0 to Vsp in accordance with the timing signal from the control device 3, and supplies the scanning line signals to the scanning lines in the display area 2. In the display period, the pixel connected to the scanning line, to which a high-level scanning line signal is supplied, is selected, and then the selected pixel performs the display based on the image signal supplied to the signal lines SL(0) to SL(p).

In the magnetic field touch detection and the electric field touch detection, the detection circuit DET detects variations in the signals at the detection electrodes RL(0) to RL(p), and outputs the variations as detection signals Rx(0) to Rx(p).

The touch control device 5 receives the detection signals Rx(0) to Rx(p), extracts the coordinates of a position that has been touched, and outputs the coordinates from an external terminal To. The touch control device 5 outputs the control signal SW, simultaneously receives the synchronization signal TSHD, and operates in synchronization with the control device 3.

The display area 2 includes sides 2-U and 2-D in parallel to a row of the pixel array and sides 2-R and 2-L in parallel to a column of the pixel array. Here, the side 2-U and the side 2-D oppose each other, and the plurality of drive electrodes and the plurality of scanning lines in the pixel array are disposed between the two sides. The side 2-R and the side 2-L also oppose each other, and the plurality of signal lines and the plurality of detection electrodes in the pixel array are disposed between the two sides.

The first scanner circuit pair SCL and the first selection drive circuit SDL are disposed along the side 2-L of the display area 2 so as to be in proximity to first ends of the plurality of drive electrodes, and the first selection drive circuit SDL is coupled to the respective first ends of the drive electrodes TL(0) to TL(p) on the side 2-L. Similarly, the second scanner circuit pair SCR and the second selection drive circuit SDR are disposed along the side 2-R of the display area 2 so as to be in proximity to second ends of the plurality of drive electrodes, and the second selection drive circuit SDR is coupled to the respective second ends of the drive electrodes TL(0) to TL(p) on the side 2-R.

The first scanner circuit pair SCL includes a pair of a first scanner circuit SCAL and a second scanner circuit SCBL, and the first selection drive circuit SDL includes a selection circuit SELL and a drive circuit DRVL. Similarly, the second scanner circuit pair SCR includes a pair of a third scanner circuit SCAR and a fourth scanner circuit SCBR, and the second selection drive circuit SDR includes a selection circuit SELR and a drive circuit DRVR.

The first scanner circuit pair SCL, the second scanner circuit pair SCR, the first selection drive circuit SDL, and the second selection drive circuit SDR select a desired drive electrode(s) from the drive electrodes TL(0) to TL(p) in the magnetic field touch detection to supply the magnetic field drive signal and the grounding voltage to the selected drive electrode, and also select a desired drive electrode(s) in the electric field detection to supply the electric field drive signal to the selected drive electrode. Therefore, in the magnetic field touch detection and the electric field touch detection, a configuration of a drive circuit that drives the drive electrode can be regarded as being formed by the first scanner circuit pair SCL, the second scanner circuit pair SCR, the first selection drive circuit SDL, and the second selection drive circuit SDR.

The first scanner circuit pair SCL, the second scanner circuit pair SCR, the first selection drive circuit SDL, and the second selection drive circuit SDR will be described in detail with figures later, and so any further descriptions thereof are omitted here.

<Module Configuration of Display Device>

Figure 5:
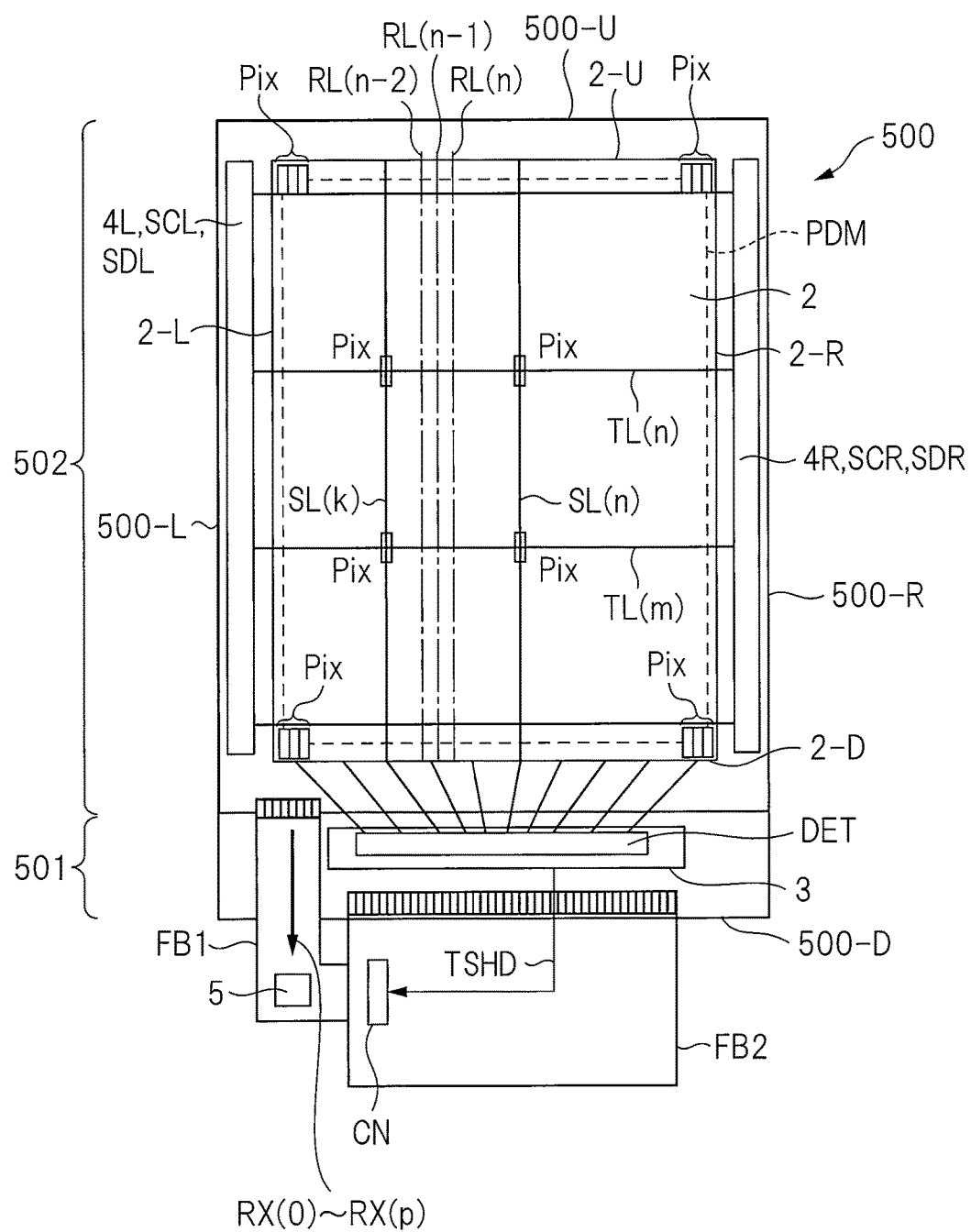
FIG. 5 is a plan view showing a configuration of a module according to the first embodiment.

FIG. 5 is a schematic plan view of an entire configuration of a module 500 equipped with the display device 1. FIG. 5 is drawn to correspond to an actual arrangement. In the figure, reference numeral "501" denotes an area of the first substrate TGB illustrated in FIG. 1, and reference numeral "502" denotes an area in which the first substrate TGB and the second substrate CGB are layered. In the module 500, the first substrate TGB is integrated into the areas 501 and 502. In the area 502, the second substrate CGB is mounted on the first substrate TGB so that the first main surface TSF1 of the first substrate TGB and the second main surface CSF2 of the second substrate CGB oppose each other. In FIG. 5, reference numerals "500-U" and "500-D" denote the short sides of the module 500, and reference numerals "500-L" and "500-R" denote long sides of the module 500.

The first gate driver 4L, the first scanner circuit pair SCL, and the first selection drive circuit SDL illustrated in FIG. 4 are disposed in a frame area between the side 2-L of the display area 2 and the side 500-L of the module 500 in the area 502. The second gate driver 4R, the second scanner circuit pair SCR, and the second selection drive circuit SDR illustrated in FIG. 4 are disposed in a frame area between the side 2-R of the display area 2 and the side 500-R of the module 500. The detection circuit DET and the control device 3 illustrated in FIG. 4 are disposed in a frame area between the side 2-D of the display area 2 and the side 500-D of the module 500. The detection circuit DET includes a wiring(s) and components formed on the first main surface TSF1 of the first substrate TGB in the area 501.

When seen from a plan view, the control device 3 is mounted on the first substrate TGB so as to cover the detection circuit DET. Wirings and components configuring the first scanner circuit pair SCL, the second scanner circuit pair SCR, the first selection drive circuit SDL, and the second selection drive circuit SDR are also formed on the first main surface TSF1 of the first substrate TGB in the area 502.

The detection signals Rx(0) to Rx(p) described in FIG. 4 are supplied to the touch control device 5 through a wiring(s) in a flexible cable FB1. A flexible cable FB2 is coupled to the area 501, so that transmission and reception of a signal are performed between the touch control device 5 and the control device 3 through a connector CN provided in the flexible cable FB2.

As already described, the display area 2 includes: the pixel array in which the plurality of pixels are disposed in the matrix form; the plurality of drive electrodes TL(0) to TL(p) and the scanning lines disposed along the row of the pixel array; and the plurality of signal lines SL(0) to SL(p) and the plurality of detection electrodes RL(0) to RL(p) disposed along the column of the array. FIG. 5 illustrates, as an example, two drive electrodes TL(n) and TL(m), two signal lines SL(k) and SL(n), and three detection electrodes RL(n−2) to RL(n). Incidentally, although the scanning lines are omitted in FIG. 5, the scanning lines extend in parallel to the exemplified drive electrodes TL(n) and TL(m).

In FIG. 5, the pixel array is illustrated as a broken line PDM, and the pixels disposed at the four corners of the display area 2 and the pixels disposed at crossing portions of the exemplified drive electrodes and signal lines among the plurality of pixels disposed in the pixel array PDM are denoted with "Pix".

<Making Electromagnetic-Induction-Method Input Detection Device in-Cell Type>

Figure 8:
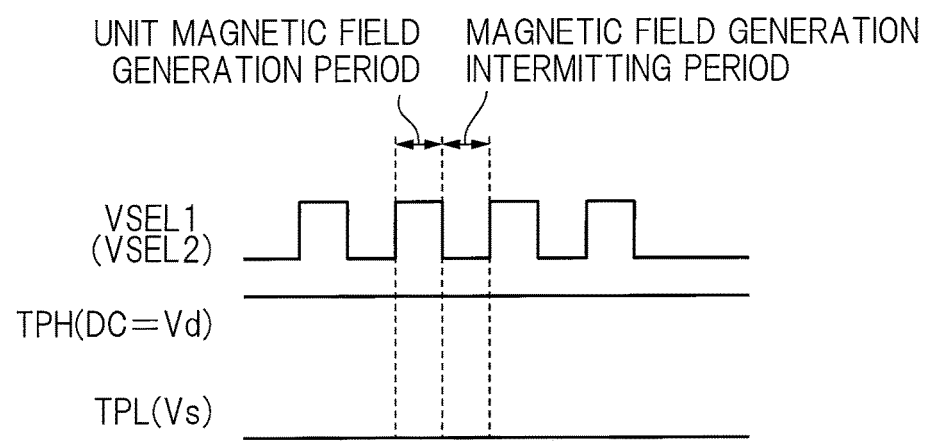
FIG. 8 is a waveform chart for describing the magnetic field touch detection due to the electromagnetic induction method according to the first embodiment.
Figure 9:
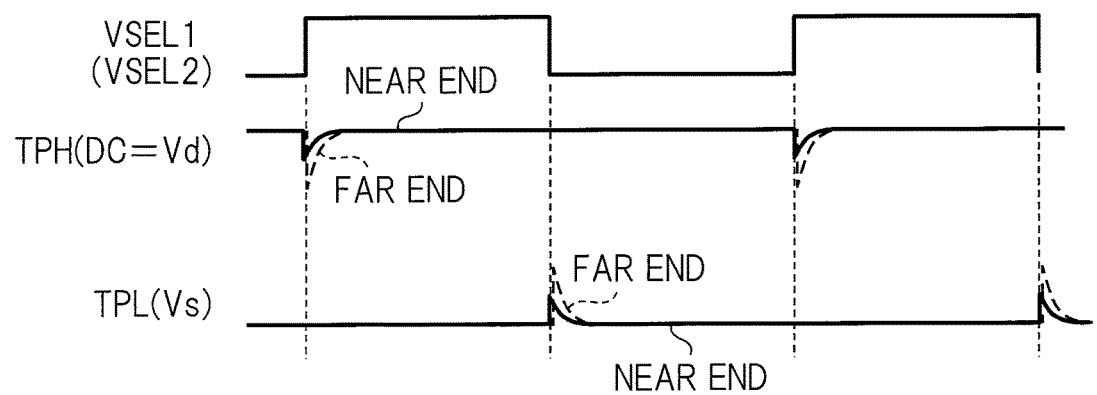
FIG. 9 is a waveform chart for describing a waveform difference between a near end and a far end in the magnetic field touch detection due to the electromagnetic induction method according to the first embodiment.
Figure 10:
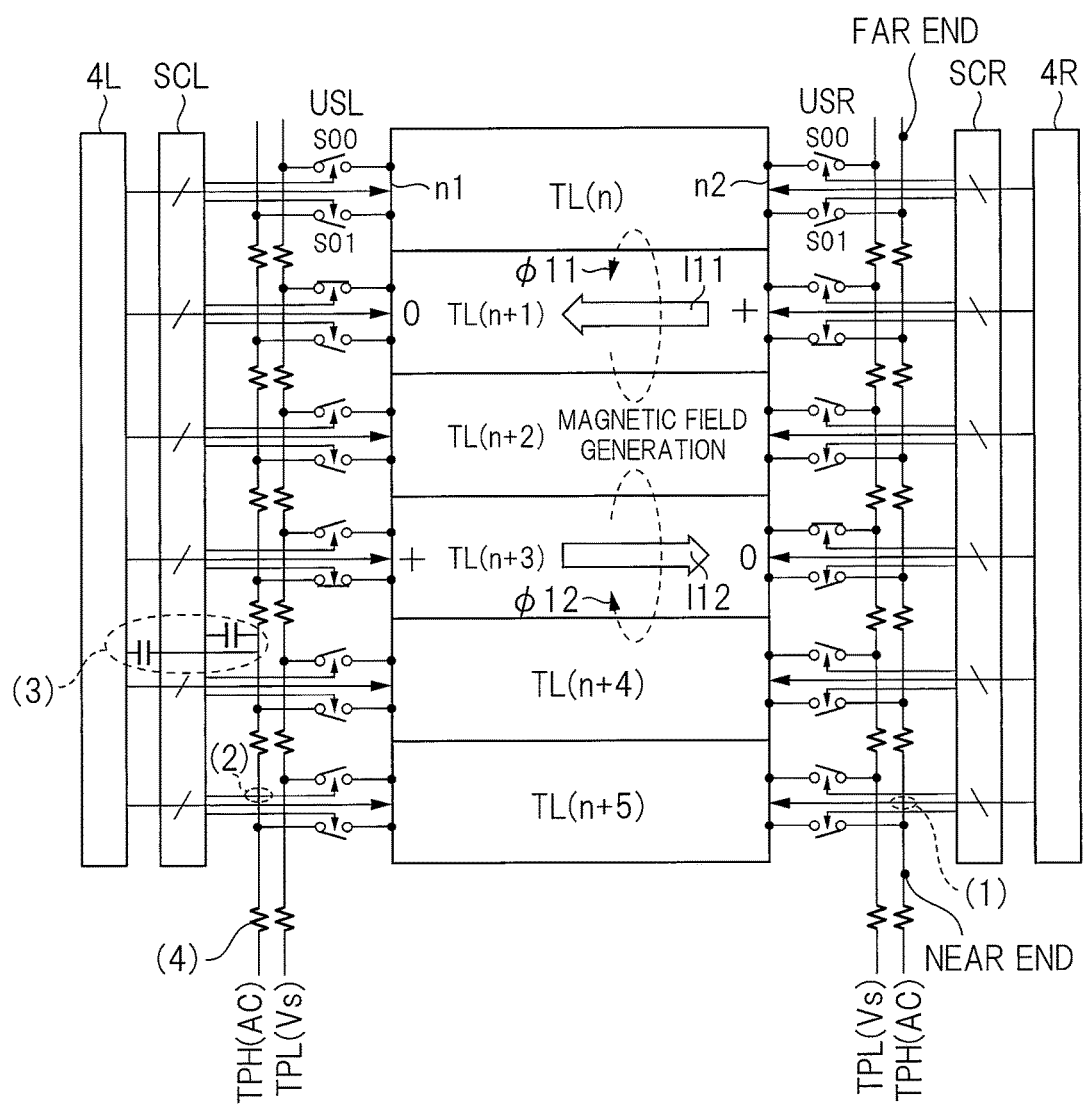
FIG. 10 is an explanatory diagram for describing a unit magnetic field generation period of magnetic field touch detection due to an electromagnetic induction method according to a comparative example to the first embodiment.
Figure 11:
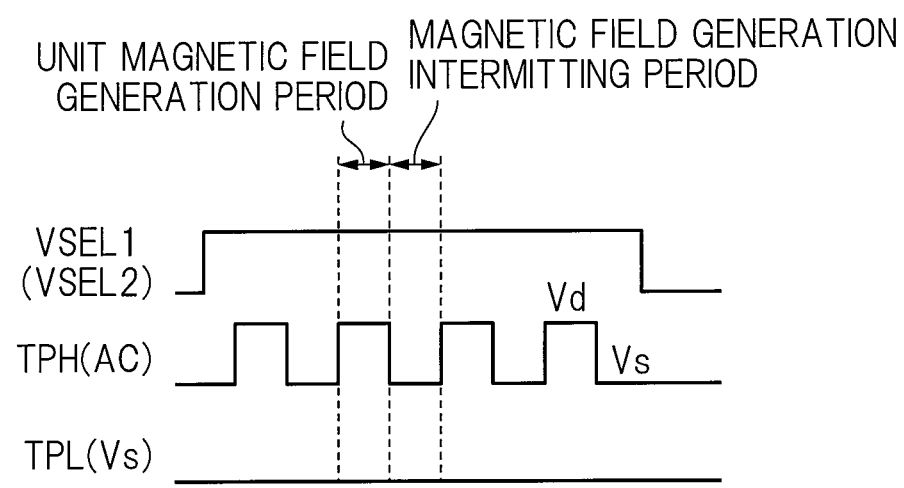
FIG. 11 is a waveform chart for describing the magnetic field touch detection due to the electromagnetic induction method according to the comparative example to the first embodiment.
Figure 12:
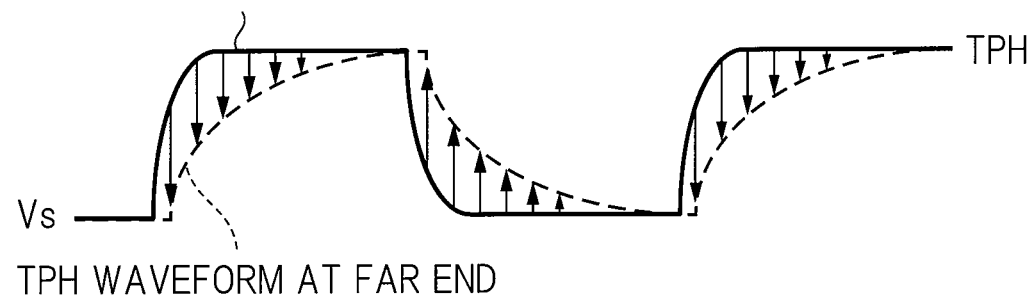
FIG. 12 is a waveform chart for describing a waveform difference between a near end and a far end in the magnetic field touch detection due to the electromagnetic induction method according to the comparative example to the first embodiment.

FIGS. 6 to 12 are explanatory diagrams for describing a case where a magnetic field is generated by an in-cell type display device that installs an electromagnetic-induction-method input detection device. The in-cell type display device that installs the electromagnetic-induction-method input detection device generates a magnetic field by using the drive electrodes TL(0) to TL(p) and the drive circuits for the drive electrodes illustrated in FIGS. 4 and 5. In the above, FIGS. 6 to 9 are explanatory diagrams relating to the first embodiment, and FIGS. 10 to 12 are explanatory diagrams about a comparative example to the first embodiment. In order to prevent the drawings from being complicated, FIGS. 6, 7, and 10 each illustrate only portions of the first gate driver 4L, the second gate driver 4R, the first scanner circuit pair SCL, the second scanner circuit pair SCR, the first selection drive circuit SDL, and the second selection drive circuit SDR that correspond to the drive electrodes TL(n) to TL(n+5) among the drive electrodes TL(0) to TL(p) disposed in the display area 2.

The first gate driver 4L, the second gate driver 4R, the first scanner circuit pair SCL, the second scanner circuit pair SCR, the first selection drive circuit SDL, and the second selection drive circuit SDR are disposed in the frame areas as illustrated in FIG. 5. The first gate driver 4L, the first scanner circuit pair SCL, and the first selection drive circuit SDL are disposed along the side 2-L of the display area 2 in the frame area between the side 2-L of the display area 2 and the side 500-L of the module 500. The first scanner circuit pair SCL includes the first scanner circuit SCAL and the second scanner circuit SCBL. The first selection drive circuit SDL includes unit drive circuits USL, a first wiring TPH, and a second wiring TPL. The second gate driver 4R, the second scanner circuit pair SCR, and the second selection drive circuit SDR are disposed along the side 2-R of the display area 2 in the frame area between the side 2-R of the display area 2 and the side 500-R of the module 500. The second scanner circuit pair SCR includes the third scanner circuit SCAR and the fourth scanner circuit SCBR. The second selection drive circuit SDR includes unit drive circuits USR, the first wiring TPH, and the second wiring TPL.

In a capacitance method, the mass production of in-cell typed touch panels each integrated into a display device and each sharing electrodes and drive circuits with the display device has been advanced. The in-cell type touch panels are more advantageous than on-cell type touch panels in terms of a reduction in costs and a reduction in a thickness of a panel, etc. Meanwhile, in an electromagnetic induction method, on-cell typed touch panels are mainstream, which causes a rise in costs and an increase in the thickness of the panel. Therefore, making the touch panel an in-cell type is an effective measure even in the electromagnetic induction method.

However, when the electromagnetic-induction-method touch panel is made the in-cell type, the signal wirings for supplying the magnetic field drive signal CLK described in FIG. 2 are required to be drawn around the frame area on the periphery of the display area. This causes generation of the magnetic field from the signal wirings, and occurrence of a noise source. Therefore, the present inventor has considered achievement of the noise reduction when the touch panel is made an in-cell type in both of the electromagnetic induction method and the capacitance method. The first embodiment is to provide the input detection device capable of achieving the noise reduction when the touch panel is made an in-cell type in both of the electromagnetic induction method and the capacitance method.

First, a comparative example to the first embodiment will be described in order to simplify a feature(s) of the display device 1 according to the first embodiment. FIGS. 10 to 12 are explanatory diagrams for describing, in a magnetic field generation period, an operation of a display device according to the comparative example to the first embodiment. FIG. 10 is an explanatory diagram for describing the unit magnetic field generation period of the magnetic field touch detection in the electromagnetic induction method, FIG. 11 shows a waveform chart, and FIG. 12 is an explanatory diagram for describing a waveform difference between a near end and a far end.

In the magnetic field generation period during which a touch state selection signal VSEL1 (VSEL2) is at the high level, the display device according to the comparative example illustrated in FIG. 11 alternately repeats: a unit period (a unit magnetic field generation period) during which a magnetic field is generated due to a current flowing (varied) by inputting an alternating-current waveform drive signal supplied to a first wiring TPH from one end portion of the selected drive electrode and inputting a direct-current predetermined voltage supplied to a second wiring TPL from the other end portion; and a period (a magnetic field generation intermitting period) during which the generation of the magnetic field is intermitted with no current flowing. The alternating-current waveform drive signal AC supplied to the first wiring TPH is, for example, a signal (AC) having a value periodically varying between a second voltage Vs such as a grounding voltage and a first voltage Vd higher than the second voltage Vs. Meanwhile, the drive signal supplied to the second wiring TPL is, for example, the second voltage Vs such as the grounding voltage.

In FIG. 11, a magnetic field is generated when the voltage of the drive signal AC is Vd, and the generation of the magnetic field is intermitted when the voltage of the drive signal AC is Vs.

FIG. 10 illustrates a state of the unit magnetic field generation period of FIG. 11, and the selected second drive electrode TL(n+1) inputs, from the second end n2 thereof, the voltage Vd of the alternating-current waveform drive signal (AC) supplied to the first wiring TPH, and inputs, from the first end n1 thereof, the grounding voltage Vs supplied to the second wiring TPL. Simultaneously, the selected first drive electrode TL(n+3) inputs, from the first end n1 thereof, the voltage Vd of the alternating-current waveform drive signal (AC) supplied to the first wiring TPH, and inputs, from the second end n2 thereof, the grounding voltage Vs supplied to the second wiring TPL.

In this case, the selected second drive electrode TL(n+1) generates a magnetic field φ11 due to a current I11 flowing from the second end n2 to the first end n1, and simultaneously the selected first drive electrode TL(n+3) generates a magnetic field φ12 due to a current I12 flowing from the first end n1 to the second end n2. The magnetic field φ11 and the magnetic field φ12 are superimposed in an area of the non-selected drive electrode TL(n+2) interposed between the first drive electrode TL(n+3) and the second drive electrode TL(n+1) that have been selected.

The following capacity components are formed in the first wiring TPH in a case of the comparative example illustrated in FIG. 10: (1) parasitic capacitance (the number of scanning lines) of a crossing portion with the scanning lines coupled to gate drivers 4L and 4R, (2) parasitic capacitance (the number of drive electrode stages×2) of a crossing portion with the switch control lines coupled to a scanner circuit pair SCL and SCR, (3) parasitic capacitance of an adjacent portion with wirings of a power source etc. used for the scanner circuit pair SCL and SCR extending alongside, and (4) wiring resistance. Incidentally, FIG. 10 illustrates (1), (2), (3), and (4) indicating the capacity components of the first wiring TPH only on any one of the left side and the right side, but the capacity components of the first wiring TPH are actually based on both of the left side and the right side. Accordingly, when the alternating-current waveform signal is supplied to the first wiring TPH, an amplitude of the alternating-current waveform signal is necessary to vary from the voltage Vs to the voltage Vd in a state where the loads have been formed, so that a frequency of the alternating-current waveform signal flowing through the first wiring TPH decreases. As a result, a decrease in a touch characteristic occurs due to a decrease in an output value of the detection signal (a decrease of a pulse number) in the detection electrode RL.

The first wiring TPH includes the capacity components of the above (1), (2), (3), and (4) in the case of the comparative example illustrated in FIG. 10, and a delay difference in waveform occurs between the near end close to the control device 3 as a voltage supply source and the far end far away from the control device 3 as illustrated in FIG. 12.

A waveform at the far end has a mild rise in comparison with a waveform at the near end since the far end has many capacity components. As a result, a period to reach the voltage Vd and a period to reach the voltage Vs at the far end become longer than those at the near end, so that time necessary for one variation in the alternating-current waveform lengthens. Note that, the near end is illustrated as a position corresponding to the drive electrode TL(n+5) and the far end is illustrated as a position corresponding to the drive electrode TL(n) in the first wiring TPH illustrated in FIG. 10, but the near end is a position corresponding to the drive electrode TL(p) and the far end is a position corresponding to the drive electrode TL(0) in the first embodiment. In this manner, when a difference in a signal waveform flowing through the first wiring occurs between the near end and the far end, a current flows through the first wiring TPH itself and the current varies. As a result, an unnecessary magnetic field occurs, and becomes a noise source.

Figure 6:
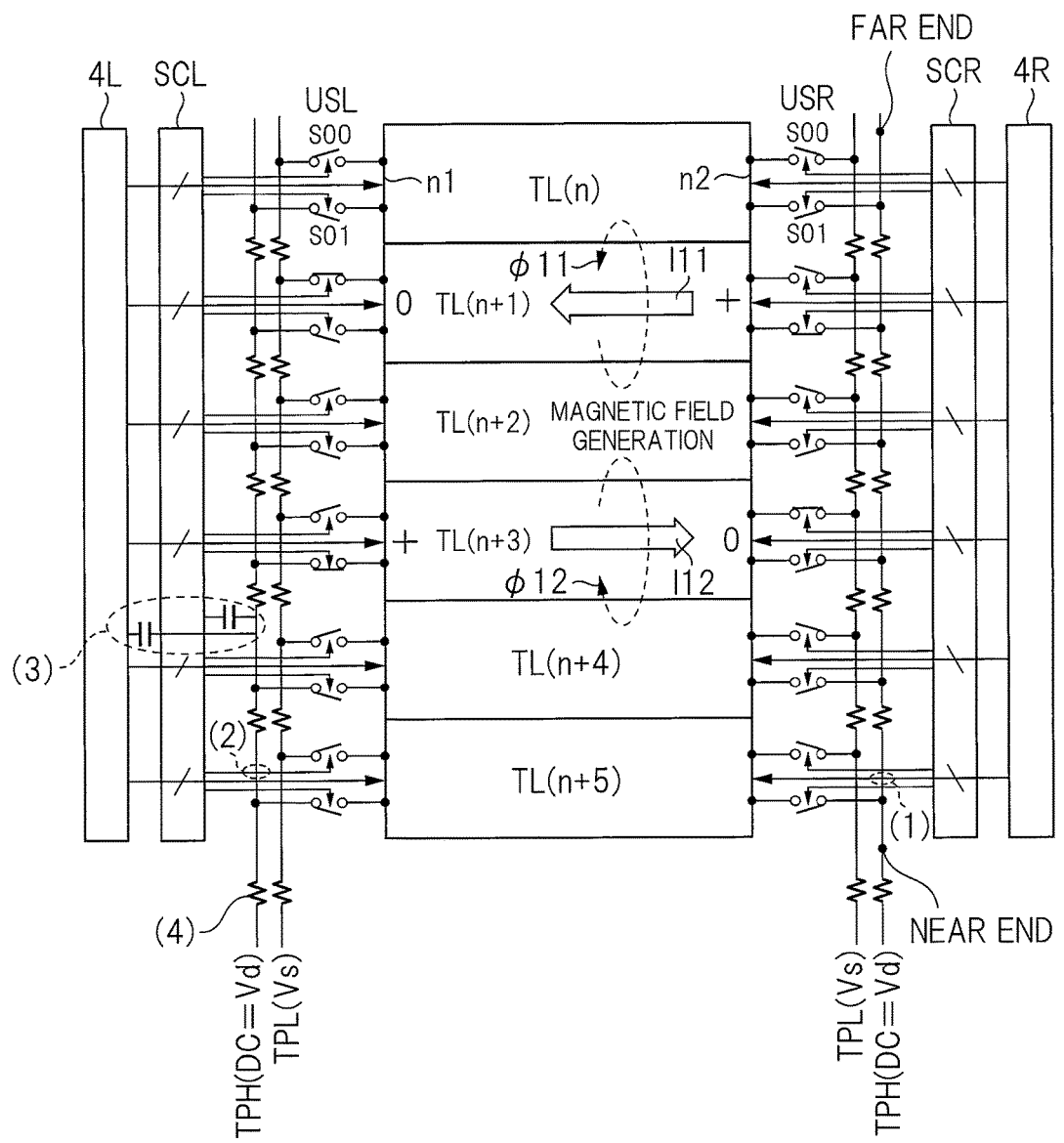
FIG. 6 is an explanatory diagram for describing a unit magnetic field generation period of magnetic field touch detection due to an electromagnetic induction method according to the first embodiment.
Figure 7:
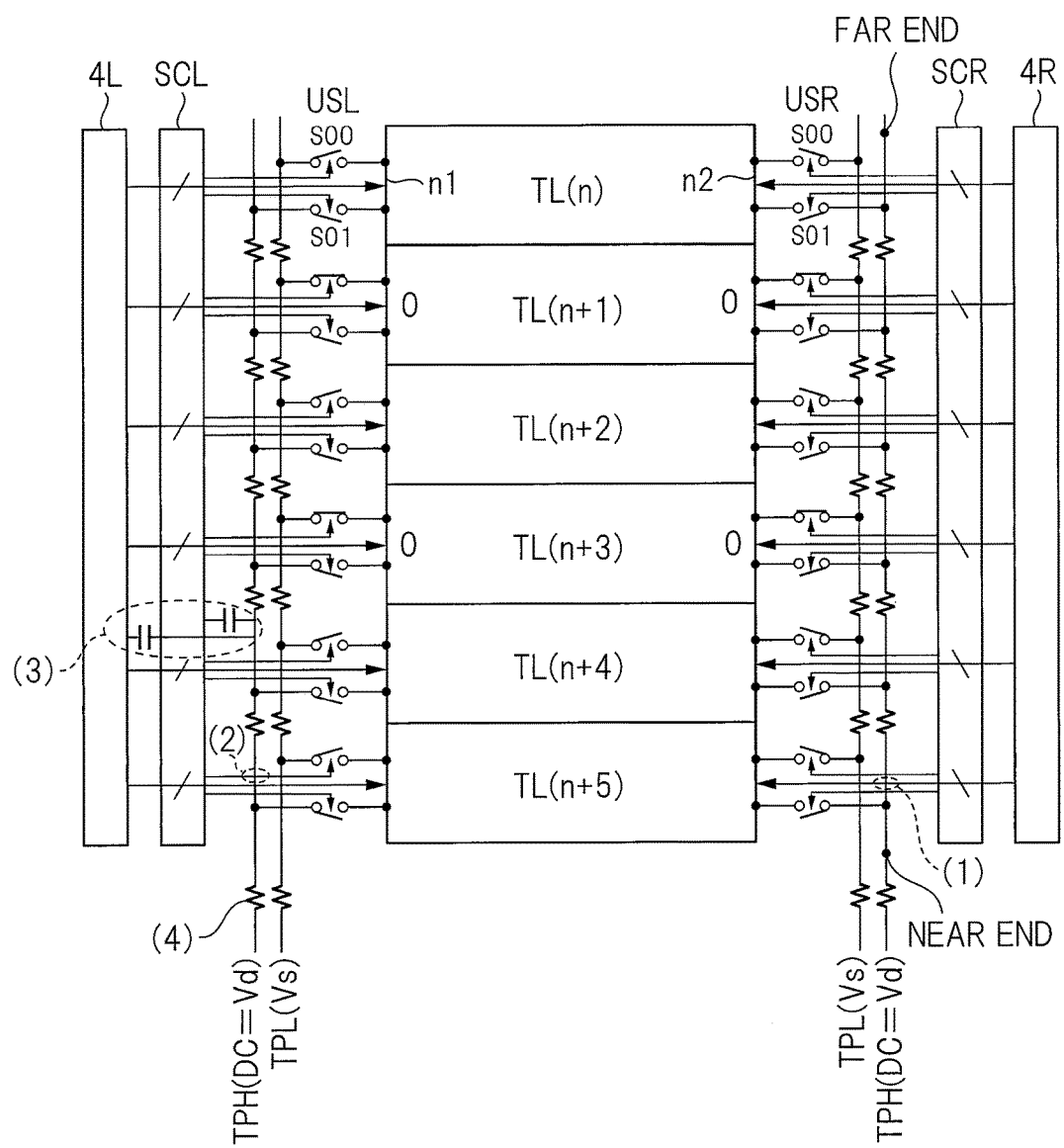
FIG. 7 is an explanatory diagram for describing a magnetic field generation intermitting period of the magnetic field touch detection due to the electromagnetic induction method according to the first embodiment.

Therefore, the first embodiment is devised as illustrated in FIGS. 6 to 9. FIGS. 6 to 9 are explanatory diagrams about an operation of the display device 1 according to the first embodiment in the magnetic field generation period. FIG. 6 is an explanatory diagram for describing a unit magnetic field generation period of the magnetic field touch detection due to the electromagnetic induction method; FIG. 7 is an explanatory diagram for describing a magnetic field generation intermitting period of the magnetic field touch detection in the electromagnetic induction method; FIG. 8 shows a waveform chart; and FIG. 9 is an explanatory diagram for describing a waveform difference between the near end and the far end.

According to the first embodiment, as illustrated in FIG. 8, a drive signal supplied to the first wiring TPH is a direct-current voltage. The direct-current voltage drive signal is a signal (DC) having a first voltage Vd higher than a second voltage Vs, such as an grounding voltage. That is, according to the first embodiment, the first wiring TPH supplies the first voltage Vd to a drive electrode, and the second wiring TPL supplies the second voltage Vs to the drive electrode. The first voltage Vd and the second voltage Vs each are a direct-current voltage. In addition, in the magnetic field generation period according to the first embodiment, an alternating-current signal is supplied to one end portion of the drive electrode by: varying the touch state selection signal VSEL1 (VSEL2) a plurality of times in a predetermined cycle; alternately selecting the first wiring TPH and the second wiring TPL in synchronization with the cycle; and alternately changing the first voltage Vd of the first wiring TPH and the second voltage Vs of the second wiring TPL. During the magnetic field generation period, the second voltage Vs is supplied from the second wiring TPL to the other end of the drive electrode. In this case, the touch state selection signal VSEL1 (VSEL2) is at the high level in the unit magnetic field generation period, and is at the low level in the magnetic field generation intermitting period.

At this time, the alternating-current signal supplied to the drive electrode corresponds to the magnetic field drive signal of FIG. 2, and the frequency of the touch state selection signal VSEL1 (VSEL2) corresponds to the frequency of the magnetic field drive signal.

According to the first embodiment, in FIG. 6 illustrating the unit magnetic field generation period, the first voltage Vd supplied to the first wiring TPH is supplied from the second end portion n2 thereof to the selected second drive electrode TL(n+1), and the second voltage Vs supplied to the second wiring TPL is supplied from the first end portion n1 of thereof to the selected drive electrode TL(n+1). Simultaneously, the first voltage Vd supplied to the first wiring TPH is supplied from the first end n1 thereof to the selected first drive electrode TL(n+3), and the second voltage Vs supplied to the second wiring TPL is supplied from the second end n2 thereof to the selected first drive electrode TL(n+3). In FIG. 6, the first voltage Vd supplied to the first wiring TPH is denoted with "+" and the second voltage Vs supplied to the second wiring TPL is denoted with "0".

In this case, the selected second drive electrode TL(n+1) generates a magnetic field φ11 by the current I11 flowing from the second end n2 thereof to the first end n1 due to a voltage difference therebetween, and simultaneously the selected first drive electrode TL(n+3) generates a magnetic field φ12 by the current I12 flowing from the first end n1 to the second end n2 due to a voltage difference therebetween. Those magnetic fields are superimposed in the area of the non-selected drive electrode TL(n+2) interposed between the second drive electrode TL(n+1) and the first drive electrode TL(n+3).

According to the first embodiment, in FIG. 7 illustrating the magnetic field generation intermitting period, the second voltage Vs supplied to the second wiring TPL is supplied from a pair of first end n1 and second end n2 thereof to the selected drive electrodes TL(n+1) and TL(n+3). In this case, the selected drive electrodes TL(n+1) and TL(n+3) each have no voltage difference between the first end n1 and the second end n2, so that no current flows and no magnetic field is generated.

That is, according to the embodiment, in the magnetic field generation period, the first voltage Vd and the second voltage Vs are alternately supplied to the first end n1 of the first drive electrode TL(n+3) and the second end n2 of the second drive electrode TL(n+1), and the second voltage Vs is consecutively supplied to the second end n2 of the first drive electrode TL(n+3) and the first end n1 of the second drive electrode TL(n+1).

According to the first embodiment illustrated in FIGS. 6 and 7, when the drive signal supplied to the first wiring TPH is the direct-current first voltage Vd, the influence of the capacity components (1), (2), (3), and (4) in the comparative example illustrated in FIG. 10 can be considerably reduced. According to the first embodiment, as illustrated in FIG. 9, the waveforms of the first wiring TPH and the second wiring TPL may be distorted in an instant at a switchover of the state selection signal VSEL1 (VSEL2), but when the voltage supplied to the first wiring TPH is a direct-current voltage, electric charges are promptly supplied from a voltage supply source in the control device 3, so that their distortions are inhibited to be considerably small.

As a result, deterioration in a speed (frequency) of the magnetic field drive signal supplied to the drive electrodes TL, is considerably suppressed, so that a detection speed of the magnetic field touch detection can be improved.

According to the first embodiment, as illustrated in FIG. 9, the waveform difference is difficult to occur between the near end and the far end in both of the first wiring TPH and the second wiring TPL. As a result, an unnecessary magnetic field is difficult to generate, so that noises can be reduced.

<Configurations of First Scanner Circuit Pair, Second Scanner Circuit Pair, First Selection Drive Circuit, and Second Selection Drive Circuit>

The first voltage and the second voltage are supplied to the drive electrodes through the first scanner circuit pair, the second scanner circuit pair, the first selection drive circuit, and the second selection drive circuit in the display device 1 according to the first embodiment. Configurations thereof will be described below.

Figure 13:
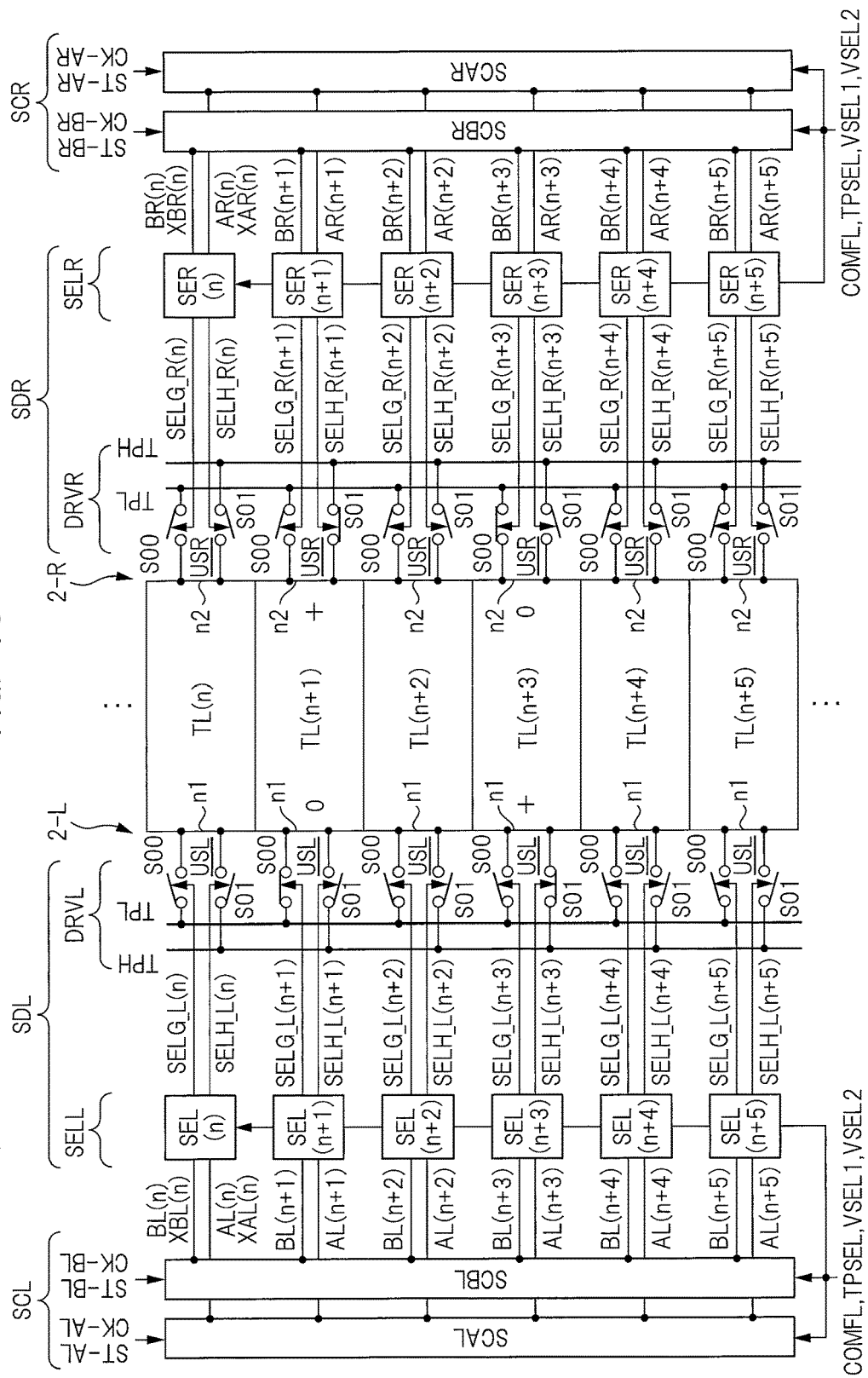
FIG. 13 is a block diagram showing configurations of a first scanner circuit pair, a second scanner circuit pair, a first selection drive circuit, and a second selection drive circuit according to the first embodiment.

FIG. 13 is a block diagram showing the configurations of the first scanner circuit pair SCL, the second scanner circuit pair SCR, the first selection drive circuit SDL, and the second selection drive circuit SDR according to the first embodiment. In order to prevent the drawing from being complicated, FIG. 13 illustrates only portions of the first scanner circuit pair SCL, the second scanner circuit pair SCR, the first selection drive circuit SDL, and the second selection drive circuit SDR that correspond to the drive electrodes TL(n) to TL(n+5) among the drive electrodes TL(0) to TL(p) disposed in the display area 2. The drive electrodes TL(0) to TL(n-1) and TL(n+6) to TL(p) not illustrated in FIG. 13 also have similarly configurations. Here, the portions illustrated in FIG. 13 will be representatively described.

The first selection drive circuit SDL includes the selection circuit SELL and the drive circuit DRVL disposed along the side 2-L of the display area 2. The drive circuit DRVL includes: a plurality of unit drive circuits USL corresponding to the drive electrodes TL(n) to TL(n+5); the first wiring TPH; and the second wiring TPL. The selection circuit SELL also includes unit selection circuits SEL(n) to SEL(n+5) corresponding to the drive electrodes TL(n) to TL(n+5), respectively. The drive electrodes TL(n) to TL(n+5) each include a pair of first end n1 and second end n2.

Each of the unit drive circuits USL has one-to-one correspondence to the unit selection circuits SEL(n) to SEL(n+5), and includes a first switch S01 and a second switch S00. The first switches S01 each are coupled between the first end n1 of the corresponding drive electrode and the first wiring TPH, and the second switches S00 each are coupled to the first end n1 of the corresponding drive electrode and the second wiring TPL. The first switches S01 each are switch-controlled by a first unit selection signal from the corresponding unit selection circuit, and the second switches S00 each are also switch-controlled by a second unit selection signal from the corresponding unit selection circuit. The direct-current first voltage Vd described in FIGS. 6 to 9 is supplied to the first wiring TPH, and the direct-current second voltage Vs is supplied to the second wiring TPL.

The drive electrode TL(n) will be described as an example. The unit selection circuit SEL(n) and the unit drive circuit USL coupled to this unit selection circuit SEL(n) correspond to the drive electrode TL(n). The first end n1 of the drive electrode TL(n) is coupled to the first wiring TPH through the first switch S01 switch-controlled by a first unit selection signal SELH_L(n) from the unit selection circuit SEL(n). The first end n1 of the drive electrode TL(n) is coupled to the second wiring TPL through the second switch S00 switch-controlled by a second unit selection signal SELG_L(n) from the unit selection circuit SEL(n).

That is, the selection circuit SELL including the unit selection circuits SEL(n) to SEL(n+5) couples the first wiring TPH, the second wiring TPL, and the first end n1 of the drive electrode TL(n) through the unit drive circuit USL.

The selection circuit SELL is a first selection circuit according to the present invention.

The first ends n1 of the remaining drive electrodes TL(n+1) to TL(n+5) are also coupled to the first wiring TPH through the first switches S01 switch-controlled by first unit selection signals SELH_L(n+1) to SELH_L(n+5) from the corresponding unit selection circuits SEL(n+1) to SEL(n+5), respectively. The first ends n1 are coupled to the second wiring TPL through the second switches S00 switch-controlled by second unit selection signals SELG_L(n+1) to SELG_L(n+5) from the corresponding unit selection circuits SEL(n+1) to SEL(n+5), respectively.

In the magnetic field touch detection and the electric field touch detection, the selection signals are supplied from the first scanner circuit pair SCL to the unit selection circuits SEL(n) to SEL(n+5) configuring the selection circuit SELL. That is, the pair of first scanner circuit SCAL and second scanner SCBL configuring the first scanner circuit pair SCL supplies the first selection signal and the second selection signal.

That is, the first scanner circuit SCAL and the second scanner SCBL share the unit selection circuits SEL(n) to SEL(n+5) corresponding to the drive electrodes, and supply the first selection signal and the second selection signal, respectively.

According to the first embodiment, the first selection signal is configured by positive-phase first selection signals AL(n) to AL(n+5) and reversed-phase first inverse selection signals XAL(n) to XAL(n+5). Here, the reversed-phase first inverse selection signals XAL(n) to XAL(n+5) are selection signals phase-inverting the positive-phase first selection signals AL(n) to AL(n+5) phase-inversed, respectively. Similarly, the second selection signal is also configured by positive-phase second selection signals BL(n) to BL(n+5) and reversed-phase second inverse selection signals XBL(n) to XBL(n+5) obtained by phase inversion.

In order to prevent the drawing from being complicated, FIG. 13 illustrates, as the reversed-phase first selection signals, only the first inverse selection signal XAL(n) phase-inverting the positive-phase first selection signal AL(n). Similarly, only the second inverse selection signal XBL(n) phase-inverting the positive-phase second selection signal BL(n) is illustrated as the reversed-phase second selection signals. In the following descriptions, the positive-phase first selection signals are referred to as first selection signals, and the reversed-phase first selection signals are referred to as first inverse selection signals. The positive-phase second selection signals are referred to as second selection signals, and the reversed-phase second selection signals are referred to as second inverse selection signals.

The first scanner circuit SCAL and the second scanner circuit SCBL each include a shift register in which a plurality of shift stages are coupled in series, and the shift clock signal CK-AL and the start signal ST-AL, and, the shift clock signal CK-BL and the start signal ST-BL are supplied to the respective shift registers.

Figure 14A:
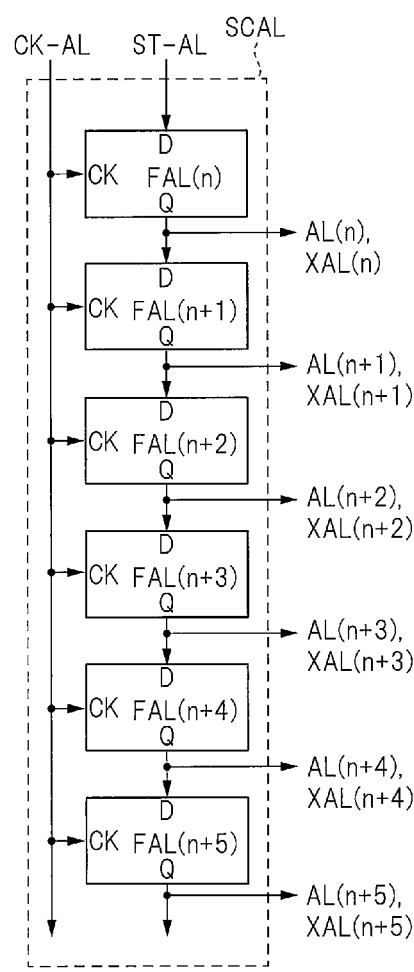
FIG. 14A is a block diagram schematically illustrating configurations of a first scanner circuit and a second scanner circuit according to the first embodiment.
Figure 14B:
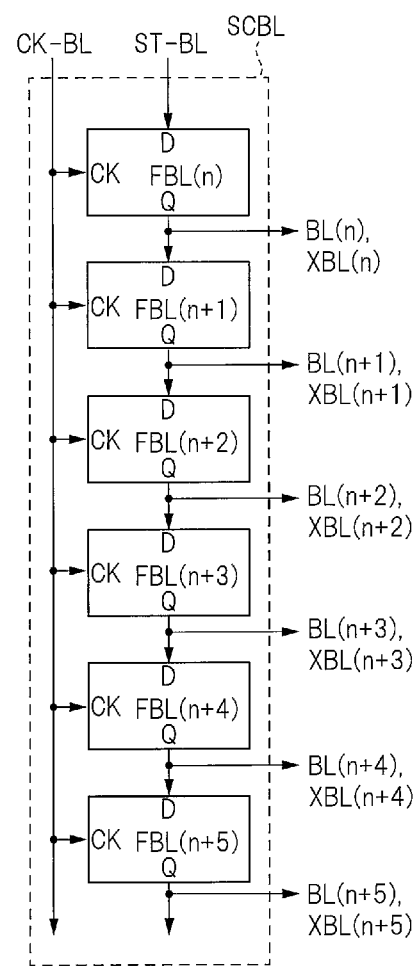
FIG. 14B is a block diagram schematically illustrating configurations of a first scanner circuit and a second scanner circuit according to the first embodiment.

FIGS. 14A and 14B are block diagrams schematically illustrating configurations of the first scanner circuit SCAL and the second scanner circuit SCBL according to the first embodiment, respectively. FIG. 14A illustrates the configuration of the first scanner circuit SCAL, and FIG. 14B illustrates the configuration of the second scanner circuit SCBL. Each of the first scanner circuit SCAL and the second scanner circuit SCBL includes the shift stages corresponding to the respective drive electrodes TL(0) to TL(p) disposed in the display area 2, and the shift stages are coupled in series so as to form a shift register although the present embodiment is not limited thereto. FIGS. 14A and 14B illustrate only shift stages FAL(n) to FAL(n+5) and FBL(n) to FBL(n+5) corresponding to the drive electrodes TL(n) to TL(n+5) illustrated in FIG. 13, respectively.

Each of the shift stages FAL(n) to FAL(n+5) includes: a clock terminal CK, a data input terminal D, and a data output terminal Q; retrieves data (information) supplied to the data input terminal D in synchronization with a variation in the shift clock signal CK-AL being supplied to the clock terminal CK; and outputs the data from the data output terminal Q. The data output terminal Q at the shift stage FAL(n) is coupled to the data input terminal D at the next shift stage FAL(n+1), and the data output terminal Q at the shift stage FAL(n+1) is coupled to the data input terminal D at the next shift stage FAL(n+2). Subsequently thereto, the data output terminal Q at the shift stages is coupled to the data input terminal D at the next shift stage, so that the shift stages are coupled in series. The shift clock signal CK-AL is supplied to the clock terminal CK of each of the shift stages FAL(n) to FAL(n+5). In FIG. 14A, the start signal ST-AL is supplied to the data input terminal D of the primary shift stage FAL(n).

In the magnetic field touch detection and the electric field touch detection, selection information indicating selection of the drive electrode is supplied as the start signal ST-AL to the shift stage FAL(n). In the magnetic field touch detection and the electric field touch detection, the shift clock signal CK-AL periodically varies. Accordingly, for example, the start signal ST-AL as the selection information is retrieved by the shift stage FAL(n), and the start signal ST-AL as the selection information sequentially moves from the shift stage FAL(n) to the shift stage FAL(n+5) every time the shift clock signal CK-AL varies. According to the first embodiment, the selection information indicating the selection is at the high level although the present embodiment is not particularly limited thereto. Therefore, the high level moves from the shift stage FAL(n) to the shift stage FAL(n+5).

The signals outputted from the data output terminals Q at the shift stages FAL(n) to FAL(n+5) become the first selection signals outputted from the first scanner circuit SCAL. Each of the shift stages FAL(n) to FAL(n+5) has one-to-one correspondence to the drive electrodes TL(n) to TL(n+5), so that the signal outputted from the data output terminal Q at the shift stage FAL(n) becomes the first selection signal AL(n) and the first inverse selection signal XAL(n). Similarly, the signals outputted from the data output terminals Q at the shift stages FAL(n+1) to FAL(n+5) become the first selection signal AL(n+1) to AL(n+5) and the first inverse selection signal XAL(n+1) to XAL(n+5), respectively. Therefore, in the magnetic field touch detection and the electric field touch detection, the first selection signals sequentially become the high level from the first selection signal AL(n) to the first selection signal AL(n+5), and the first inverse signals sequentially become the low level from the first inverse selection signal XAL(n) to the first inverse selection signal XAL(n+5).

The shift stages FAL(n) to FAL(n+5) configuring the first scanner circuit SCAL have been described as an example, and the shift stages FBL(n) to FBL(n+5) configuring the second scanner circuit SCBL can be also described similarly. The shift clock signal CK-BL is supplied as a shift clock signal, and the start signal ST-BL is supplied as a start signal to the shift stages FBL(n) to FBL(n+5). The start signal ST-BL at the high level indicating the selection moves from the shift stage FBL(n) to the shift stage FBL(n+5) in synchronization with a variation in the shift clock signal CK-BL, and is outputted as the second selection signals BL(n) to BL(n+5) and the second inverse selection signals XBL(n) to XBL(n+5).

The unit selection circuits SEL(n) to SEL(n+5) configures the selection circuit SELL. When the corresponding first selection signal or the corresponding second selection signal indicates the selection of the drive electrode in the magnetic field touch detection and the electric field touch detection, the unit selection circuits SEL(n) to SEL(n+5) form the first unit selection signals SELH_L(n) to SELH_L(n+5) and the second unit selection signals SELG_L(n) to SELG_L(n+5) so that the first switch S01 and/or the second switch S00 in the corresponding unit drive circuit USL become on-states in accordance with the state selection signals VSEL1 and VSEL2.

The first scanner circuit pair SCL and the first selection drive circuit SDL have been described as an example, but the second scanner circuit pair SCR and the second selection drive circuit SDR are also described similarly. Therefore, the second scanner circuit pair SCR and the second selection drive circuit SDR will be simply described.

Figure 15A:
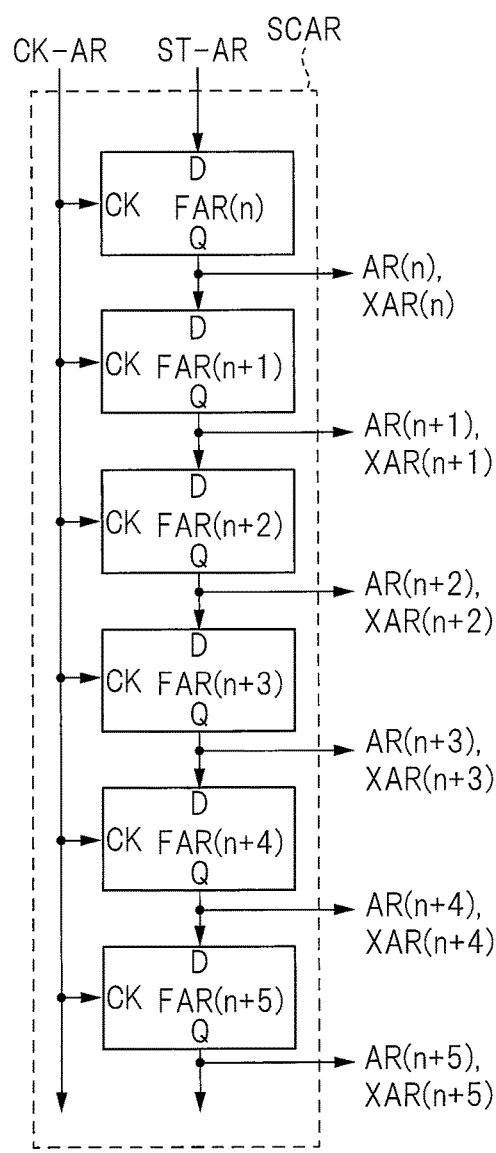
FIG. 15A is a block diagram schematically illustrating configurations of a third scanner circuit and a fourth scanner circuit according to the first embodiment.
Figure 15B:
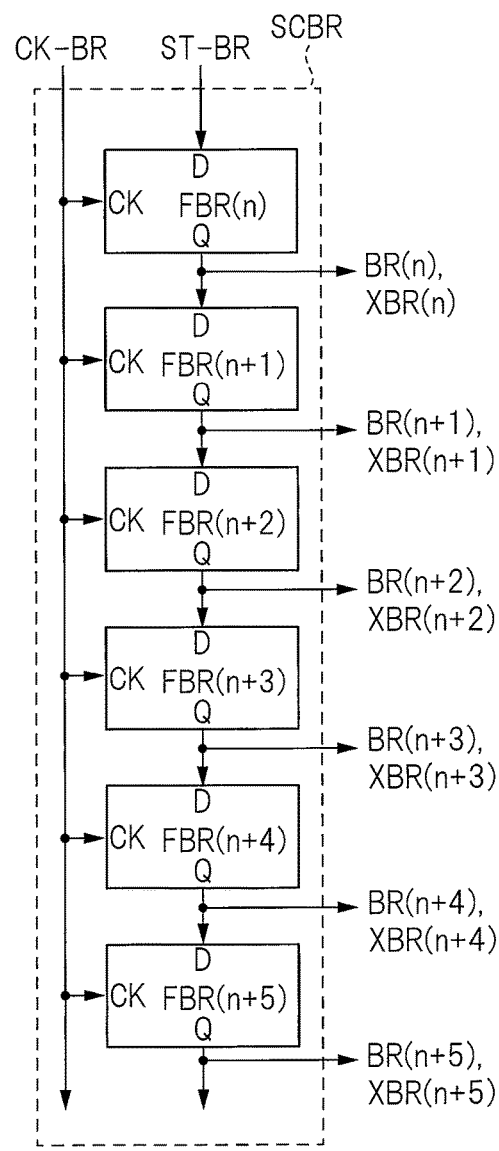
FIG. 15B is a block diagram schematically illustrating configurations of a third scanner circuit and a fourth scanner circuit according to the first embodiment.

FIGS. 15A and 15B are block diagrams schematically illustrating configurations of the third scanner circuit SCAR and the fourth scanner circuit SCBR according to the first embodiment. The second scanner circuit pair SCR also includes the pair of third scanner circuit SCAR and fourth scanner circuit SCBR, and each of the third scanner circuit SCAR and the fourth scanner circuit SCBR includes: a shift register having a plurality of shift stages FAR(n) to FAR(n+5); and a shift register having a plurality of shift stages FBR(n) to FBR(n+5) as illustrated FIGS. 15A and 15B. The start signal ST-AR at the high level is supplied to the shift register of the third scanner circuit SCAR, and sequentially moves in synchronization with a variation in the shift clock signal CK-AR. The start signal ST-BR at the high level is supplied to the shift register of the fourth scanner circuit SCBR, and sequentially moves in synchronization with a variation in the shift clock signal CK-BR. Here, directions in which the start signals ST-AR and ST-BR at the high levels move are the same as those in which the start signals ST-AL and ST-BL move. The shift clock signals CK-AR and CK-BR are clock signals having the same cycle as the shift clock signals CK-AL and CK-BL.

Similarly to the first scanner circuit SCAL, the third scanner circuit SCAR outputs first selection signals AR(n) to AR(n+5) and first inverse selection signals XAR(n) to XAR(n+5) corresponding to the drive electrodes TL(n) to TL(n+5), respectively. Similarly to the second scanner circuit SCBL, the fourth scanner circuit SCBR outputs second selection signals BR(n) to BR(n+5) and second inverse selection signals XBR(n) to XBR(n+5) corresponding to the drive electrodes TL(n) to TL(n+5), respectively. Note that FIG. 13 illustrates only the first reverse selection signal XAR(n) and the second reverse selection signal XBR(n).

The selection circuit SELR includes unit selection circuits SER(n) to SER(n+5) corresponding to the drive electrodes TL(n) to TL(n+5), respectively. The unit selection circuits SER(n) to SER(n+5) receive: the corresponding first selection signals AR(n) to AR(n+5), first inverse selection signals XAR(n) to XAR(n+5), second selection signals BR(n) to BR(n+5), and second inverse selection signals XBR(n) to XBR(n+5); and the state selection signals VSEL1 and VSEL2, and form first unit selection signals SELH_R(n) to SELH_R(n+5) and second unit selection signals SELG_R(n) to SELG_R(n+5), respectively.

That is, the third scanner circuit SCAR and the fourth scanner circuit SCBR share the unit selection circuits SER(n) to SER(n+5) corresponding to each of the drive electrodes, and supply the first selection signals and the second selection signals.

The drive circuit DRVR disposed along the side 2-R of the display area 2 includes a plurality of unit drive circuits USR, the first wiring TPH, and the second wiring TPL. The unit drive circuits USR each include: a first switch S01 connected between the second end n2 of each of the corresponding drive electrodes TL(n) to TL(n+5) and the first wiring TPH; and a second switch S00 coupled between the second end n2 and the second wiring TPL. The first switches S01 in the unit drive circuits USR are switch-controlled by the first unit selection signals SELH_R(n) to SELH_R(n+5) from the corresponding unit selection circuits SER(n) to SER(n+5), and the second switches S00 are switch-controlled with the second unit selection signals SELG_R(n) to SELG_R(n+5) from the corresponding unit selection circuits SER(n) to SER(n+5).

The selection circuit SELR including the unit selection circuits SER(n) to SER(n+5) couples the first wiring TPH, the second wiring TPL, and the second end n2 of the drive electrode TL(n) through the unit drive circuit USR.

The selection circuit SELR is a second selection circuit according to the present invention.

Similarly to the selection circuit SELL, the unit selection circuits SER(n) to SER(n+5) configure the selection circuit SELR. When the corresponding first selection signal or the corresponding second selection signal indicates the selection of the drive electrode in the magnetic field touch detection and the electric field touch detection, the unit selection circuits SER(n) to SER(n+5) form the first unit selection signals SELH_R(n) to SELH_R(n+5) and the second unit selection signals SELG_R(n) to SELG_R(n+5) so that the first switch S01 and/or the second switch S00 in the corresponding unit drive circuit USR become on-states in accordance with the state selection signals VSEL1 and VSEL2.

<Configurations of First Selection Drive Circuit and Second Selection Drive Circuit>

The selection circuit SELL configuring the first selection drive circuit SDL includes a plurality of unit selection circuits SEL(0) to SEL(p) corresponding to the drive electrodes TL(0) to TL(p), respectively, and the drive circuit DRVL also includes a plurality of unit drive circuits USL corresponding to the drive electrodes. The unit selection circuits SEL(0) to SEL(p) each have the same configuration, and the respective unit drive circuits USL also have the same configuration. Similarly, the selection circuit SELR configuring the second selection drive circuit SDR also includes unit selection circuits SER(0) to SER(p) each having the same configuration and corresponding to the drive electrodes TL(0) to TL(p), and the drive circuit DRVR also includes a plurality of unit drive circuits USR each having the same configuration.

Therefore, here, the first selection drive circuit SDL will be described by using, as examples, the unit selection circuit SEL(n) and the unit drive circuit USL, corresponding to the drive electrode TL(n), and the second selection drive circuit SDR will be described by using, as examples, the unit selection circuit SER(n) and the unit drive circuit USR, corresponding to the drive electrode TL(n).

Figure 16A:
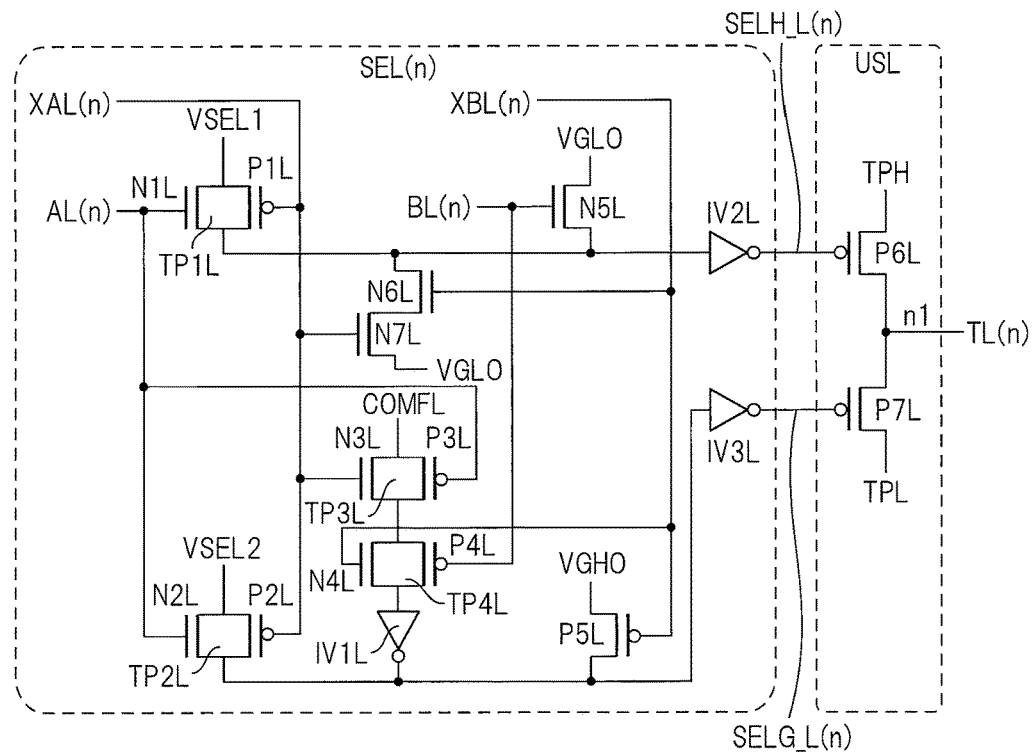
FIG. 16A is a circuit diagram showing the configurations of the first selection drive circuit and the second selection drive circuit according to the first embodiment.
Figure 16B:
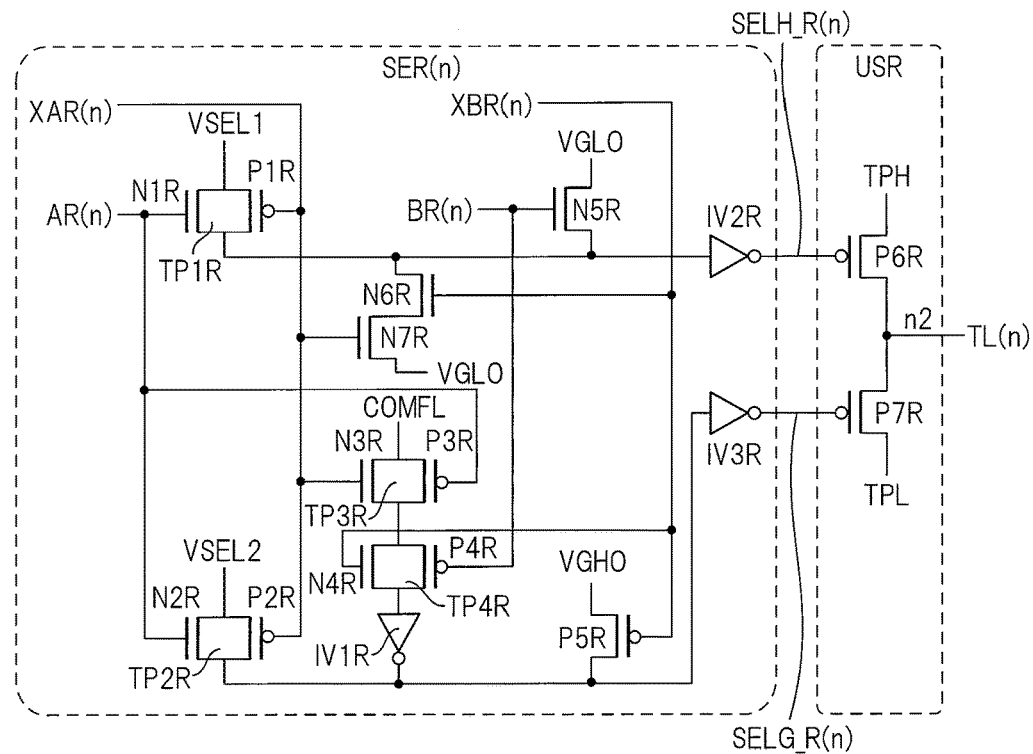
FIG. 16B is a circuit diagram showing the configurations of the first selection drive circuit and the second selection drive circuit according to the first embodiment.

FIGS. 16A and 16B are circuit diagrams of configurations of the first selection drive circuit SDL and the second selection drive circuit SDR according to the first embodiment, respectively. Here, FIG. 16A illustrates configurations of the unit selection circuit SEL(n) and the unit drive circuit USL that configure the first selection drive circuit SDL, and FIG. 16B illustrates the unit selection circuit SER(n) and the unit drive circuit USR that configure the second selection drive circuit SDR.

The unit selection circuit SEL(n) includes N-channel field-effect transistors (hereinafter, also referred to as N transistors) N1L to N7L, P-channel field-effect transistors (hereinafter, also referred to as P transistors) P1L to P5L, and inverter circuits IV1L to IV3L. In the present specification, the P transistor whose gate is denoted by a symbol of "0" is illustrated to be distinguished from the N transistors.

A source and a drain of the N transistor N1L and a source and a drain of the P transistor P1L are respectively coupled so that a source-drain channel of the N transistor N1L and a source-drain channel of the P transistor P1L are coupled in parallel. The first selection signal AL(n) is supplied to the gate of the N transistor N1L, and the first inverse selection signal XAL(n) is supplied to the gate of the P transistor P1L. Accordingly, a first transfer switch TP1L switch-controlled by the first selection signal AL(n) is configured by the N transistor N1L and the P transistor P1L. Similarly, a second transfer switch TP2L switch-controlled by the first selection signal AL(n) is configured by the N transistor N2L and the P transistor P2L.

The state selection signal VSEL1 is supplied to one terminal of the first transfer switch TP1L, and the state selection signal VSEL2 is supplied to one terminal of the second transfer switch TP2L. The other terminal of the first transfer switch TP1L is coupled to an input of the inverter circuit IV2L. Similarly, the other terminal of the second transfer switch TP2L is coupled to an input of the inverter circuit IV3L.

A source-drain channel of the N transistor N5L is coupled between a predetermined voltage VGLO and an input of the inverter circuit IV2L, and the second selection signal BL(n) is supplied to the gate thereof. The predetermined voltage VGLO is, for example, the second voltage Vs corresponding to the low level. Accordingly, the N transistor N5L is switch-controlled by the second selection signal BL(n). A source-drain channel of the P transistor P5L is coupled between a predetermined voltage VGHO and an input of the inverter circuit IV3L, and the second inverse selection signal XBL(n) is supplied to the gate thereof. The predetermined voltage VGHO is, for example, the first voltage Vd corresponding to the high level. Accordingly, the P transistor P5L is switch-controlled by the second inverse selection signal XBL(n).

An output of the inverter circuit IV2L is supplied as the first unit selection signal SELH_L(n) to the corresponding unit drive circuit USL, and an output of the inverter circuit IV3L is supplied as the second selection signals SELG_L(n) to the unit drive circuit USL. The unit drive circuit USL includes: a P transistor P6L coupled between the first end n1 of the drive electrode TL(n) and the first wiring TPH; and a P transistor P7L coupled between the first end n1 of the drive electrode TL(n) and the second wiring TPL. The P transistor P6L corresponds to the first switch S01 illustrated in FIG. 13, and the P transistor P7L corresponds to the second switch S00 illustrated in FIG. 13. The P transistor P6L, whose gate the first unit selection signal SELH_L(n) is supplied from the inverter circuit IV2L to, is switch-controlled by the first unit selection signal SELH_L(n). The P transistor P7L, whose gate the second unit selection signal SELG_L(n) is supplied from the inverter circuit IV3L to, is switch-controlled by the second unit selection signal SELG_L(n).

The N transistors N6L and N7L are coupled in series so that source-drain channels of the N transistors N6L and N7L are coupled in series between the input of the inverter circuit IV2L and the predetermined voltage VGLO. The second inverse selection signal XBL(n) is supplied to the gate of the N transistor N6L, and the first inverse selection signal XAL(n) is supplied to the gate of the N transistor N7L. Accordingly, when the first selection signal AL(n) and the second selection signal BL(n) are at the low levels, namely, when the drive electrode TL(n) has not been selected, the N transistor N6L and the N transistor N7L become on-states, and the predetermined voltage VGLO is supplied to the input of the inverter circuit IV2L. Therefore, when the drive electrode TL(n) has not been selected, the first unit selection signal SELH_L(n) at the high level is supplied from the inverter circuit IV2L to the P transistor P6L, so that the P transistor P6L become an off-state.

The respective source-drain channels of the N transistor N3L and the P transistor P3L are coupled in parallel. The first inverse selection signal XAL(n) is supplied to the gate of the N transistor N3L, and the first selection signal AL(n) is supplied to the gate of the P transistor P3L. Accordingly, a third transfer switch TP3L switch-controlled by the first inverse selection signal XAL(n) is configured by the N transistor N3L and the P transistor P3L. The source-drain channels of the N transistor N4L and the P transistor P4L are coupled in parallel. The second inverse selection signal XBL(n) is supplied to the gate of the N transistor N4L, and the second selection signal BL(n) is supplied to the gate of the P transistor P4L. Accordingly, a fourth transfer switch TP4L switch-controlled by the second inverse selection signal XBL(n) is configured by the N transistor N4L and the P transistor P4L.

The third transfer switch TP3L and the fourth transfer switch TP4L are coupled in series, and a control signal COMFL is supplied to an input of the inverter circuit IV1L through the third transfer switch TP3L and the fourth transfer switch TP4L coupled in series. An output of the inverter circuit IV1L is coupled to the input of the inverter circuit IV3L. Accordingly, when the first inverse selection signal XAL(n) and the second inverse selection signal XBL(n) are at the high levels, in other words, when the first selection signal AL(n) and the second selection signal BL(n) are at the low levels, the third transfer switch TP3L and the fourth transfer switch TP4L both become on-states. Since the first selection signal AL(n) and the second selection signal BL(n) are at the low levels, the control signal COMFL is supplied to the inverter circuit IV3L through the third transfer switch TP3L, the fourth transfer switch TP4L, and the inverter circuit IV1L when the corresponding drive electrode TL(n) has not been selected. The second unit selection signal SELG_L(n) becomes the high level by making the control signal COMFL the high level when the drive electrode TL(n) has not been selected.

Accordingly, when the drive electrode TL(n) has not been selected, both of the first unit selection signal SELH_L(n) and the second unit selection signal SELG_L(n) become the high levels by making the control signal COMFL the high level, and both of the P transistors P6L and P7L configuring the unit drive circuit USL become off-states, so that the first end n1 of the corresponding drive electrode TL(n) can be electrically separated from the first wiring TPH and the second wiring.

In contrast to this, when the first selection signal AL(n) is at the high level, namely, when the first scanner circuit SCAL has selected the corresponding drive electrode TL(n), the P transistor P6L or P7L configuring the unit drive circuit USL becomes the on-state in accordance with the state selection signals VSEL1 and VSEL2. Accordingly, the first end n1 of the corresponding drive electrode TL(n) is electrically coupled to the first wiring TPH or the second wiring TPL through the P transistor P6L or P7L.

That is, when the first selection signal AL(n) has become the high level, the first transfer switch TP1L and the second transfer switch TP2L become the on-state. Accordingly, the phase-inverted state selection signal VSEL1 is supplied as the first unit selection signal SELH_L(n) from the inverter circuit IV2L to the gate of the P transistor P6L, and the inverter circuit IV3L supplies the state selection signal VSEL2 that has been phase-inverted, to the gate of the P transistor P7L as the second unit selection signal SELG_L(n).

When the second selection signal BL(n) becomes the high level, the N transistor N5L becomes an on-state. At this time, the second inverse selection signal XBL(n) in which the second selection signal BL(n) is phase-inverted becomes the low level, so that the P transistor P5L becomes an on-state. As a result, the predetermined voltage VGHO in which the predetermined voltage VGLO is phase-inverted is supplied as the first unit selection signal SELH_L(n) from the inverter circuit IV2L to the gate of the P transistor P6L, and the inverter circuit IV3L supplies the predetermined voltage VGLO including the predetermined voltage VGHO phase-inverted, to the gate of the P transistor P7L as the second unit selection signal SELG_L(n).

The control device 3 (refer to FIG. 3) alternately and periodically varies the voltages of the state selection signals VSEL1 and VSEL2 in the magnetic field touch detection. That is, the control device 3 periodically varies the voltages of the state selection signals VSEL1 and VSEL2 in the magnetic field touch detection. At this time, the voltages of the state selection signals VSEL1 and VSEL2 are complementarily varied, namely, when one of the voltages is at the high level, the other becomes the low level.

For example, when the first transfer switch TP1L and the second transfer switch TP2L are made the on-states by the first selection signal AL(n) at the high level, the first unit selection signal SELH_L(n) and the second unit selection signal SELG_L(n) whose voltages periodically vary are supplied to the P transistors P6L and P7L, respectively. At this time, if the state selection signals VSEL1 and VSEL2 are complementarily varied, the voltages of the first unit selection signal SELH_L(n) and the voltage of the second unit selection signal SELG_L(n) are also complementarily varied. Accordingly, the P transistors P6L and P7L alternately become the on-states in accordance with the variations in the state selection signals VSEL1 and VSEL2. As a result, the first voltage Vd and the second voltage Vs supplied to the first wiring TPH and the second wiring TPL are temporally and alternately supplied to the drive electrode TL(n) through the unit drive circuit USL.

Similarly, when the N transistor N5L and the P transistor P5L are made the on-states by the second selection signal BL(n) at the high level, the phase-inverted predetermined voltage VGLO is supplied as the first unit selection signal SELH_L(n) from the inverter circuit IV2L to the P transistor P6L, and the phase-inverted predetermined voltage VGHO is supplied as the second unit selection signal SELG_L(n) from the inverter circuit IV3L to the P transistor P7L. As a result, when the predetermined voltage VGLO is made to be a low-level signal (the grounding voltage), the P transistor P6L is turned off, and the P transistor P7L is turned on, so that the first end n1 is coupled to the second wiring TPL.

When the first transfer switch TP1L and the second transfer switch TP2L are made the on-states by the first selection signal AL(n), the phase-inverted state selection signal VSEL1 is supplied to the gate of the P transistor P6L, and the phase-inverted state selection signal VSEL2 is supplied to the gate of the P transistor P7L. In contrast to this, when the N transistor N5L and the P transistor P5L are turned on with the second selection signal BL(n), the predetermined voltage VGLO that has been phase-inverted, is supplied to the gate of the P transistor P6L and the predetermined voltage VGHO that has been phase-inverted, is supplied to the gate of the P transistor P7L. That is, when the first scanner circuit SCAL indicates the selection of the drive electrode TL(n), the first end n1 is alternately coupled to the first wiring TPH and the second wiring TPL, and when the second scanner circuit SCABL indicates the selection of the drive electrode TL(n), the first end n1 is consecutively coupled to the second wiring TPL.

The unit selection circuit SEL(n) corresponding to the drive electrode TL(n), and the unit drive circuit USL corresponding thereto have been described as examples, but the remaining unit selection circuits in the selection circuit SELL and the remaining unit drive circuits in the drive circuit DRVL can be also described similarly.

The selection circuit SELR and the drive circuit DRVR in the second selection drive circuit SDR disposed along the side 2-R of the display area 2 (refer to FIG. 4) is also configured by the unit selection circuits SER(0) to SER(p) and the unit drive circuits USR corresponding to the drive electrodes TL(0) to TL(p) similarly to the selection circuit SELL and the drive circuit DRVL. The unit selection circuits SER(0) to SER(p) each have the same configuration, and the plurality of unit drive circuits USR each have the same configuration, so that FIG. 16B representatively illustrates the unit selection circuit SER(n) and the unit drive circuit USR corresponding to the unit selection circuit SER(n).

The unit selection circuit SER(n) has the same configuration as the unit selection circuit SEL(n) illustrated in FIG. 16A, and the unit drive circuit USR has the same configuration as the unit drive circuit USL illustrated in FIG. 16A. The operations of the unit selection circuit SER(n) and the unit drive circuit USR are the same as those of the unit selection circuit SEL(n) and the unit drive circuit USL. Therefore, here, only a relationship corresponding to the unit selection circuit SEL(n) and the unit drive circuit USL will be described, and detailed descriptions of the configurations and the operations will be omitted.

The unit selection circuit SER(n) includes N transistors N1R to N7R, P transistors P1R to P5R, and inverter circuits IV1R to IV3R. Here, the N transistors N1R to N7R correspond to the N transistors N1L to N7L described in FIG. 16A, respectively. The P transistors P1R to P5R correspond to the P transistors P1L to P5L described in FIG. 16A, respectively. The inverter circuits IV1R to IV3R correspond to the inverter circuits IV1L to IV3L described in FIG. 16A, respectively. "TP1R" to "TP4R" denote first to fourth transfer switches, and correspond to the first to fourth transfer switches TP1L to TP4L described in FIG. 16A, respectively. The unit drive circuit USR includes P transistors P6R and P7R corresponding to the P transistors P6L and P7L described in FIG. 16A, respectively.

The first selection signal AR(n) and the first inverse selection signal XAR(n) are supplied to the unit selection circuit SER(n) from the third scanner circuit SCAR in the second scanner circuit pair SCR disposed along the side 2-R of the display area 2, and furthermore the second selection signal BR(n) and the second inverse selection signal XBR(n) are supplied to the unit selection circuit SER(n) from the fourth scanner circuit SCBR in the second scanner circuit pair SCR. The state selection signals VSEL1 and VSEL2, the control signal COMFL, and the predetermined voltages VGLO and VGHO are supplied to the unit selection circuit SER(n), and the first unit selection signal SELH_R(n) and the second unit selection signal SELG_R(n) are formed similarly to the unit selection circuit SEL(n) described in FIG. 16A.

The P transistors P6R and P7R in the unit drive circuit USR are coupled among the second end n2 of the corresponding drive electrode TL(n), the first wiring TPH, and the second wiring TPL, and are switch-controlled by the first unit selection signal SELH_R(n) and the second unit selection signal SELG_R(n) similarly to the unit drive circuit USL described in FIG. 16A.

<Basic Operation of Magnetic Field Touch Detection>

A basic operation of the magnetic field touch detection will be described before the entire operations of the magnetic field touch detection and the electric field touch detection according to the first embodiment are described. The description here corresponds to the operation in the magnetic field generation period described in FIGS. 2A and 2C.

In FIGS. 2A and 2B, the examples configuring the magnetic field generation coils GX(n−1) to GX(n+3) have been described by electrically serially coupling the drive electrodes disposed in parallel in order to describe the principle of the magnetic field detection. According to the first embodiment, the directions of the currents flowing through the pair of drive electrodes disposed in parallel in a plan view are made to oppose each other, so that each drive electrode generates a magnetic field. After that, the generated magnetic fields are superimposed in an area interposed between the pair of drive electrodes, so that a strong magnetic field is generated. In this case, a magnetic field generation coil (e.g., GX(n)) can be regarded as being formed by the pair of drive electrodes that are disposed in parallel and apart from each other and through which each of the currents flows in an opposite direction. In the magnetic field touch detection, the control device 3 supplies the first voltage Vd higher than the second voltage Vs to the first wiring TPH, and supplies the second voltage Vs as, for example, a grounding voltage, to the second wiring TPL.

Next, an operation outline of the magnetic field generation period in the magnetic field touch detection will be described with FIGS. 6, 7, and 13 to 16.

When a first drive electrode and a second drive electrode to be paired each comprise one drive electrode and when the first drive electrode and the second rive electrode are apart from each other so as to interpose another drive electrode therebetween, a value indicating "1" as a separation amount n is set to the separation-amount register S-REG illustrated in FIG. 4. Before varying the shift clock signal CK-BL, the control device 3 varies the shift clock signal CK-AL twice (the separation amount n+once) equal to a sum of the separation amount n and 1 that is the number of the drive electrodes included in the first drive electrode. Simultaneously, the control device makes the start signal ST-AL the high level indicating the selection of the drive electrode when the shift clock signal CK-AL is varied for once at the beginning. The control device 3 varies the shift clock signal CK-BR two times (the separation amount n+once) before varying the shift clock signal CK-AR. Also at this time, when the shift clock signal CK-BR is varied for once at the beginning, the start signal ST-BR is made the high level indicating the selection of the drive electrode. That is, before the shift clock signals CK-BL and CK-AR vary, the shift clock signal CK-AL and the shift clock signal CK-BR simultaneously vary the number of times equal to the sum of the separation amount and the number of drive electrodes included in the first drive electrode.

The control device 3 periodically varies each of the shift clock signals CK-AL, CK-BL, CK-AR, and CK-BR after varying the shift clock signals CK-AL and CK-BR by the sum of the separation amount and once. The shift clock signals CK-AL, CK-BL, CK-AR, and CK-BR each are periodically varied so that the cycles of those shift clock signals are made the same. The control device 3 makes each of the start signals ST-BL and ST-AR the high level indicating the selection of the drive electrode when varying the shift clock signals CK-BL and CK-AR at the beginning.

Accordingly, the start signal at the high level in the shift register of the first scanner circuit SCAL moves earlier by two shift stages than that in the shift register of the second scanner circuit SCBL. Similarly, the start signal at the high level in the shift register of the fourth scanner circuit SCBR moves earlier by two shift stages than that in the shift register of the third scanner circuit SCAR.

For example, when the shift stage FBL(n) of the second scanner circuit SCBL illustrated in FIG. 14B retains the start signal at the high level, the shift stage FAL(n+2) of the first scanner circuit SCAL illustrated in FIG. 14A becomes a state of retaining the start signal at the high level. At this time, the shift FAR(n) in the third scanner circuit SCAR illustrated in FIG. 15A retains the start signal at the high level, and the shift stage FBR(n+2) in the fourth scanner circuit SCBR illustrated in FIG. 15B becomes a state of retaining the start signal at the high level. At this time, when the shift clock signals CK-AL, CK-BL, CK-AR, and CK-BR vary, the start signal at the high level stored in each of the shift registers moves, and the shift stages FAL(n+1), FBL(n+3), FAR(n+1), and FBR(n+3) are each switched to the state of retaining the start signal at the high level.

Due to the variation, the first scanner circuit SCAL makes the first selection signal AL(n+3) the high level, and makes the first selection signals AL(n) to AL(n+2), AL(n+4), and AL(n+5) the low levels. Similarly, the second scanner circuit SCBL makes the second selection signal BL(n+1) the high level, and makes the second selection signals BL(n), and BL(n+2) to BL(n+5) the low levels. The third scanner circuit SCAR makes the first selection signal AR(n+1) the high level, and makes the first selection signals AR(n), and AR(n+2) to AR(n+5) the low levels. Similarly, the fourth scanner circuit SCBR makes the second selection signal BR(n+3) the high level, and makes the second selection signals BR(n) to BR(n+2), BR(n+4), and BR(n+5) the low levels.

The first selection signals AL(n+3) and AR(n+1) become the high levels, so that the first transfer switches TP1L and TP1R and the second transfer switches TP2L and TP2R in the unit selection circuits SEL(n+3) and SER(n+1) become on-states, respectively. At this time, the second selection signals BL(n+1) and BR(n+3) become the high levels, so that the N transistors N5L and N5R and the P transistors P5L and P5R in the unit selection circuits SEL(n+1) and SER(n+3) become on-states, respectively.

As a result, the unit drive circuit USL corresponding to the unit selection circuit SEL(n+3) couples the first end n1 of the corresponding drive electrode TL(n+3) to the first wiring TPH or the second wiring TPL in accordance with the state selection signals VSEL1 and VSEL2. Similarly, the unit drive circuit USR corresponding to the unit selection circuit SER(n+1) couples the second end n2 of the corresponding drive electrode TL(n+1) to the first wiring TPH or the second wiring TPL in accordance with the state selection signals VSEL1 and VSEL2. At this time, the unit drive circuit USR corresponding to the unit selection circuit SER(n+3) couples the second end n2 of the corresponding drive electrode TL(n+3) to the second wiring TPL in accordance with the state selection signals VSEL1 and VSEL2. The unit drive circuit USL corresponding to the unit selection circuit SEL(n+1) couples the first end n1 of the corresponding drive electrode TL(n+1) to the second wiring TPL in accordance with the state selection signals VSEL1 and VSEL2.

The voltages of the state selection signals VSEL1 and VSEL2 periodically vary. The variations of the voltages are complementary. Therefore, when the state selection signal VSEL1 is, for example, at the high level, the state selection signal VSEL2 becomes the low level. When the state selection signal VSEL1 is at the high level and the state selection signal VSEL2 is at the low level, the second unit selection signals SELG_L(n+3) and SELG_R(n+1) outputted from the unit selection circuits SEL(n+3) and SER(n+1) become the high levels, and the first unit selection signals SELH_L(n+3) and SELH_R(n+1) outputted from the unit selection circuits SEL(n+3) and SER(n+1) become the low levels. Accordingly, the P transistor P6L and P6R (the first switches S01) become on-states, and the P transistors P7L and P7R (the second switches S00) become off-states in the unit drive circuits USL and USR corresponding to the unit selection circuits SEL(n+3) and SER(n+1), respectively.

In contrast to this, the second unit selection signals SELG_L(n+1) and SELG_R(n+3) outputted from the unit selection circuits SEL(n+1) and SER(n+3) become the low levels, and the first unit selection signals SELH_L(n+1) and SELH_R(n+3) outputted from the unit selection circuits SEL(n+1) and SER(n+3) become the high levels. Accordingly, the P transistors P6L and P6R (the second switches S00) become off-states, and the P transistors P7L and P7R (the first switches S01) become on-states in the unit drive circuits USL and USR corresponding to the unit selection circuits SEL(n+1) and SER(n+3), respectively.

FIG. 13 illustrates the above states. That is, the first end n1 of the drive electrode TL(n+3) and the second end n2 of the drive electrode TL(n+1) are coupled to the first wiring TPH through the P transistors P6L and P6R (the first switches S01) in the unit drive circuits USL and USR corresponding to the unit selection circuits SEL(n+3) and SER(n+1), and thereby the first voltage Vd (denoted with "+" in the figure) is supplied. The second end n2 of the drive electrode TL(n+3) and the first end n1 of the drive electrode TL(n+1) are coupled to the second wiring TPL through the P transistors P7R and P7L(the second switches S00) in the unit drive circuits USR and USL corresponding to the unit selection circuits SER(n+3) and SEL(n+1), and thereby the second voltage Vs (denoted with "0" in the figure) is supplied.

Next, when the state selection signal VSEL1 becomes the low level and the state selection signal VSEL2 becomes the high level, the second unit selection signals SELG_L(n+3) and SELG_R(n+1) outputted from the unit selection circuits SEL(n+3) and SER(n+1) become the low levels, and the first unit selection signals SELH_L(n+3) and SELH_R(n+1) outputted from the unit selection circuits SEL(n+3) and SER(n+1) become the high levels. Accordingly, the P transistors P6L and P6R (the first switches S01) become off-states, and the P transistors P7L and P7R (the second switches S00) become on-states in the unit drive circuits USL and USR corresponding to the unit selection circuits SEL(n+3) and SER(n+1), respectively.

At this time, the second unit selection signals SELG_L(n+1) and SELG_R(n+3) outputted from the unit selection circuits SEL(n+1) and SER(n+3) become the low levels, and the first unit selection signals SELH_L(n+1) and SELH_R(n+3) outputted from the unit selection circuits SEL(n+1) and SER(n+3) become the high levels. Accordingly, the P transistors P6L and P6R (the first switches S01) become off-states, and the P transistors P7L and P7R (the second switches S00) become on-states in the unit drive circuits USL and USR corresponding to the unit selection circuits SEL(n+1) and SER(n+3), respectively.

As a result, when the state selection signal VSEL1 becomes the low level and the state selection signal VSEL2 becomes the high level, the second voltage Vs(0) is supplied to the first end n1 of the drive electrode TL(n+3) and the second end n2 of the drive electrode TL(n+1), and the second voltage Vs(0) is supplied to the second end n2 of the drive electrode TL(n+3) and the first end n1 of the drive electrode TL(n+1).

FIG. 6 (FIG. 13 is also similar) is a diagram showing a relationship between drive voltages supplied to the selected drive electrodes TL(n+3) and TL(n+1) when the state selection signal VSEL1 made the high level, and the state selection signal VSEL2 made the low level. In FIG. 6, the second voltage Vs supplied to the second wiring TPL is denoted with "0" (the grounding voltage), and the first voltage Vd supplied to the first wiring TPH is denoted with "+".

In FIG. 6, a current I11 flows from the second end n2 (the side of the side 2-R) to the first end n1 (the side of the side 2-L) through the drive electrode TL(n+1) due to their voltage difference, and a current I12 flows from the first end n1 (the side of the side 2-L) to the second end n2 (the side of the side 2-R) through the drive electrode TL(n+3) due to their voltage difference. The drive electrodes TL(n+1) and TL(n+3) respectively generate the magnetic fields φ11 and φ12 in directions each indicated with a broken line by the variations due to the flows of the currents I11 and I12, so that the magnetic fields φ11 and φ12 are superimposed in a portion (an area) of the drive electrode TL(n+2) interposed between the selected drive electrode TL(n+1) and the selected drive electrode TL(n+3). Accordingly, a variation in a strong magnetic field occurs in the area of the drive electrode TL(n+2).

In the state illustrated in FIG. 6, the state selection signal VSEL1 is made the low level and the state selection signal VSEL2 is made the high level at temporally stationary timing when no variation occurs in the currents I11 and I12 flowing through the drive electrodes TL(n+1) and TL(n+3). Thus, by supplying the second voltage Vs(0) to the pair of first end n1 and second end n2 of each of the drive electrode TL(n+1) and the drive electrode TL(n+3), the state of FIG. 6 is made a state illustrated in FIG. 7. In FIG. 7, the second voltage Vs supplied to the second wiring TPL is denoted with "0" (the grounding voltage). In the state of FIG. 7, no current flows through the drive electrodes TL(n+1) and TL(n+3), so that no magnetic field is generated in the area of the drive electrode TL(n+2). After that, in order to return to the state illustrated in FIG. 6, the drive electrodes TL(n+1) and TL(n+3) are driven to generate the magnetic fields. The display device 1 repeats the state of FIG. 6 and the state of FIG. 7 a plurality of times during the magnetic field generation period in the magnetic field touch detection period.

<Entire Operation of Magnetic Field Touch Detection>

Next, the entire operation of the magnetic field touch detection about the display device 1 according to the first embodiment will be described.

The display device 1 according to the first embodiment incorporates therein an electromagnetic-induction-method input detection device and a capacitance-method input detection device, and is capable of performing time-divisionally a magnetic field touch detection operation, an electric field touch detection operation, and a display operation.

An operation of the display device 1 according to the first embodiment will be described with a waveform chart, but the waveform chart is divided into FIGS. 17 and 18 in order to prevent the drawing from being complicated.

Figure 17:
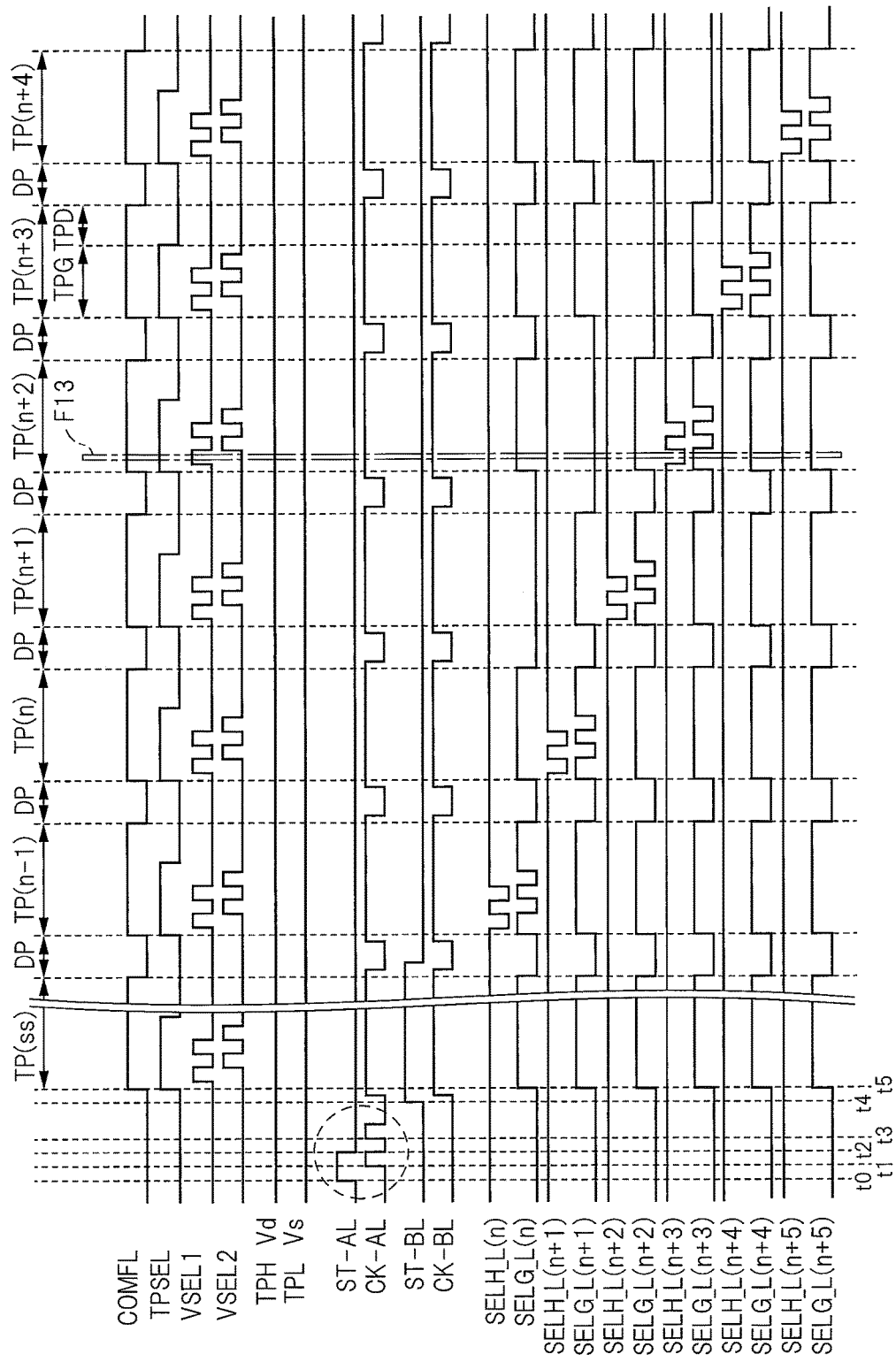
FIG. 17 is a waveform chart for describing an entire operation of the magnetic field touch detection according to the first embodiment.

FIG. 17 illustrates: waveforms of the control signal COMFL, a detection timing signal TPSEL, the state selection signals VSEL1 and VSEL2, and the drive signals TPH and TPL supplied in common with the first scanner circuit pair SCL, the second scanner circuit pair SCR, the first selection drive circuit SDL, and the second selection drive circuit SDR illustrated in FIG. 4; and waveforms of the shift clock signals CK-AL and CK-BL and the start signals ST-AL and AT-BL supplied to the first scanner circuit pair SCL. FIG. 17 illustrates waveforms of the first unit selection signals SELH_L(n) to SELH_L(n+5) and the second unit selection signals SELG_L(n) to SELG_L(n+5) outputted from the unit selection circuits SEL(n) to SEL(n+5) illustrated in FIG. 13.

Figure 18:
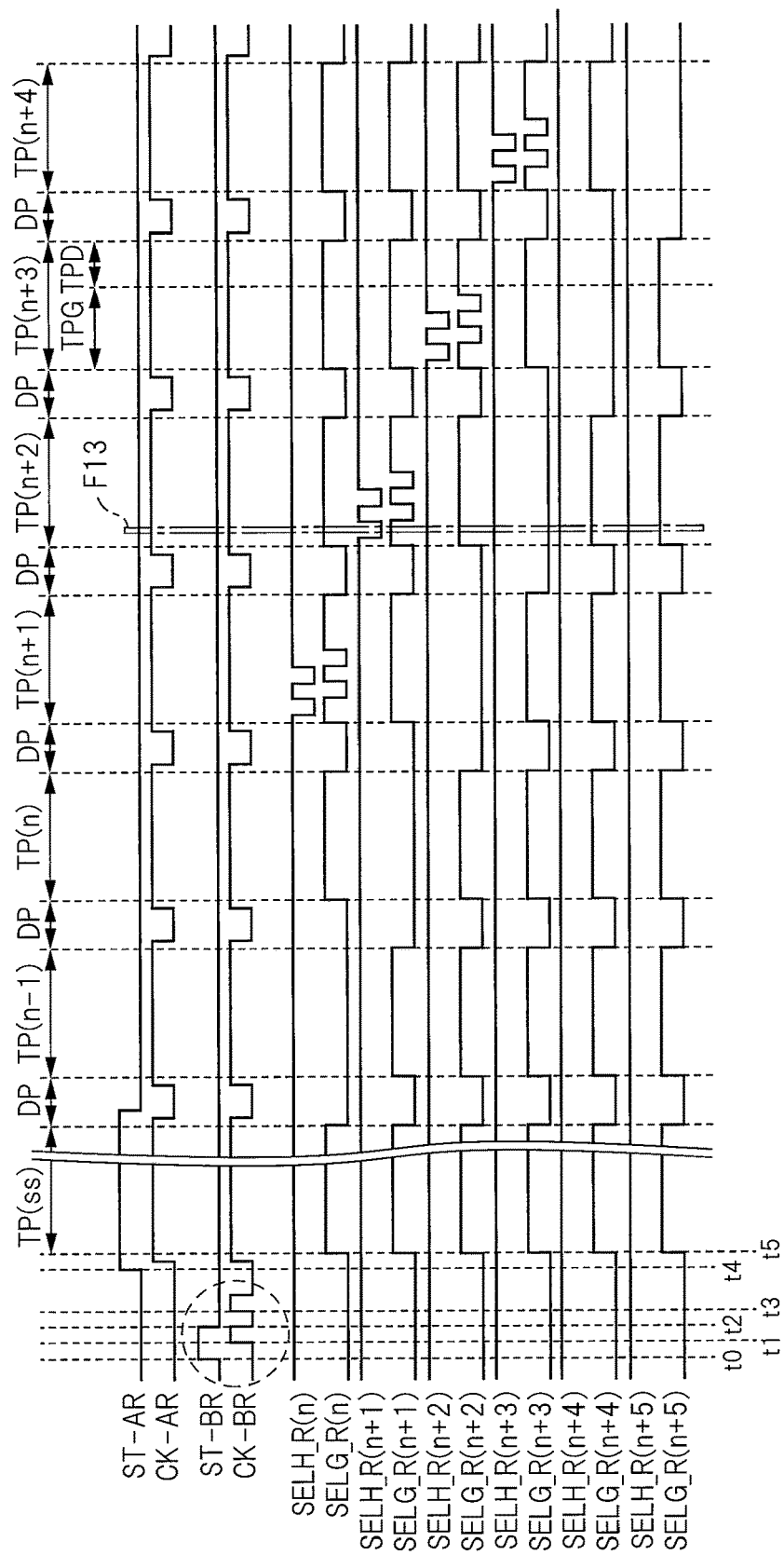
FIG. 18 is a waveform chart for describing the entire operation of the magnetic field touch detection according to the first embodiment.

Meanwhile, FIG. 18 illustrates waveforms of the shift clock signals CK-AR and CK-BR and the start signals ST-AR and ST-BR supplied to the second scanner circuit pair SCR and waveforms of the first unit selection signals SELH_R(n) to SELH_R(n+5) and the second unit selection signals SELG_R(n) to SELG_R(n+5) outputted from the unit selection circuits SER(n) to SER(n+5) illustrated in FIG. 13, respectively. If FIG. 18 is disposed on a lower side of FIG. 17, the waveform chart indicating the operation of the display device 1 is completed.

In FIGS. 17 and 18, "DP" denotes a display period during which an image is displayed in the display area 2. "TP(n−1)" to "TP(n+4)" each denote a period of the magnetic field detection (hereinafter, also referred to as a magnetic field touch detection period). "TP(ss)" denotes a start period from which the magnetic touch detection starts. According to the first embodiment, the magnetic field touch detection periods TP(n−1) to TP(n+4) each include the magnetic field generation period and the magnetic field detection period as described in FIG. 2. In FIG. 17, for example, the magnetic field generation period is denoted with reference sign "TPG" and the magnetic field detection period is denoted with reference sign "TPD", the magnetic field generation and detection periods configuring the magnetic field touch detection period TP(n+3). Similarly regarding the other magnetic field touch detection periods, each magnetic field touch detection period is configured by the magnetic field generation period TPG and the magnetic field detection period TPD subsequent thereto.

In the first embodiment, the control device 3 performs control so as to alternately generate the magnetic field touch detection periods and the display periods DP after the start period TP(ss) although the present embodiment is not particularly limited thereto. The control device 3 also performs control so as to generate a magnetic field in the area of one drive electrode in one magnetic field touch detection period. According to the first embodiment, the control device 3 performs control so as to sequentially generate a magnetic field from the area of the drive electrode TL(0) to the area of the drive electrode TL(p). A magnetic field is controlled so as to occur in the area of the drive electrode TL(n−1) during the magnetic field generation period in the magnetic field touch detection period TP(n−1) illustrated in FIGS. 17 and 18. Similarly, magnetic fields are controlled so as to occur in the areas of the drive electrodes TL(n) to TL(n+4) during the respective magnetic field generation periods in the magnetic field touch detection periods TP(n) to TP(n+4).

According to the first embodiment, the control device 3 causes the first scanner circuit pair SCL and the second scanner circuit pair SCR, etc. to grasp the magnetic field generation periods TPG by the detection timing signal TPSEL. That is, the control device 3 makes the detection timing signal TPSEL the high level during the magnetic field generation periods TPG. The first scanner circuit pair SCL and the second scanner circuit pair SCR output the first selection signals and the second selection signals as described above when the detection timing signal TPSEL is at the high level. The detection circuit DET illustrated in FIG. 4 operates when the detection timing signal TPSEL is at the low level. When the control signal COMFL and the detection timing signal TPSEL are at the low levels, the control device 3 supplies the image signal to the signal lines SL(0) to SL(p) and performs a display in the display periods DP although the present embodiment is not particularly limited thereto.

The control device 3 periodically varies the voltages of the state selection signals VSEL1 and VSEL2 a plurality of times in each of the magnetic field generation periods TPG. At this time, the control device 3 complementarily varies the voltages of the state selection signals VSEL1 and VSEL2 not to be overlapped.

The control device 3 starts to vary the shift clock signals CK-BL and CK-AR at a time t5 at which the start period TP(ss) starts, and varies, before the time t5, the shift clock signals CK-AL and CK-BR by a number corresponding to the sum of the separation amount stored in the separation-amount register S-REG and the number of electrodes included in the first drive electrode. The examples in FIGS. 17 and 18 each illustrate a case where the separation-amount register S-REG stores 1 as a separation amount and the number of electrodes included in the first drive electrode is 1. Therefore, the control device 3 varies the shift clock signals CK-AL and CK-BR two times at a time t1 and a time t3 earlier than the time t5. The control device 3 makes the start signals ST-AL and ST-BR the high levels each indicating the selection of the drive electrode in an interval between a time t0 and a time t2 between which the shift clock signals vary once.

After that, at a time t4, the control device 3 makes the start signals ST-BL and ST-AR the high levels each indicating the selection of a drive electrode. The control device 3 varies the shift clock signals CK-AL, CK-BL, CK-AR, and CK-BR at the time t5. After that, the control device 3 varies the shift clock signals CK-AL, CK-BL, CK-AR, and CK-BR every magnetic field touch detection period. At this time, the control device 3 varies the shift clock signals CK-AL, CK-BL, CK-AR, and CK-BR so as to have mutually the same cycle.

Accordingly, the shift stage storing the start signal ST-AL at the high level indicating the selection of the drive electrode in the shift register of the first scanner circuit SCAL goes forward earlier by two stages than the shift stage storing the start signal ST-BL at the high level in the shift register of the second scanner circuit SCBL. Similarly, the shift stage storing the start signal ST-BR at the high level indicating the selection of the drive electrode in the shift register of the fourth scanner circuit SCBR goes forward earlier by two stages than the shift stage storing the start signal ST-AR at the high level in the shift register of the third scanner circuit SCAR. That is, the first scanner circuit SCAL and the fourth scanner circuit SCBR select two-forward drive electrodes corresponding to the sum of the separation amount stored in the separation-amount register S-REG and 1 in comparison with the second scanner circuit SCBL and the third scanner circuit SCAR.

When the shift clock signals CK-AL, CK-BL, CK-AR, and CK-BR periodically vary and then reach the magnetic field touch detection period TP(n−1), the shift stage FAL(n) of the first scanner circuit SCAL(refer to FIG. 14A) retains the start signal at the high level and outputs the first selection signal AL(n) at the high level. When the stage selection signals VSEL1 and VSEL2 vary in the magnetic field touch detection period TP(n−1), the unit selection circuit SEL(n) corresponding to the shift stage FAL(n) outputs the first unit selection signal SELH_L(n) and the second unit selection signal SELG_L(n) varying in synchronization with the variations of the state selection signals VSEL1 and VSEL2 as illustrated in FIG. 17.

At this time, the shift stage FBR(n) of the fourth scanner circuit SCBR (refer to FIG. 15B) also retains the start signal at the high level, and thus the shift stage FBR(n) outputs the second selection signal BR(n) at the high level. Therefore, the first unit selection signal SELH_R(n) at the high level and the second unit selection signal SELG_R(n) at the low level are consecutively outputted from the corresponding unit selection circuit SER(n) in the magnetic field touch detection period TP(n−1), as illustrated in FIG. 18.

During the magnetic field generation period TPG in the magnetic field touch detection period TP(n−1), the first unit selection signal SELH_L(n) at the low level or the second unit selection signal SELG_L(n) at the low level is supplied to the unit drive circuit USL coupled to the first end n1 of the drive electrode TL(n) in accordance with the variations of the state selection signals VSEL1 and VSEL2, so that the first end n1 of the drive electrode TL(n) is coupled to the first wiring TPH or the second wiring TPL. Similarly, the second unit selection signal SELG_R(n) at the low level and the first unit selection signal SELH_R(n) at the high level are supplied to the unit drive circuit USR coupled to the second end n2 of the drive electrode TL(n), so that the second end n2 of the drive electrode TL(n) is coupled to the second wiring TPL.

In the magnetic field touch detection, the control device 3 supplies the first voltage Vd (a voltage higher than the grounding voltage) to the first wiring TPH and supplies the second voltage Vs (the grounding voltage) to the second wiring TPL.

Accordingly, during the magnetic field generation period TPG in the magnetic field touch detection period TP(n−1), the first end n1 of the drive electrode TL(n) is alternately coupled to the first wiring TPH and the second wiring TPL in accordance with the variations of the state selection signals VSEL1 and VSEL2, so that the first voltage Vd and the second voltage Vs are alternately supplied, and the second end n2 is consecutively coupled to the second wiring TPL, so that the second voltage Vs is supplied. Thus, the magnetic field generation period and the magnetic field generation intermitting period are repeated to generate a magnetic field.

When the shift clock signals CK-AL, CK-BL, CK-AR, and CK-BR vary and then reach the magnetic field touch detection period TP(n+1), the start signal at the high level moves from the shift stage FAL(n+1) to the shift stage FAL(n+2), and is stored in the shift stage FAL(n+2). Similarly, the start signal at the high level moves from the shift stage FBR(n+1) to the shift stage FBR(n+2), and is stored in the shift stage FBR(n+2).

At this time, the high-level start signal retrieved by the shift register of the second scanner circuit SCBL at the time t5 moves from the previous shift stage to the shift stage FBL(n) in the shift register of the second scanner circuit SCBL(refer to FIG. 14B), and is stored in the shift stage FBL(n). Similarly, at this time, the high-level start signal retrieved by the shift register of the third scanner circuit SCAR at the time t5, moves from the previous shift stage to the shift stage FAR(n) in the shift register of the third scanner circuit SCAR (refer to FIG. 15A), and is stored in the shift stage FAR(n).

Therefore, during the magnetic field generation period TPG in the magnetic field touch detection period TP(n+1), the unit selection circuit SEL(n+2) corresponding to the shift stage FAL(n+2) and the unit selection circuit SER(n) corresponding to the shift stage FAR(n) also output the first unit selection signals in synchronization with the periodic variations of the state selection signals VSEL1 and VSEL2. That is, as illustrated in FIGS. 17 and 18, the unit selection circuits SEL(n+2) and SER(n) output the first unit selection signals SELH_L(n+2) and SELH_R(n) and the second unit selection signals SELG_L(n+2) and SELG_R(n) varying periodically, respectively.

The unit selection circuits SEL(n) and SER(n+2) output the first unit selection signals SELH_L(n) and SELH_R(n+2) at the high levels and the second unit selection signals SELG_L(n) and SELG_R(n+2) at the low levels, respectively.

During the magnetic field generation period TPG in the magnetic field touch detection period TP(n+1), the first wiring TPH and the second wiring TPL are alternately coupled to the second end n2 of the drive electrode TL(n) and the first end n1 of the drive electrode TL(n+2) sandwiching the drive electrode TL(n+1) in accordance with the periodic variations of the state selection signals VSEL1 and VSEL2; and the first end n1 of the drive electrode TL(n) and the second end n2 of the drive electrode TL(n+2) are consecutively coupled to the second wiring TPL. As a result, the magnetic field generated around the drive electrode TL(n) and the magnetic field generated around the drive electrode TL(n+2) are superimposed in the area of the drive electrode TL(n+1).

An operation in each of the magnetic field touch detection periods TP(n+2) to TP(n+4) is the same as that of the magnetic field touch detection period TP(n+1) except that the high-level start signals sequentially move, and thus the descriptions thereof will be omitted.

Note that the coupling states illustrated in FIG. 13 correspond to those at the timing surrounded with dot-and-dash lines F13 in FIGS. 17 and 18.

According to the first embodiment, after retrieving the start signals at the high levels at the time t1 illustrated in FIGS. 17 and 18, the shift registers of the first scanner circuit SCAL and the fourth scanner circuit SCBR retrieve the start signals at the low levels each indicating the non-selection of the drive electrode in synchronization with the variations of the shift clock signals CK-AL and CK-BR, respectively. Similarly, after retrieving the start signals at the high levels at the time t5 illustrated in FIGS. 17 and 18, the shift registers of the second scanner circuit SCBL and the third scanner circuit SCAR retrieve the start signals at the low levels each indicating the non-selection of the drive electrode, in synchronization with the variations of the shift clock signals CK-BL and CK-AR, respectively.

Accordingly, in the magnetic field touch detection period, the remaining shift stages except the shift stage retaining the start signal at the high level each output the first selection signal and the second selection signal at the low levels. In the magnetic field touch detection period TP(n+1) illustrated in FIGS. 17 and 18, the shift stages FAL(n+1), FAL(n+3) to FAL(n+5), FBL(n+1), FBL(n+3) to FBL(n+5), FAR(n+1), FAR(n+3) to FAR(n+5), FBR(n+1), and FBR(n+3) to FBR(n+5), which have not been selected by any scanner circuits, each retain the low level indicating the non-selection. Therefore, the first selection signal and the second selection signal outputted from each of the shift stages become the low levels.

As described in FIG. 16, when the first selection signals and the second selection signals each indicate the low level indicating the non-selection, the pair of first end n1 and second end n2 of each of the drive electrodes TL(n+1), and TL(n+3) to (n+5) corresponding to the shift stages are electrically separated from the first wiring TPH and the second wiring TPL. As a result, in the magnetic touch detection periods, the non-selected drive electrodes are not coupled to the first wiring TPH and the second wiring TPL, and become floating states. Accordingly, when the voltage of the selected drive electrode is varied, charge and discharge in parasitic capacitance between the non-selected drive electrodes can be reduced, so that a speed of varying the voltage of the selected drive electrode can be improved.

According to the first embodiment, in the magnetic field touch detection period, the control device 3 controls the gate driver 4 (4L and 4R) illustrated in FIG. 4 so that the gate driver 4 makes all the scanning lines the floating states. Furthermore, the control device 3 makes all the signal lines SL(0) to SL(p) floating states in the magnetic field touch detection periods. Accordingly, when the selected voltage of the drive electrode is varied, charge and discharge in parasitic capacitance between the scanning lines, the signal lines, and the selected drive electrode can be reduced, so that the speed of varying the voltage of the selected drive electrode can be improved.

In the magnetic field touch detection period, the magnetic field from the pen Pen is detected in the magnetic field detection period TPD following the magnetic field generation period TPG, and an operation in the magnetic field detection period TPD is the same as the operation described in FIG. 2B. That is, the detection electrodes RL(0) to RL(p) formed on the second substrate CGB, form the magnetic field detection coils DY(n−2) to DY(n+1), so that the magnetic field from the pen Pen is detected. The operation of the magnetic field detection period TPD is the same as the operation described in FIG. 2B, and thus the description thereof will be omitted.

<Operation of Electric Field Touch Detection>

Figure 19:
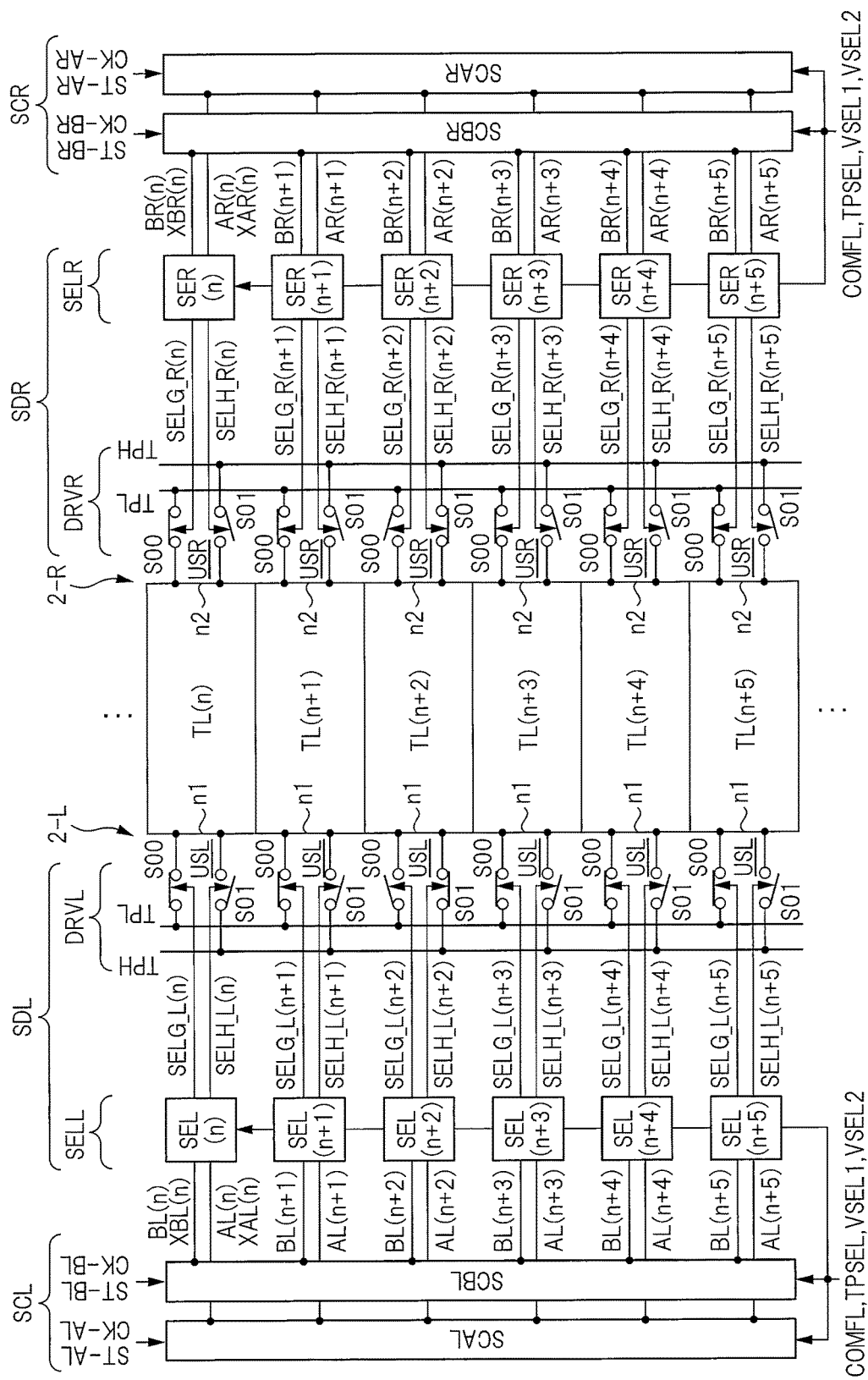
FIG. 19 is a block diagram for describing an operation of electric field touch detection according to the first embodiment.
Figure 20:
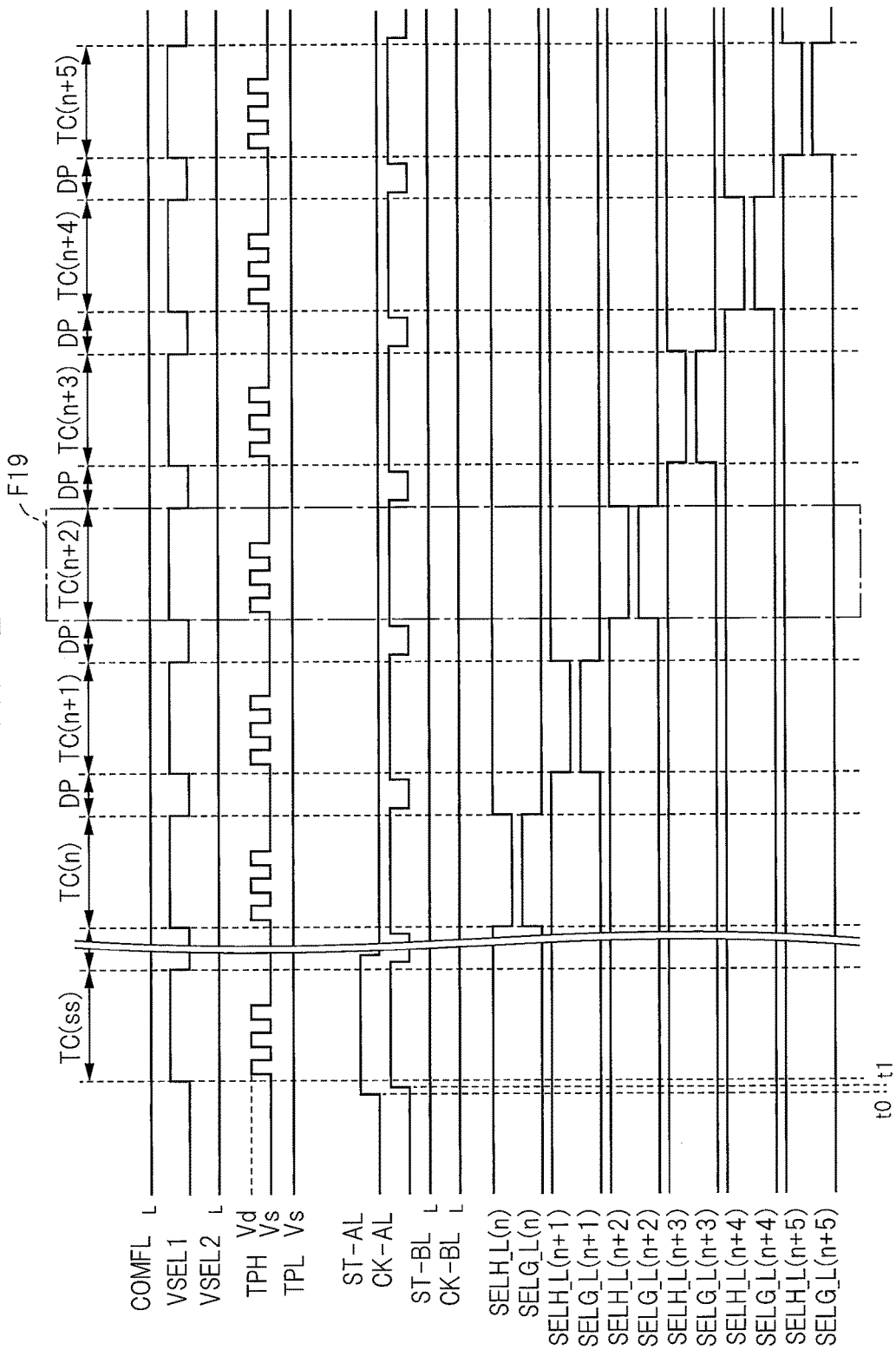
FIG. 20 is a waveform chart for describing the operation of the electric field touch detection according to the first embodiment.
Figure 21:
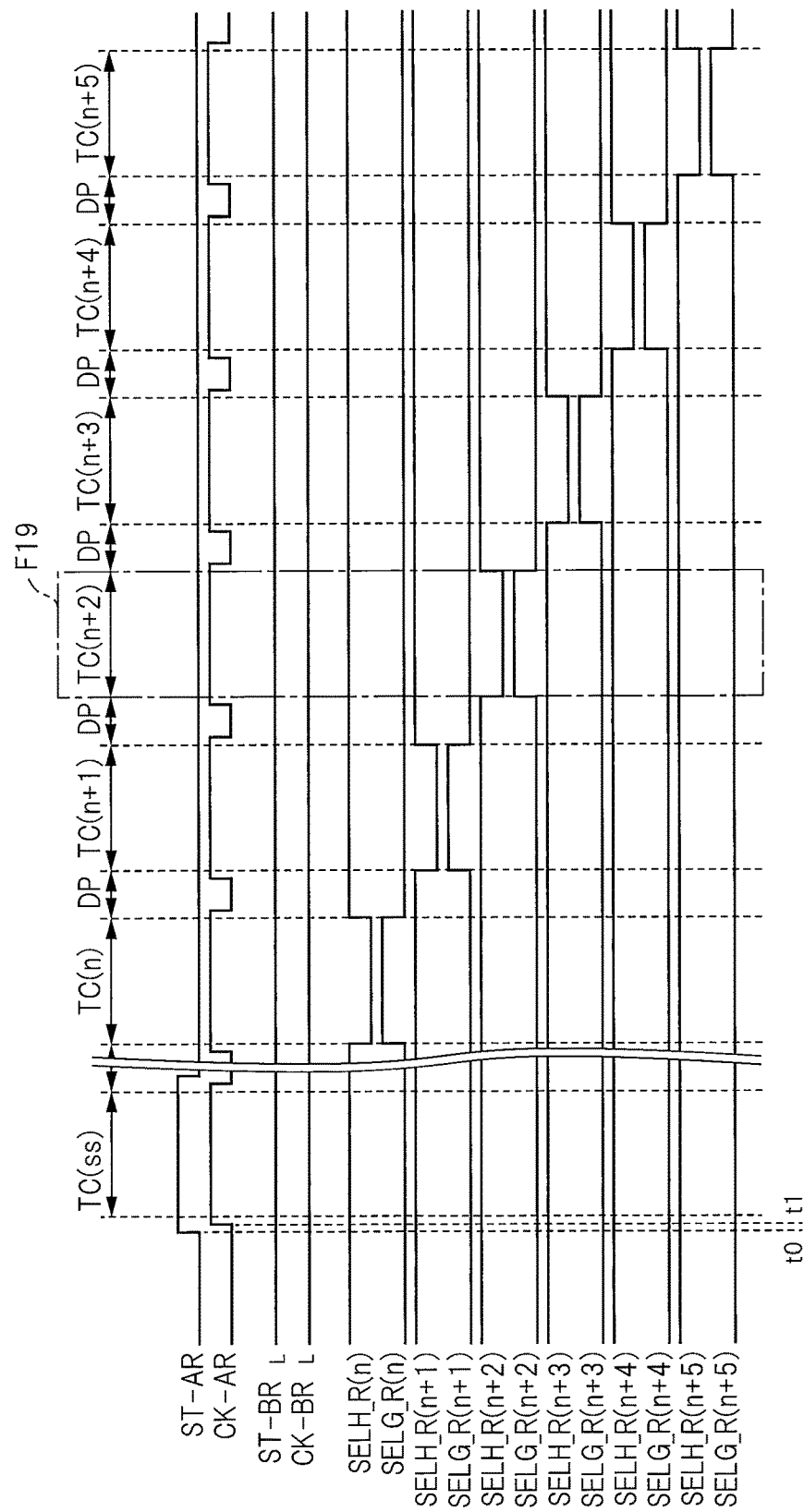
FIG. 21 is a waveform chart for describing the operation of the electric field touch detection according to the first embodiment.

The display device 1 according to the first embodiment is capable of performing both of the magnetic field touch detection and the electric field touch detection. Next, an operation in performing the electric field touch detection will be described. FIG. 19 is a block diagram showing a configuration of the electric field touch detection. The block diagram illustrated in FIG. 19 is the same as the block diagram illustrated in FIG. 13 except that the coupling of each of the first switch S01 and the second switch S00 is altered, and thus the description thereof will be omitted. FIGS. 20 and 21 are waveform charts for describing the operation of the electric field touch detection.

As illustrated in FIG. 19, a configuration of the display device 1 at the electric field touch detection is the same as that at the magnetic field touch detection, but waveforms of the signals formed by the control device 3 at the electric field touch deletion are different from those at the magnetic field touch detection. The operation of the electric field touch detection will be described with a waveform chart, but here the waveform chart is divided into FIGS. 20 and 21 in order to prevent the drawing from being complicated. If FIG. 21 is disposed on the lower side of FIG. 20, the waveform chart is completed. FIGS. 20 and 21 are similar to FIGS. 17 and 18, and thus differences therebetween will be mainly described here.

As already described, the detection timing signal TPSEL is used in order to identify the magnetic field generation period and the magnetic field detection period, in the magnetic field touch detection. In contrast to this, as described in FIG. 3 in the electric field touch detection, the drive electrode generates the electric field, and the detection electrode detects a variation in the electric field in this case so that a touch is detected. Therefore, the period of generating the electric field and the period of detecting the electric field are not required to be identified, the detection timing signal TPSEL is not used, and thus the detection timing signal TPSEL is omitted in FIGS. 20 and 21.

According to the first embodiment similarly to the magnetic field touch detection, the control device 3 controls a display period and an electric field touch detection period to be alternately generated. In FIGS. 20 and 21, "DP" denotes the display period, and "TC(n)" to "TC(n+5)" denote the electric field touch detection periods in which the electric field touch detection is performed in the areas of the drive electrodes TL(n) to TL(n+5), respectively. "TC(ss)" denotes the start period from which the electric field touch detection starts.

In the electric field touch detection as illustrated in FIG. 20, the control device 3 makes the control signal COMFL a low level L, and makes the second wiring TPL the second voltage Vs. The control device 3 periodically varies the voltage of the first wiring TPH between the second voltage Vs and the first voltage Vd, in the start period TC(ss) and in the electric field touch detection periods (TC(n) to TC(n+5) in FIGS. 20 and 21). Furthermore, the control device 3 makes the state selection signal VSEL2 the low level L in the electric field touch detection period, and switches the state selection signal VSEL1 from the low level L to a high level H in the start period TC(ss) and in the electric field touch detection period.

The control device 3 uses the separation amount stored in the separation-amount register S-REG in the magnetic field touch detection to generate the shift clock signals and the start signals, but does not use the separation amount in the electric field touch detection to generate the shift clock signals and the start signals. That is, the control device 3 switches the start signals ST-AL and ST-AR from the low levels to the high levels each indicating the selection of the drive electrode at the time t0 in the electric field touch detection as illustrated in FIGS. 20 and 21. The control device 3 switches the shift clock signals CK-AL and CK-AR from the low levels to the high levels per the start period TC(ss) and per of the electric field touch detection period. That is, the shift clock signals CK-AL and CK-AR are periodically varied. Meanwhile, in the electric field detection as illustrated in FIGS. 20 and 21, the control device 3 retains the start signals ST-BL and ST-BR at the low levels L, and retains the shift clock signals CK-BL and CK-BR to be at the low levels L. That is, the shift clock signals CK-BL and CK-BR are not varied in the electric field touch detection.

The shift clock signals CK-AL and CK-AR vary at the time t1, so that the shift registers of the first scanner circuit SCAL and the third scanner circuit SCAR retrieve the start signals ST-AL and ST-AR at the high levels each indicating the selection of the drive electrode, respectively. In contrast to this, the shift clock signals CK-BL and CK-BR do not vary, so that the shift registers of the second scanner circuit SCBL and the fourth scanner circuit SCBR do not retrieve the start signals ST-BL and ST-BR and output the previous states, respectively. The shift registers of the second scanner circuit SCBL and the fourth scanner circuit SCBR are reset at a time earlier than the time t0, and all of the second selection signals outputted from the second scanner circuit SCBL and the fourth scanner circuit SCBR become the low levels although the present embodiment is not particularly limited thereto.

When the shift clock signals CK-AL and CK-AR vary every repetition of the electric field touch detection period, and reach the electric field touch detection period TC(n), the shift stages FAL(n) and FAR(n) illustrated in FIGS. 14A and 15A retrieve and retain the start signals ST-AL and ST-AR, which is outputted from the previous shift stages, at the high levels each indicating the selection in synchronization with the variations of the shift clock signals CK-AL and CK-AR, respectively. As a result, the first selection signals AL(n) and AR(n) outputted from the shift stages FAL(n) and FAR(n)

vary from the low levels to the high levels. Accordingly, the first transfer switches TP1L and TP1R and the second transfer switches TP2L and TP2R become the on-states in the respective unit selection circuits SEL(n) and SER(n) illustrated in FIG. 16.

At this time, the state selection signal VSEL1 is at the high level H and the state selection signal VSEL2 is at the low level L, so that the second unit selection signals SELG_L(n) and SELG_R(n) become the high levels, and the first unit selection signals SELH_L(n) and SELH_R(n) become the low levels, as illustrated in FIGS. 20 and 21. Accordingly, the P transistors P6L and P6R become the on-states, and the P transistors P7L and P7R become the off-states in the unit drive circuits USL and USR corresponding to the unit selection circuits SEL(n) and SER(n), respectively. As a result, the first end n1 of the drive electrode TL(n) corresponding to the shift stages FAL(n) and FAR(n) is coupled to the first wiring TPH through the P transistor P6L, and the second end n2 is coupled to the first wiring TPH through the P transistor P6R.

The voltage supplied to the first wiring TPH periodically varies in the electric field touch detection period TC(n), so that the signals periodically varying are supplied to the first end n1 and the second end n2 of the drive electrode TL(n), and the drive electrode TL(n) generates an electric field in accordance with the variations of the signals.

Incidentally, the second scanner circuit SCBL and the fourth scanner circuit SCBR consecutively output the second selection signals at the low levels in the electric field touch detection, so that the N transistors N5L and N5R in the unit selection circuits SEL(n) and SER(n) become the off-states.

In the electric field touch detection period TC(n), all of the shift stages except the shift stages FAL(n) and FAR(n) retain the low levels each indicating the non-selection of the drive electrode in the shift registers of the first scanner circuit SCAL and the third scanner circuit SCAR, so that the first selection signals become the low levels. In the examples illustrated in FIGS. 14 and 15, the shift stages FAL(n+1) to FAL(n+5) and FAR(n+1) to FAR(n+5) output the first selection signals AL(n+1) to AL(n+5) and AR(n+1) to AR(n+5) at the low levels, respectively. Therefore, the first transfer switch TP1L and the second transfer switch TP2L become the off-states in each of the unit selection circuits SEL(n+1) to SEL(n+5) corresponding to the shift stages FAL(n+1) to FAL(n+5), and the first transfer switch TP1R and the second transfer switch TP2R are turned off in each of the unit selection circuits SER(n+1) to SER(n+5) corresponding the shift stages FAR(n+1) to FAR(n+5).

In this case, the N transistors N6L and N7L become the on-states in each of the unit selection circuits SEL(n+1) to SEL(n+5), and the N transistors N6R and N7R are turned on in each of the unit selection circuits SER(n+1) to SER(n+5), so that the voltage VGLO at the low level is supplied to the inverter circuits IV2L and IV2R. As a result, the unit selection circuits SEL(n+1) to SEL(n+5) and SER(n+1) to SER(n+5) output the first unit selection signals SELH_L(n+1) to SELH_L(n+5) and SELH_R(n+1) to SELH_R(n+5) at the high levels as illustrated in FIGS. 20 and 21.

Also at this time, the third transfer switch TP3L and the fourth transfer switch TP4L become the on-states in each of the unit selection circuits SEL(n+1) to SEL(n+5), and the third transfer switch TP3R and the fourth transfer switch TP4R become the on-states in each of the unit selection circuits SER(n+1) to SER(n+5), so that the control signal COMFL at the low level is phase-inverted by the inverter circuits IV1L and IV1R, and is supplied to the inverter circuits IV3L and IV3R, respectively. As a result, the unit selection circuits SEL(n+1) to SEL(n+5) and SER(n+1) to SER(n+5) output the second unit selection signals SELG_L(n+1) to SELG_L(n+5) and SELG_R(n+1) to SELG_R(n+5) at the low levels, as illustrated in FIGS. 20 and 21.

In this manner, the unit selection circuits corresponding to the shift stages each storing the low level indicating the non-selection output the second unit selection signals at the low level (e.g., SELG_L(n+1) to SELG_L(n+5) and SELG_R(n+1) to SELG_R(n+5)), so that the P transistor P7L become the on-states in the unit drive circuit USL, and the P transistor P7R becomes the on-state in the unit drive circuit USR in the unit drive circuits USL and USR corresponding to those shift stages. As a result, the second voltage Vs is supplied to the first end n1 and the second end n2 of each of the non-selected drive electrodes TL(n+1) to TL(n+5) through the second wiring TPL, so that the noise reduction can be achieved.

The electric field touch detection period TC(n) has been described as an example. But, when the high level indicating the selection of the drive electrode moves through the shift stages, the selected drive electrodes TL(n+1) to TL(n+5) similarly generate the electric fields also in the electric touch detection periods TC(n+1) to TC(n+5), respectively. For example, in FIGS. 20 and 21, the shift stages FAL(n+2) and FAR(n+2) each retain the high level indicating the selection of the drive electrode TL(n+2) at timing (a dot-and-dash line F19) that is the electric field touch detection period TC(n+2). Accordingly, the first unit selection signals SELH_L(n) to SELH_L(n+5) and SELH_R(n) to SELH_R(n+5) and the second unit selection signals SELG_L(n) to SELG_L(n+5) and SELG_R(n) to SELG_R(n+5) are outputted as illustrated in FIGS. 20 and 21, and the first switches S01 (P6L and P6R) and the second switches S00 (P7L and P7R) are made a state as illustrated in FIG. 19. In this state, the drive electrode TL(n+2) is selected, and the drive signals whose voltages periodically vary are supplied to the first end n1 and the second end n2 thereof, so that the drive electrode TL(n+2) generates an electric field in accordance with the drive signals.

As described in FIG. 3, the variation of the electric field is detected by using the detection electrodes RL(0) to RL(p) formed on the second substrate in each of the electric field touch detection periods TC(n) to TC(n+5). The detection of the variation of the electric field by the detection electrodes, is the same as that described in FIG. 3, and thus the description thereof will be omitted.

<Effect>

According to the first embodiment, provided can be the display device 1 capable of the noise reduction in a case where the electromagnetic-induction-method input detection device and the capacitance-method input detection device are built in. Particularly, the noise accompanied with the capacity components of the first wiring TPH can be reduced. Charge and discharge in the loads are reduced, so that the speed of varying the voltage of the drive electrode can be increased. As a result, both drives by the electromagnetic induction method and the capacitance method can be performed, and simultaneously speed-up of the drive and the noise reduction by the electromagnetic induction method can be made.

Second Embodiment

A display device 1 according to a second embodiment will be described. According to the second embodiment, differences from the first embodiment that has been previously described, will be mainly described.

Figure 22:
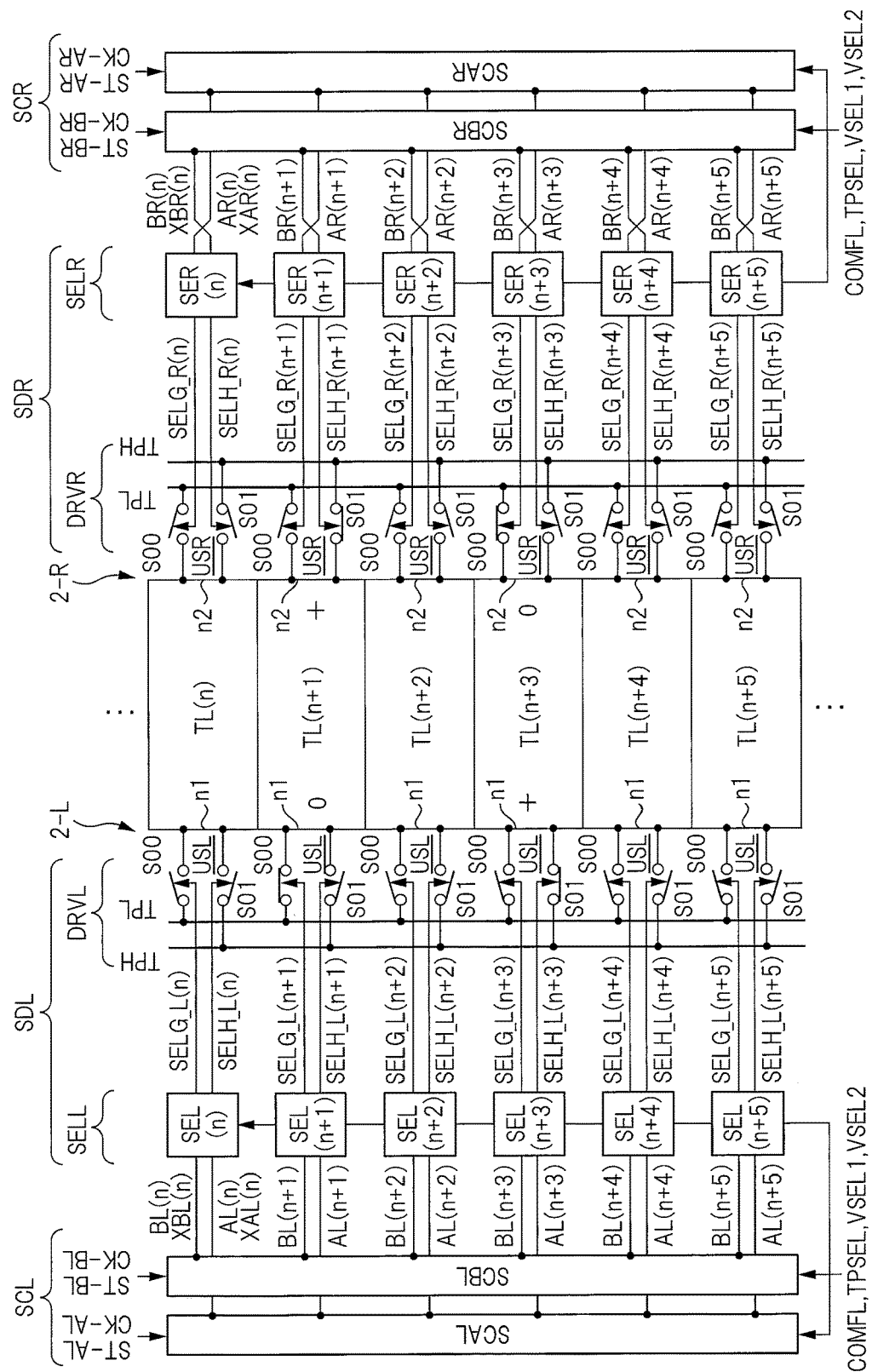
FIG. 22 is a block diagram showing a configuration of a first scanner circuit pair, a second scanner circuit pair, a first selection drive circuit, and a second selection drive circuit according to a second embodiment.

FIG. 22 is a block diagram of configurations of a first scanner circuit pair SCL, a second scanner circuit pair SCR, a first selection drive circuit SDL, and a second selection drive circuit SDR according to the second embodiment. FIG. 22 is similar to FIG. 13 that has been previously described, and thus a difference therebetween will be mainly described here. The difference is that coupling of selection signals from the second scanner circuit pair SCR to the second selection drive circuit SDR in FIG. 22 is different from that in FIG. 13. That is, the first selection signals AR(n) to AR(n+5) and first inverse selection signals XAR(n) to XAR(n+5), and, the second selection signals BR(n) to BR(n+5) and second inverse selection signals XBR(n) to XBR(n+5), which are supplied to unit selection circuits SER(n) to SER(n+5) configuring the second selection drive circuit SDR, are exchanged. FIG. 22 and FIG. 13 are the same except the above difference.

Figure 23:
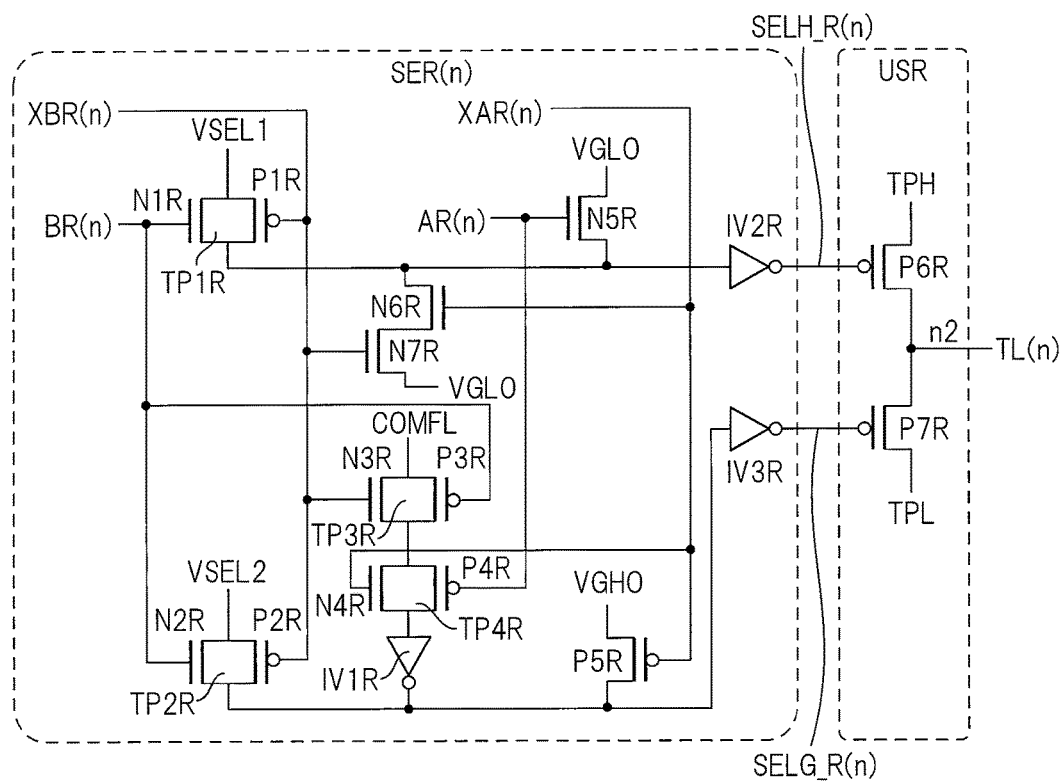
FIG. 23 is a circuit diagram showing the configuration of the second selection drive circuit according to the second embodiment.

FIG. 23 is a circuit diagram of a configuration of the second selection drive circuit SDR according to the second embodiment. FIG. 23 illustrates configurations of the unit selection circuit SER(n) and a unit drive circuit USR corresponding to the unit selection circuit SER(n) among the plurality of unit selection circuits configuring the second selection drive circuit SDR. Configurations of unit selection circuits SEL(n) to SEL(n+5) and unit drive circuits USL configuring the first selection drive circuit SDL according to the second embodiment are the same as those according to the first embodiment. For example, the unit selection circuit SEL(n) and the unit drive circuit USL corresponding to the unit selection circuit SEL(n) illustrated in FIG. 22 have the same configurations as those illustrated in FIG. 16A. The unit selection circuits SEL(n+1) to SEL(n+5) and the unit drive circuit USL corresponding to each of them as illustrated in FIG. 22 have the same configurations as those illustrated in FIG. 16A.

The unit selection circuit SER(n) illustrated in FIG. 23 includes a first transfer switch TP1R to a fourth transfer switch TP4R, N transistors N5R to N7R, a P transistor P5R, and inverter circuits IV1R to IV3R similarly to the unit selection circuit illustrated in FIG. 16B. Mutual coupling of the first transfer switch TP1R to the fourth transfer switch TP4R, the N transistors N5R to N7R, the P transistor P5R, and the inverter circuits IV1R to IV3R, is the same as that of FIG. 16B. The configuration of the unit drive circuit USR corresponding to the unit selection circuit SER(n) is the same as that of the unit drive circuit illustrated in FIG. 16B.

The first transfer switch TP1R, the second transfer switch TP2R, and the third transfer switch TP3R are switch-controlled by the first selection signal AR(n) and the first inverse selection signal XAR(n) from the third scanner circuit SCAR, and the N transistor N7R is switch-controlled by the first inverse selection signal XAR(n) in the unit selection circuit illustrated in FIG. 16B. The fourth transfer switch TP4R is switch-controlled by the second selection signal BR(n) and the second inverse selection signal XBR(n) from the fourth scanner circuit SCBR, the N transistor N5R is switch-controlled by the second selection signal BR(n), and the N transistor N6R and the P transistor P5R are switch-controlled with the second inverse selection signal XBR(n), in the unit selection circuit of FIG. 16B.

In contrast to this, the first transfer switch TP1R, the second transfer switch TP2R, and the third transfer switch TP3R are switch-controlled by the second selection signal BR(n) and the second inverse selection signal XBR(n) from the fourth scanner circuit SCBR, and the N transistor N7R is switch-controlled by the second inverse selection signal XBR(n) in the unit selection circuit SER(n) illustrated in FIG. 23. The fourth transfer switch TP4R is switch-controlled by the first selection signal AR(n) and the first inverse selection signal XAR(n) from the third scanner circuit SCAR, the N transistor N5R is switch-controlled by the first selection signal AR(n), the N transistor N6R and the P transistor P5R are switch-controlled by the first inverse selection signal XAR(n) in the unit selection circuit of FIG. 23. Here, the unit selection circuit SER(n) has been described as an example, but the other unit selection circuits SER(n+1) to SER(n+5) can be similarly described. Accordingly, according to the second embodiment, the first selection signals and the second selection signals supplied from the third scanner circuit SCAR and the fourth scanner circuit SCBR to the second selection drive circuit SDR are exchanged with those according to the first embodiment.

<Entire Operation of Magnetic Field Touch Detection>

Figure 24:
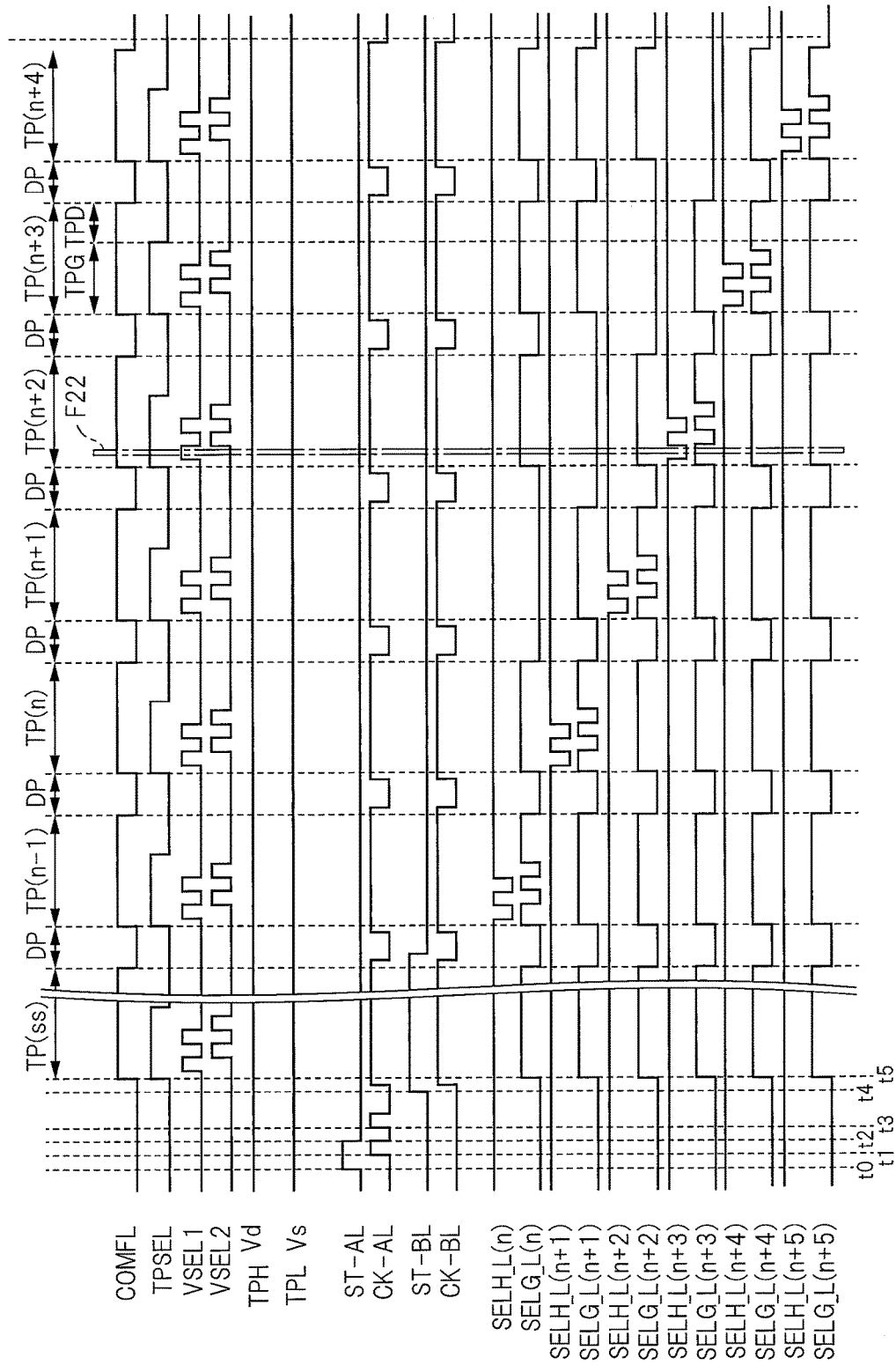
FIG. 24 is a waveform chart for describing an entire operation of magnetic field touch detection according to the second embodiment.
Figure 25:
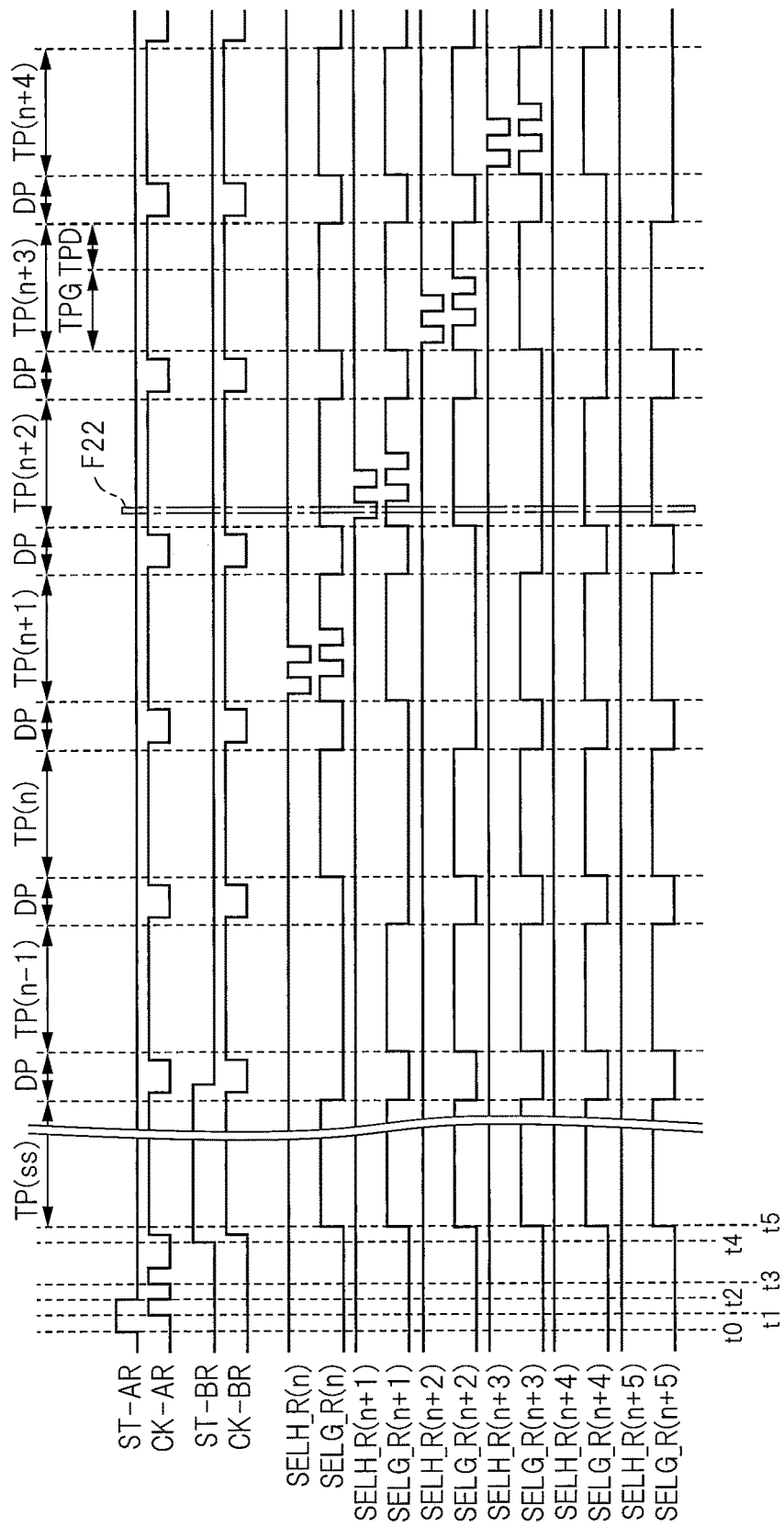
FIG. 25 is a waveform chart for describing the entire operation of the magnetic field touch detection according to the second embodiment.

Next, the entire operation of the magnetic field touch detection in the display device 1 according to the second embodiment will be described with a waveform chart. Also here, the waveform chart is divided into FIGS. 24 and 25 in order to prevent the drawing from being complicated. If FIG. 25 is disposed on the lower side of FIG. 24, the waveform chart illustrating the operation of the display device 1 is completed. FIGS. 24 and 25 are similar to FIGS. 17 and 18, and thus differences therebetween will be mainly described here.

Also in the second embodiment similarly to the first embodiment, a control device 3 forms start signals ST-AR, ST-BR, ST-AL, and ST-BL and shift clock signals CK-AL, CK-BL, CK-AR, and CK-BR on the basis of information on the sum of a separation amount stored in a separation-amount register S-REG and 1. In the first embodiment, the control device 3 varies the shift clock signals CK-AL and CK-BR the number of times equal to the sum of the separation amount and 1 before the start period TP(ss), and supplies, to the first scanner circuit SCAL and the fourth scanner circuit SCBR, the start signals ST-AL and ST-BR at the high levels each indicating the selection of the drive electrode when varying the shift clock signals CK-AL and CK-BR for the first time. In contrast to this, in the second embodiment, the control device 3 varies the shift clock signals CK-AL and CK-AR supplied to the first scanner circuit SCAL and the third scanner circuit SCAR, respectively, the number of times equal to the sum of the separation amount and 1 before the start period TP(ss), and supplies, to the first scanner circuit SCAL and the third scanner circuit SCAR, the start signals ST-AL and ST-AR at the high levels each indicating the selection of the drive electrode when varying the shift clock signals CK-AL and CK-AR for the first time.

That is, in FIGS. 24 and 25, the control device 3 varies the shift clock signals CK-AL and CK-AR at the time t1 earlier than the time t5 at which the start period TP(ss) starts. Also in the second embodiment, the number of times based on the separation amount is two similarly to the first embodiment, so that the control device 3 varies, from the time t0 to the time t2, the shift clock signals CK-AL and CK-AR at the time t1 and at the time t3 earlier than the time t5. The control device 3 makes the start signals ST-AL and ST-AR the high levels each indicating the selection of the drive electrode. After that, the control device 3 makes, at the time t4, the start signals ST-BL and ST-BR the high levels each indicating the selection of the drive electrode. Subsequently, the control device 3 varies shift clock signals CK-AL, CK-BL, CK-AR, and CK-BR every magnetic field touch detection period (e.g., TP(n−1) to TP(n+4)). At this time, the control device 3 varies the shift clock signals CK-AL, CK-BL, CK-AR, and CK-BR so as to have mutually the same cycle.

Accordingly, the first scanner circuit SCAL and the third scanner circuit SCAR each output a first selection signal designating a drive electrode close to the drive electrode TL(p) side by two electrodes from a drive electrode designated by a second selection signal outputted from each of a second scanner circuit SCBL and the fourth scanner circuit SCBR.

When the shift clock signals CK-AL, CK-BL, CK-AR and CK-BR vary and reach, for example, the magnetic field touch detection period TP(n−1), shift stages FAL(n) and FAR(n) in the first scanner circuit SCAL and the third scanner circuit SCAR (refer to FIGS. 14 and 15) retrieve and retain the start signals ST-AL and ST-AR at the high levels from the previous shift stages, respectively. Accordingly, the first selection signal AL(n) and the first selection signal AR(n) become the high levels. When the first selection signal AL(n) become the high level, the first transfer switch TP1L and the second transfer switch TP2L become the on-states in the unit selection circuit SEL(n) illustrated in FIG. 16A, and the unit selection circuit SEL(n) outputs the first unit selection signal SELH_L(n) and the second unit selection signal SELG_L(n) each varying in accordance with the state selection signals VSEL1 and VSEL2 as illustrated in FIG. 24. In contrast to this, when the first selection signal AR(n) becomes the high level, the N transistor N5R and the P transistor P5R become the on-states in the unit selection circuit SER(n) illustrated in FIG. 23. As a result, as illustrated in FIG. 25, the unit selection circuit SER(n) outputs the first unit selection signal SELH_R(n) at the high level and the second unit selection signal SELG_R(n) at the low level, which vary in accordance with the state selection signals VSEL1 and VSEL2.

Accordingly, the first voltage Vd and the second voltage Vs are alternately supplied to the first end n1 of the drive electrode TL(n) through the P transistors P6L and P7L in the unit drive circuit USL, and the second voltage Vs is supplied to the second end n2 of the drive electrode TL(n) through the P transistor P7R in the unit drive circuit USR. As a result, the drive electrode TL(n) becomes a drive state in accordance with the variations of the state selection signals VSEL1 and VSEL2, and generates a magnetic field.

Next, when the shift clock signals CK-AL, CK-BL, CK-AR, and CK-BR vary and reach, for example, the magnetic field touch detection period TP(n+1), the start signals at the high levels move and reach the shift stages FAL(n+2), FAR(n+2), FBL(n), and FBR(n) in shift registers in the first scanner circuit SCAL, the second scanner circuit SCBL, the third scanner circuit SCAR, and the fourth scanner circuit SCBR, respectively. Accordingly, the first scanner circuit SCAL and the third scanner circuit SCAR make the first selection signal AL(n+2) and the first selection signal AR(n+2) the high levels so as to select the drive electrode TL(n+2), and the second scanner circuit SCBL and the fourth scanner circuit SCBR make the second selection signal BL(n) and the second selection signal BR(n) the high levels so as to select the drive electrode TL(n).

When the first selection signals AL(n+2) and AR(n+2) become the high levels, the first unit selection signal SELH_L(n+2) and the second unit selection signal SELG_L(n+2) vary in accordance with the state selection signals VSEL1 and VSEL2 as illustrated in FIGS. 24 and 25. Also, the first unit selection signal SELH_R(n+2) becomes the high level, and the second unit selection signal SELG_R(n+2) becomes the low level. As a result, the drive electrode TL(n+2) becomes a drive state, and generates a magnetic field.

When the second selection signals BL(n) and BR(n) become the high levels, the N transistor N5L and the P transistor P5L illustrated in FIG. 16A become the on-states and the first transfer switch TP1R and the second transfer switch TP2R illustrated in FIG. 23 become the on-states. Accordingly, as illustrated in FIGS. 24 and 25, the first unit selection signal SELH_R(n) and the second unit selection signal SELG_R(n) vary in accordance with the state selection signals VSEL1 and VSEL2. Also, the first unit selection signal SELH_L(n) becomes the high level, and the second unit selection signal SELG_L(n) becomes the low level. As a result, the drive electrode TL(n) becomes a drive state, and generates a magnetic field.

The magnetic field generated around the drive electrode TL(n) and the magnetic field generated around the drive electrode TL(n+2) are superimposed in the area of the drive electrode TL(n+1). A variation of the generated magnetic fields can be increased since the respective magnetic fields are generated.

After that, the magnetic fields are similarly generated in each of the magnetic field touch detection periods TP(n+2) to TP(n+5). Note that the coupling state illustrated in FIG. 22 corresponds to that at timing surrounded with each dot-and-dash line F22 in FIGS. 24 and 25.

Similarly to the first embodiment, the control signal COMFL becomes the high level in the magnetic field touch detection periods, so that the non-selected drive electrodes become floating states. Accordingly, similarly to the first embodiment, parasitic capacitance charged and discharged in varying the voltage of the selected drive electrode can be reduced. Furthermore, similarly to the first embodiment, the control device 3 controls the scanning lines and the signal lines so as to become the floating states in the magnetic field touch detection periods. Also by this, the parasitic capacitance charged and discharged in varying the voltage of the selected drive electrode can be reduced.

<Operation of Electric Field Touch Detection>

Figure 26:
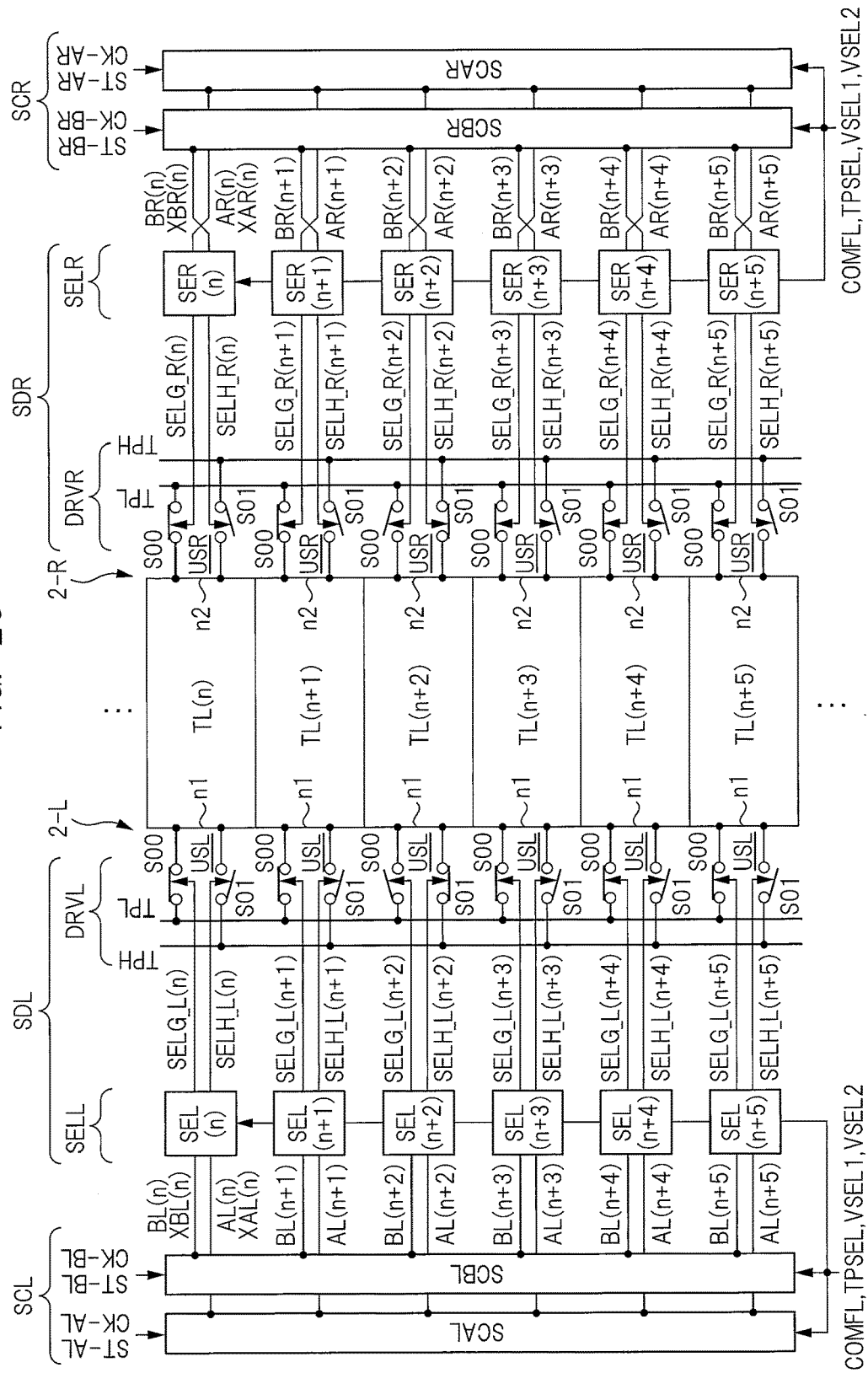
FIG. 26 is a block diagram for describing an operation of electric field touch detection according to the second embodiment.

Similarly to the first embodiment, also in the second embodiment, the electric field touch detection can be performed. FIG. 26 is a block diagram of a configuration of the electric field touch detection. In FIG. 26, the first selection signals AR(n) to AR(n+5) and the second selection signals BR(n) to BR(n+5) supplied to the unit selection circuits SER(n) to SER(n+5) configuring the second selection drive circuit SDR are exchanged similarly to FIG. 22.

Figure 27:
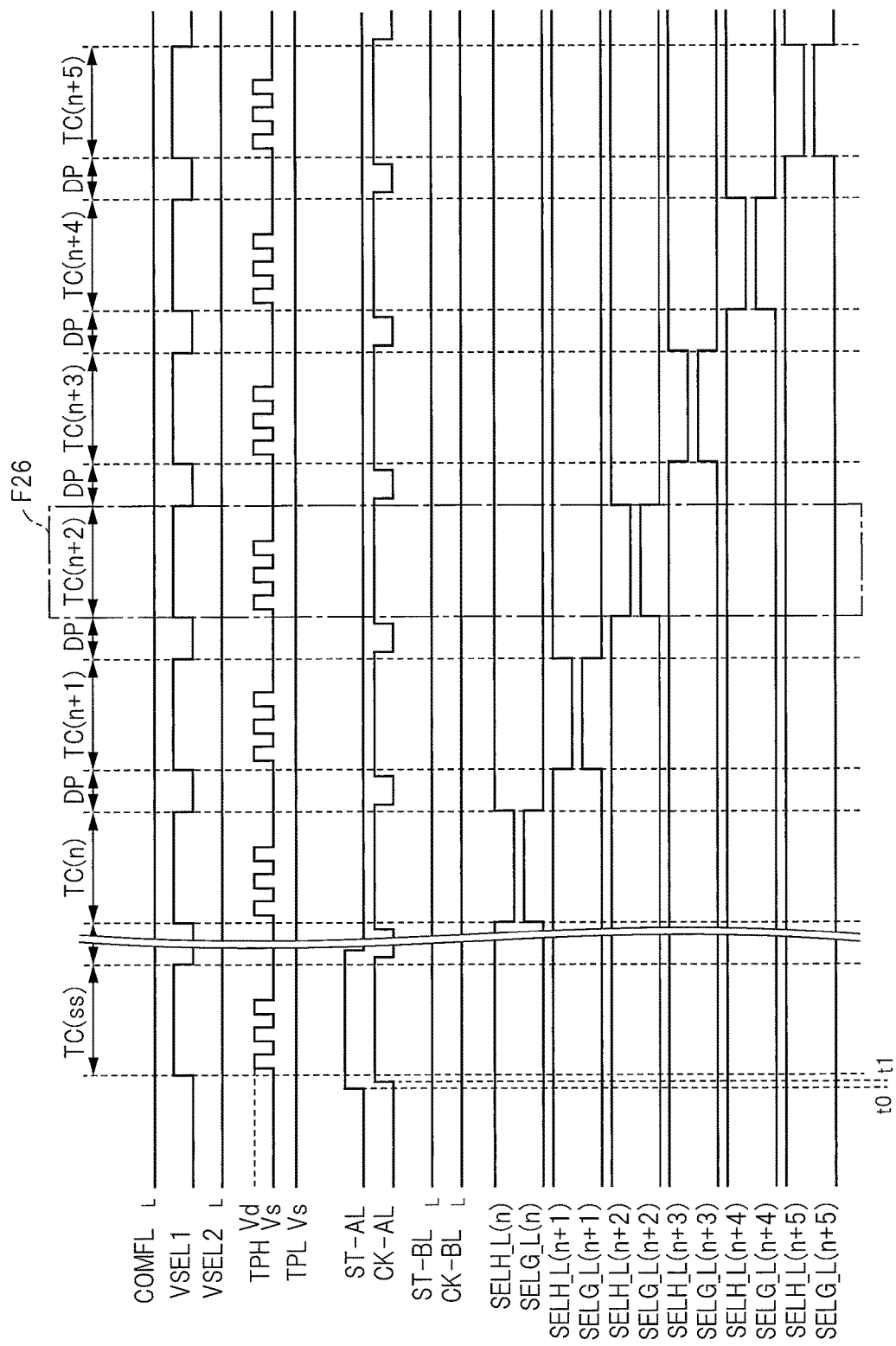
FIG. 27 is a waveform chart for describing the operation of the electric field touch detection according to the second embodiment.
Figure 28:
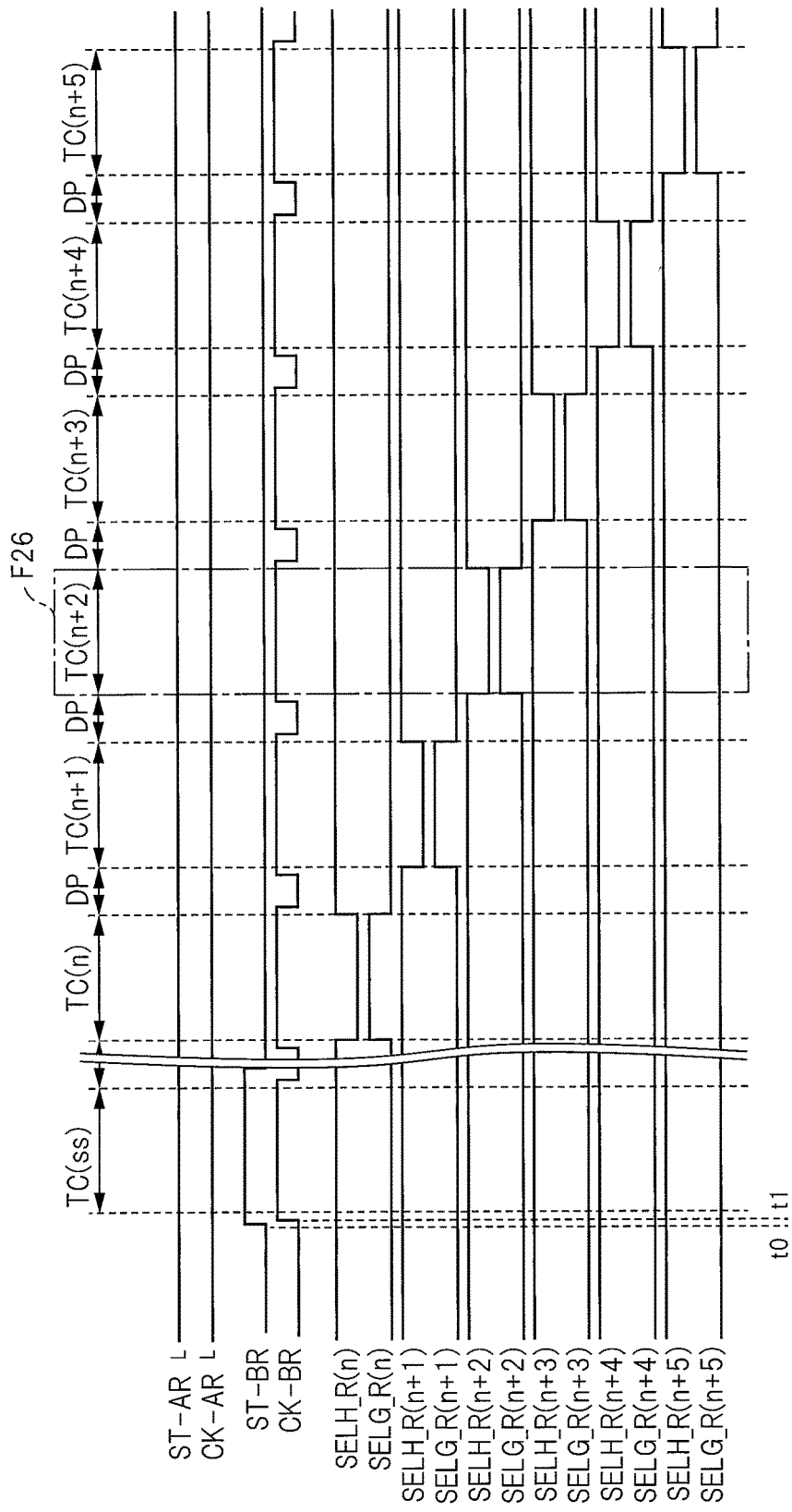
FIG. 28 is a waveform chart for describing the operation of the electric field touch detection according to the second embodiment.

FIGS. 27 and 28 are waveform charts for describing an operation of the electric field touch detection. The operation in the electric field touch detection will be described by using the waveform charts. Here, the waveform chart is divided into FIGS. 27 and 28 in order to prevent the drawing from being complicated. If FIG. 28 is disposed on the lower side of FIG. 27, the waveform chart is completed. FIGS. 27 and 28 are similar to FIGS. 20 and 21, and thus a difference therebetween will be mainly described.

Also in the second embodiment, the control device 3 generates the shift clock signals and the start signals without using the separation amount in the electric field touch detection similarly to the first embodiment. However, as illustrated in FIGS. 27 and 28 unlike the first embodiment, the control device 3 switches, at the time t0, the start signal ST-BR from the low level to the high level indicating selection instead of the start signal ST-AR. The control device 3 switches the shift clock signals CK-AL and CK-BR from the low levels to the high levels in the start period TC(ss) and per the electric field touch detection period. That is, the shift clock signals CK-AL and CK-BR are periodically varied. The control device 3 retains the start signals ST-BL and ST-AR at the low levels L, and retains the shift clock signals CK-BL and CK-AR at the low levels L, as illustrated in FIGS. 27 and 28. That is, the shift clock signals CK-BL and CK-AR do not vary in the electric field touch detection.

When the shift clock signals CK-AL and CK-BR vary, and the shift stages FAL(n) and FBR(n) (refer to FIGS. 14 and 15) retain the start signals ST-AL and ST-BR at the high levels each indicating the selection of the drive electrode, the electric field touch detection period TC(n) comes. The shift stages FAL(n) and FBR(n) store the start signals ST-AL and ST-BL at the high levels, so that the first selection signal AL(n) and the second selection signal BR(n) become the high levels. Accordingly, the first transfer switch TP1L and the second transfer switch TP2L illustrated in FIG. 16A and the first transfer switch TP1R and the second transfer switch TP2R illustrated in FIG. 23 become the on-states. The state selection signal VSEL1 becomes the high level, and the state selection signal VSEL2 becomes the low level in the electric field touch detection period TC(n), so that the second unit selection signals SELG_L(n) and SELG_R(n) become the high levels, and the first unit selection signals SELH_L(n) and SELH_R(n) become the low levels, as illustrated in FIGS. 27 and 28.

As a result, the first end n1 of the drive electrode TL(n) is coupled to the first wiring TPH through the P transistor P6L in the unit drive circuit USL, and the second end n2 is coupled to the first wiring TPH through the P transistor P6R in the unit drive circuit USR. Accordingly, in the electric field touch detection period TC(n), the drive signal periodically varying and supplied to the first wiring TPH is supplied from the first end n1 and the second end n2 of the drive electrode TL(n), so that the electric field is generated.

The electric field touch detection period TC(n) has been described as an example, but the other electric field touch detection periods can be also described similarly. Also in the second embodiment, the control signal COMFL is made the low level in the electric field detection periods and the second voltage Vs is supplied to the non-selected drive electrodes, so that the noise reduction can be achieved.

A magnetic field by the pen Pen is detected by the detection electrodes RL(0) to RL(p) formed on the second substrate in the magnetic field touch detection period as described in FIG. 2, and the variation of the electric field is also detected by the detection electrodes RL(0) to RL(p) in the electric field touch detection period as described in FIG. 3.

<Electronic Device>

Figure 29:
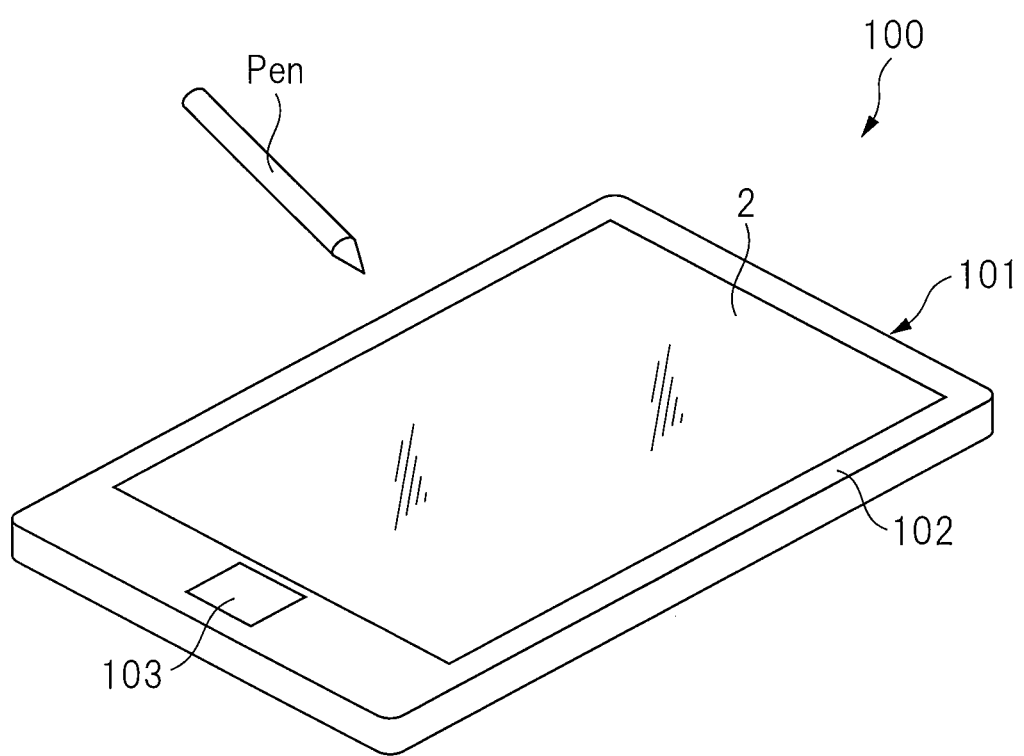
FIG. 29 is a perspective view showing an electronic device according to the first and second embodiments.

FIG. 29 is a perspective view of a configuration of an electronic device 100 including any of the display devices 1 described in the first and second embodiments. The electronic device 100 includes: a tablet computer 101 including the display device 1; and a pen Pen. The pen Pen is an indicator including a coil and a capacitance element, as illustrated in FIG. 2. In FIG. 29, reference numeral "2" denotes the above display area, and reference numeral "102" denotes a frame area disposed so as to surround the display area 2. Reference numeral "103" denotes a button of the computer 101.

An image is displayed in the display area 2 in the display periods DP. Whether the pen Pen has been in proximity to the display area 2 is detected, and the coordinates thereof are detected in the magnetic field touch detection periods TP(n) to TP(n+5) etc. The computer 101 performs a processing in response to a result of these detections.

<Effect>

Also in the display device 1 according to the second embodiment similarly to the first embodiment, a display device 1 capable of the noise reduction in a case where the electromagnetic-induction-method input detection device and the capacitance-method input detection device are built in can be provided. Particularly, the noise accompanied with loads of the first wiring TPH can be reduced. Charge and discharge in the loads are reduced, so that the speed of varying the voltage of the drive electrode can be increased. As a result, the both drives by the electromagnetic induction method and the capacitance method can be performed, and simultaneously the speed-up and the noise reduction of the drive by the electromagnetic induction method can be achieved. Those skilled in the art may conceive various modifications and alterations in a scope of the idea of the present invention, and it is understood that the modifications and the alterations belong to a scope of the present invention.

For example, addition, deletion, or design alteration of constituent elements, or addition, omission, or condition alteration of processes, appropriately performed by those skilled in the art with respect to each of the above embodiments is included in the scope of the present invention as far as having the spirit of the present invention.

For example, the case where the drive electrodes TL(0) to TL(p) extend in the row direction and are disposed in parallel to the column direction has been described in the above embodiments, but the row direction and the column direction vary depending on a visual point. A case where the drive electrodes TL(0) to TL(p) extend in the column direction and are disposed in parallel to the row direction with the visual point varied is also included in the scope of the present invention. The wording of "parallelism" used in the present specification means that no crossing is present from one end to the other end. Therefore, even when a portion of one line (or one electrode) or the entirety thereof is provided on a tilt with respect to the other line (or the other electrode) and if the lines do not cross from one end to the other end, those states are also included in the "parallelism" in the present specification.

What is claimed is:
1. An input detection device comprising:
   a plurality of drive electrodes including a first drive electrode and a second drive electrode;
   a first wiring supplying a first voltage to the plurality of drive electrodes;
   a second wiring supplying, to the plurality of drive electrodes, a second voltage different from the first voltage,
   a first selection circuit coupled between the first and second wirings and a first end of the second drive electrode; and
   a second selection circuit coupled between the first and second wirings and a second end of the second drive electrode,
   wherein input detection with an electromagnetic induction method is performed through magnetic fields generated by supplying the first and second voltages to the plurality of drive electrodes, and the first and second voltages supplied to the first and second wirings are direct-current voltages,
   wherein the first and second drive electrodes are simultaneously driven, and each generate a magnetic field by a current flowing due to a voltage difference between the first and second voltages, and wherein the second selection circuit alternately couples the first and second wirings to the second end of the second drive electrode, and the first selection circuit consecutively couples the second wiring to the first end of the second drive electrode while the first and second wirings are alternately coupled to a first end of the first drive electrode and while the second wiring is consecutively coupled to a second end of the first drive electrode.

2. The input detection device according to claim 1, further comprising:
a substrate on which the plurality of drive electrodes disposed,
wherein the first and second wirings are disposed in a frame area of the substrate.

3. The input detection device according to claim 2, further comprising:
a third selection circuit coupled between the first and second wirings and the first end of the first drive electrode,
wherein the third selection circuit alternately couples the first and second wirings to the first end of the first drive electrode to alternately supply the first and second voltages.

4. The input detection device according to claim 3, further comprising:
a fourth selection circuit coupled between the first and second wirings and the second end of the first drive electrode,
wherein the fourth selection circuit consecutively couples the second end of the first drive electrode to the second wiring to supply the second voltage while the first and second wirings are alternately coupled to the first end of the first drive electrode.

5. The input detection device according to claim 4,
wherein the second voltage is lower in voltage value than the first voltage.

6. The input detection device according to claim 2, further comprising:
an indicator including a coil and a capacitance element.

7. The input detection device according to claim 3,
wherein the plurality of drive electrodes are arranged in a predetermined direction,
a non-selected drive electrode is disposed between the first and second drive electrodes that are simultaneously selected, and
a magnetic field generated around the first drive electrode and a magnetic field generated around the second drive electrode are superimposed in an area, in which the non-selected drive electrode is disposed, by simultaneously driving the first and second drive electrodes.

8. The input detection device according to claim 1, further comprising:
a third selection circuit coupled between the first and second wirings and the first end of the first drive electrode,
wherein the third selection circuit alternately couples the first and second wirings to the first end of the first drive electrode to alternately supply the first and second voltages.

9. The input detection device according to claim 8, further comprising:
a fourth selection circuit coupled between the first and second wirings and the second end of the first drive electrode,
wherein the fourth selection circuit consecutively couples the second end of the first drive electrode to the second wiring to supply the second voltage while the first and second wirings are alternately coupled to the first end of the first drive electrode.

10. The input detection device according to claim 9,
wherein the second voltage is lower in voltage value than the first voltage.

11. The input detection device according to claim 8,
wherein the plurality of drive electrodes are arranged in a predetermined direction,
a non-selected drive electrode is disposed between the first and second drive electrodes that are simultaneously selected, and
a magnetic field generated around the first drive electrode and a magnetic field generated around the second drive electrode are superimposed in an area, in which the non-selected drive electrode is disposed, by simultaneously driving the first and second drive electrodes.

12. The input detection device according to claim 1, further comprising:
an indicator including a coil and a capacitance element.

13. The input detection device according to claim 1, further comprising:
first and second scanner circuits supplying a selection signal to the first selection circuit; and
third and fourth scanner circuits supplying a selection signal to the second selection circuit.

14. The input detection device according to claim 13,
wherein the first and second scanner circuits are disposed along a first side of a frame area in a substrate on which the plurality of drive electrodes are disposed, and
the third and fourth scanner circuits are disposed along a second side of the frame area.

15. The input detection device according to claim 14, further comprising:
a first gate driver; and
a second gate driver,
wherein the first and second scanner circuits and the first gate driver are disposed along the first side of the frame area, and
the third and fourth scanner circuits and the second gate driver are disposed along the second side of the frame area.

16. An electronic device comprising:
the input detection device according to claim 1.

* * * * *